(12) United States Patent
Lee et al.

(10) Patent No.: US 11,909,028 B2
(45) Date of Patent: Feb. 20, 2024

(54) CATHODE FOR METAL-AIR BATTERY, PREPARING METHOD THEREOF, AND METAL-AIR BATTERY COMPRISING THE SAME

(71) Applicant: SAMSUNG ELECTRONICS CO., LTD., Suwon-si (KR)

(72) Inventors: Hyunpyo Lee, Seoul (KR); Mokwon Kim, Suwon-si (KR); Taeyoung Kim, Seoul (KR); Wonsung Choi, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 176 days.

(21) Appl. No.: 16/852,677

(22) Filed: Apr. 20, 2020

(65) Prior Publication Data

US 2021/0126240 A1    Apr. 29, 2021

(30) Foreign Application Priority Data

Oct. 23, 2019   (KR) .................... 10-2019-0132389

(51) Int. Cl.
  *H01M 4/131*   (2010.01)
  *H01M 4/04*    (2006.01)
  (Continued)

(52) U.S. Cl.
  CPC ......... *H01M 4/131* (2013.01); *H01M 4/0442* (2013.01); *H01M 4/0471* (2013.01);
  (Continued)

(58) Field of Classification Search
  CPC .. H01M 4/131; H01M 4/0442; H01M 4/0471; H01M 4/134; H01M 4/505; H01M 4/525; H01M 4/58; H01M 4/621; H01M 4/663; H01M 4/667; H01M 10/0525; H01M 10/0569; H01M 2004/021
  See application file for complete search history.

(56) References Cited

U.S. PATENT DOCUMENTS 8,507,135 B2   8/2013   Joachim et al.
8,883,358 B2   11/2014  Takahashi et al.
(Continued)

FOREIGN PATENT DOCUMENTS

JP   2016169145 A  *  9/2016
KR   101405755 B1     6/2014
(Continued)

OTHER PUBLICATIONS

English machine translation of Jin et al. (WO2017147793A1) (Year: 2017).*

(Continued)

*Primary Examiner* — Brian R Ohara
(74) *Attorney, Agent, or Firm* — CANTOR COLBURN LLP

(57) ABSTRACT

A cathode for a metal-air battery, the cathode including a mixed conductor; and first pores having a size of about 1 micrometer (μm) or greater, wherein an amount of the first pores is about 30 volume percent (volume %) or greater, with respect to a total volume of pores in the cathode, and a total porosity of the cathode is about 50% or greater, based on a total volume of the cathode.

19 Claims, 10 Drawing Sheets

(51) Int. Cl.
*H01M 4/134* (2010.01)
*H01M 4/505* (2010.01)
*H01M 4/525* (2010.01)
*H01M 4/58* (2010.01)
*H01M 4/62* (2006.01)
*H01M 4/66* (2006.01)
*H01M 10/0525* (2010.01)
*H01M 10/0569* (2010.01)
*H01M 4/02* (2006.01)

(52) U.S. Cl.
CPC ........... *H01M 4/134* (2013.01); *H01M 4/505* (2013.01); *H01M 4/525* (2013.01); *H01M 4/58* (2013.01); *H01M 4/621* (2013.01); *H01M 4/663* (2013.01); *H01M 4/667* (2013.01); *H01M 10/0525* (2013.01); *H01M 10/0569* (2013.01); *H01M 2004/021* (2013.01)

(56) References Cited

U.S. PATENT DOCUMENTS

| | | | |
|---|---|---|---|
| 9,680,191 B2 | 6/2017 | Lee et al. | |
| 9,954,231 B2 | 4/2018 | Kim et al. | |
| 10,505,203 B2 | 12/2019 | Lee et al. | |
| 10,593,950 B2 | 3/2020 | Lee et al. | |
| 2007/0231704 A1 | 10/2007 | Inda | |
| 2008/0070087 A1 | 3/2008 | Johnson | |
| 2011/0129739 A1 | 6/2011 | Nakanishi | |
| 2012/0276459 A1 | 11/2012 | Im et al. | |
| 2015/0118573 A1* | 4/2015 | Yokoyama | H01M 10/0562 429/322 |
| 2016/0190550 A1* | 6/2016 | Choi | H01M 4/505 252/182.1 |
| 2017/0012332 A1 | 1/2017 | Lee et al. | |
| 2017/0033422 A1 | 2/2017 | Kim et al. | |
| 2017/0222287 A1 | 8/2017 | Suzuki et al. | |
| 2017/0271684 A1 | 9/2017 | Jung et al. | |
| 2020/0119346 A1* | 4/2020 | Ma | C01G 33/006 |
| 2020/0119391 A1* | 4/2020 | Ma | H01M 10/0525 |
| 2020/0127353 A1 | 4/2020 | Lee et al. | |
| 2021/0242469 A1* | 8/2021 | Lee | H01M 4/861 |
| 2021/0257628 A1* | 8/2021 | Kim | H01M 4/8882 |

FOREIGN PATENT DOCUMENTS

| | | | | |
|---|---|---|---|---|
| KR | 101632793 B1 | 6/2016 | | |
| KR | 1020170087411 A | 7/2017 | | |
| WO | WO-2017147793 A1 * | 9/2017 | ............ | H01M 12/08 |

OTHER PUBLICATIONS

English machine translation of Asaoka et al. (JP 2016169145 A) (Year: 2016).*

Yu, Ran, et al. "Synthesis and characterization of perovskite-type (Li, Sr)(Zr, Nb) O3 quaternary solid electrolyte for all-solid-state batteries." Journal of Power Sources 306 (2016): 623-629. (Year: 2016).*

Kong, Yazhou, et al. "Li ion conduction of perovskite Li0. 375Sr0. 4375Ti0. 25Ta0. 75O3 and related compounds." Ceramics International 44.4 (2018): 3947-3950. (Year: 2018).*

Fang, Minhua, et al. "The investigation of lithium doping perovskite oxide LiMnO3 as possible LIB anode material." Ceramics International 44.7 (2018): 8223-8231. (Year: 2018).*

* cited by examiner

CATHODE FOR METAL-AIR BATTERY, PREPARING METHOD THEREOF, AND METAL-AIR BATTERY COMPRISING THE SAME

CROSS-REFERENCE TO RELATED APPLICATION

This application claims priority to and the benefit of Korean Patent Application No. 10-2019-0132389, filed on Oct. 23, 2019, in the Korean Intellectual Property Office, the content of which in its entirety is herein incorporated by reference.

BACKGROUND

1. Field

The present disclosure relates to a cathode for a metal-air battery, a method of manufacturing the same, and a metal-air battery including the same.

2. Description of the Related Art

A lithium-air battery uses lithium metal as an anode and air as a cathode active material, and thus may be implemented as a high-capacity battery without the need to store air inside the battery.

Lithium-air batteries have a theoretical specific energy of about 3,500 watt-hours per kilogram (Wh/kg) or greater, which is about 10 times greater than that of lithium ion batteries.

A cathode of a lithium-air battery may be manufactured by mixing a carbonaceous conducting agent, a binder, and the like. The carbonaceous conducting agent, the binder, and the like may decompose due to generation of radicals from electrochemical reactions during charge and discharge of a lithium-air battery. Accordingly, a lithium-air battery including such a cathode may deteriorate. Therefore, there is a need for a more chemically stable cathode for a lithium-air battery.

SUMMARY

Provided are a chemically stable cathode for a metal-air battery, and a method of manufacturing the same.

Provided is a metal-air battery including the cathode.

Additional aspects will be set forth in part in the description which follows and, in part, will be apparent from the description, or may be learned by practice of the presented embodiments.

According to an aspect of an embodiment, a cathode for a metal-air battery includes: a mixed conductor; and first pores having a size of about 1 micrometer (μm) or greater, wherein an amount of the first pores is about 30 volume percent (volume %) or greater, with respect to a total volume of pores in the cathode, and a total porosity of the cathode is about 50% or greater, based on a total volume of the cathode.

According to an aspect of an embodiment, a metal-air battery includes the cathode, an anode, and an electrolyte disposed between the cathode and the anode.

According to an aspect of an embodiment, a method of manufacturing a cathode for a metal-air battery includes: mixing a mixed conductor, organic particles having a size of about 1 μm or greater, and a solvent to prepare a composition; and coating the composition on a substrate to provide a coated substrate; and then thermally treating the coated substrate to manufacture the cathode.

BRIEF DESCRIPTION OF THE DRAWINGS

These and/or other aspects will become apparent and more readily appreciated from the following description of the embodiments, taken in conjunction with the accompanying drawings, in which.

DETAILED DESCRIPTION

Figure 1A:
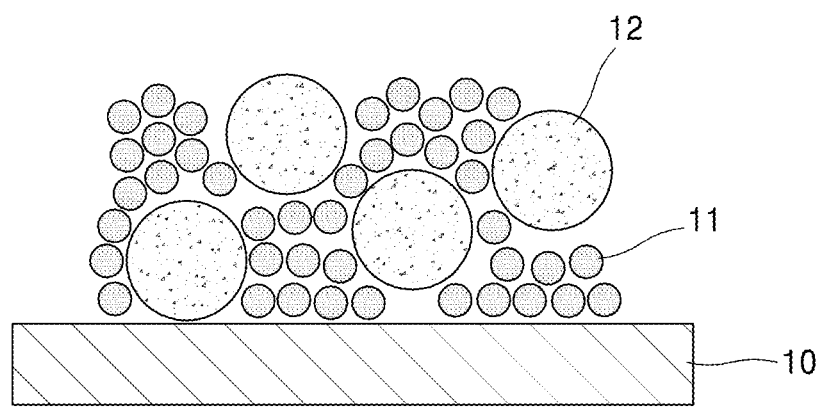
FIG. 1A is a schematic view illustrating an embodiment of a cathode before thermal treatment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a cathode for a metal-air battery, a method of manufacturing the cathode, and a metal-air battery including the cathode will be described in greater detail.

According an aspect, there is provided a cathode for a metal-air battery, the cathode including: a mixed conductor; and first pores having a size of about 1 μm or greater, e.g., about 1 micrometer to about 100 micrometers, wherein an amount of the first pores is about 30 volume percent (volume %) or greater, with respect to a total volume of the pores in the cathode, and a total porosity of the cathode is about 50% or greater, e.g., about 50% to about 95%, based on a total volume of the cathode.

A lithium-air battery generates lithium hydroxide (LiOH) or lithium oxide ($Li_2O_2$) by reaction of lithium ions and oxygen during discharge. These discharge products are reversibly separated into oxygen and lithium during charge.

In the lithium-air battery, reversible charge and discharge is possible when the discharge product is stored in the cathode. Accordingly, a sufficient storage space for the discharge product is desirably provided inside the electrode to provide a lithium-air battery having a high capacity. During charge, the discharge product is desirably efficiently decomposed.

However, in a lithium-air battery using a cathode in layered form, an amount of the discharge product can be stored is undesirably small, and the discharge product on a surface of the cathode may contact a solid electrolyte at an initial stage of charging, but be separated from the cathode as the charging progresses, and thus reversible charging and discharging may become difficult.

Accordingly, the present inventors solved the above-described problems and discovered a porous cathode, which contains a mixed conductor stable to discharge products and has an increased reaction area due to an increased storage space for the discharge product.

The cathode may include first pores having a size of about 1 μm or greater, for example, about 1 μm to about 10 μm, and an amount of about 30 volume % or greater, for example, about 30 volume % to about 95 volume %, about 30 volume % to about 70 volume %, or about 35 volume % to about 60 volume %, and thus have a total porosity of about 50% or greater, for example, about 70% to about 90%, or about 65% to about 85%, so that the storage space of a discharge product may be increased. Accordingly, while the cathode thickness is maintained in a range of about 5 μm to about 100 μm, the cell specific energy may be maintained at about 550 Wh/kg to about 650 Wh/kg, for example, about 600 Wh/kg. In addition, since the cathode has a porous structure, a volume change of a metal-air battery during charge and discharge may be decreased. Due to the porosity of the cathode, diffusion of air, oxygen, and so forth into the cathode may be facilitated.

While not wanting to be bound by theory, it is understood that when the amount of the first pores in the cathode is less than 30 volume % and a total porosity of the cathode is less than 50%, due to an insufficient storage space for the discharge product, the effect of suppressing volume changes during charge and discharge is insufficient, and reversible charging and discharging may be difficult.

The first pores may have a size of, for example, about 1 μm to about 100 μm, for example about 1 μm to about 50 μm, for example, about 1 μm to about 30 μm, for example, about 1 μm to about 20 μm, for example, about 1 μm to about 10 μm, for example, about 2 μm to about 75 μm, about 3 μm to about 50 μm, about 4 μm to about 25 μm, or about 3 μm to about 8 μm. When the size of the first pores is within the above ranges, it is possible to contain a large amount of discharge product obtained at a high discharge capacity, and thus to manufacture a metal-air battery having a high specific energy, and improved charge and discharge efficiency and lifetime characteristics.

The term "pore size" may indicate an average diameter of the pores when the pores are spherical or circular. When the pores are non-spherical or non-circular, for example, elliptical, the pore size may indicate the length of the major axis. The term "pore" used here refers to an open pore. The pore size may be measured using a Brunauer-Emmett-Teller ("BET") method or a cross-sectional scanning electron microscope ("SEM") image analysis method.

A structure of a cathode for a metal-air battery according to an embodiment will be further described with reference to FIGS. 1A and 1B.

Figure 1B:
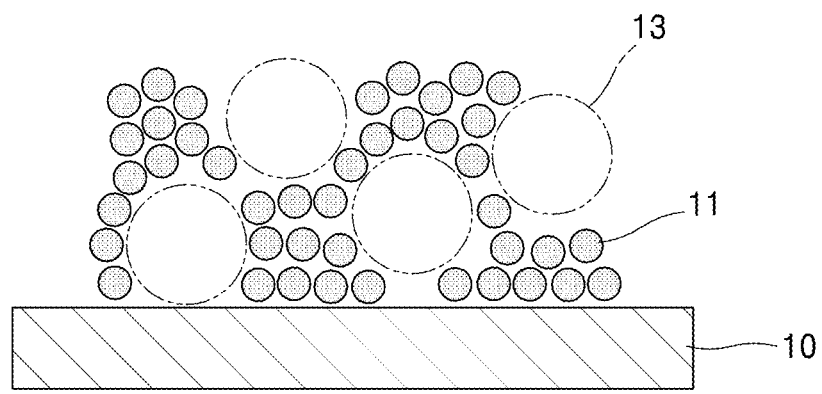
FIG. 1B is a schematic view illustrating an embodiment of a cathode after thermal treatment.

Referring to FIG. 1A, a cathode according to an embodiment may be obtained by coating, on an upper surface of a current collector 10, a composition including a mixed conductor 11, organic particles 12 capable of forming pores in the cathode, and a solvent, and drying the same. Subsequently, the dried product may be thermally treated to remove the organic particles, resulting in a porous cathode including first pores 13 and the mixed conductor 11.

Although not shown in FIG. 1A, a binder may be further included in the composition. In an embodiment, the amount of the binder in the composition may be about 5 parts by weight to about 50 parts by weight, for example, about 10 parts by weight to about 40 parts by weight, with respect to 100 parts by weight of the mixed conductor. The binder may also be removed, like the organic particles 11, through the thermal process, and may not be present in the final cathode. The thermal treatment may be controlled within a temperature range in which the organic particles and the binder can be removed.

In an embodiment, the cathode for a metal-air battery may use oxygen as a cathode active material.

In an embodiment, the mixed conductor may have an electronic conductivity of about $1 \times 10^{-6}$ Siemens per centimeter (S/cm) or greater, for example, about $5.0 \times 10^{-6}$ S/cm or greater, for example, about $1 \times 10^{-5}$ S/cm or greater, for example, about $1 \times 10^{-4}$ S/cm or greater, for example, about $5.0 \times 10^{-3}$ S/cm or greater, for example, about $1.0 \times 10^{-2}$ S/cm, or about $1 \times 10^{-6}$ S/cm to about 1.0 S/cm. In an embodiment, the mixed conductor may have an electronic conductivity of about $1 \times 10^{-6}$ S/cm to about 1 S/cm, for example, about $5.0 \times 10^{-6}$ S/cm to about $5 \times 10^{-1}$ S/cm, for example, about $1 \times 10^{-5}$ S/cm to about $1 \times 10^{-1}$ S/cm, for example, about $1 \times 10^{-4}$ S/cm to about $5 \times 10^{-2}$ S/cm, or about $5.0 \times 10^{-3}$ S/cm to about $5 \times 10^{-2}$ S/cm. In an embodiment, the mixed conductor may have a lithium ion conductivity of about $1 \times 10^{-8}$ S/cm or greater, for example, about $1 \times 10^{-6}$ S/cm or greater, for example, about $1 \times 10^{-5}$ S/cm or greater, for example, about $5 \times 10^{-5}$ S/cm or greater, for example, about $1 \times 10^{-4}$ S/cm or greater, for example, about $1 \times 10^{-3}$ S/cm or greater, or about $1 \times 10^{-8}$ S/cm to about $1 \times 10^{-2}$ S/cm. In an embodiment, the mixed conductor may have a lithium ion conductivity of about $1 \times 10^{-8}$ S/cm to about $1 \times 10^{-2}$ S/cm, for example, about $1 \times 10^{-6}$ S/cm to about $5 \times 10^{-1}$ S/cm, for example, about $1 \times 10^{-5}$ S/cm to about $1 \times 10^{-1}$ S/cm, for example, about $5 \times 10^{-5}$ S/cm to about $5 \times 10^{-2}$ S/cm, for example, about $1 \times 10^{-4}$ S/cm to about $1 \times 10^{-2}$ S/cm, for example, about $1 \times 10^{-3}$ S/cm to about $5 \times 10^{-3}$ S/cm, or about $1 \times 10^{-8}$ S/cm to about $1 \times 10^{-3}$ S/cm.

Such a mixed conductor is highly stable to the discharge products, and the cathode including such a mixed conductor is stable without being decomposed by the discharge product which is reversibly generated or destroyed while a lithium-air battery is charged and discharged.

The mixed conductor may be a lithium-containing metal oxide which is structurally and chemically stable. The cathode including this mixed conductor may be suppressed from being decomposed, e.g., by a radicals accompanied by electrochemical reaction, unlike a cathode including a carbonaceous conducting agent. Accordingly, a lithium-air battery including the cathode may have improved charge and discharge characteristics. The lithium-containing metal oxide may be, for example, a crystalline lithium ion conductor. The lithium-containing metal oxide including lithium and having crystallinity may provide a migration path of lithium ions. Accordingly, the cathode may not further include an electrolyte. In an embodiment, the mixed conductor has an oxidation potential that is greater than an oxidation potential of carbon and a reduction potential that is less than a reduction potential of carbon. In an embodiment, the mixed conductor has a stability to being decomposed by an electrochemical reaction that is greater than a stability of carbon to being decomposed by an electrochemical reaction.

The lithium-containing metal oxide may include, for example, at least one of a spinel compound, a perovskite compound, a layered compound, a garnet compound, a NASICON compound, a LISICON compound, a phosphate compound, a tavorite compound, a triplite compound, an anti-perovskite compound, a silicate compound, or a borate compound. A spinel compound is a compound that is isostructural with spinel, i.e., $MgAl_2O_4$. A perovskite compound is a compound that is isostructural with perovskite, i.e., $CaTiO_3$. A layered compound is a compound having a layered structure, such as a compound which is isostructural with α-$NaFeO_2$, such as $LiCoO_2$. A garnet compound is a compound of the formula $X_3Y_2(SiO_4)_3$, wherein X is a divalent cation, such as at least one of $Ca^{2+}$, $Mg^{2+}$, $Fe^{2+}$, or $Mn^{2+}$, and Y is a trivalent cation, such as at least one of $Al^{3+}$, $Fe^{3+}$, or $Cr^{3+}$. A NASICON compound, as used herein, refers to a compound with the chemical formula $Na_{1+x}Zr_2Si_xP_{3-x}O_{12}$, wherein $0<x<3$. A LISICON compound, as used herein, refers to a compound with the formula $Li_{2+2x}Zn_{1-x}GeO_4$, wherein $0<x<1$. Tavorite is compound of the formula $LiFe(PO_4)(OH)$. A triplite compound is a compound of the formula $(Mn_{xFe1-x})_2PO_4$ $(F_{yOH1-y})$ wherein $0<x<1$ and $0<y<1$. An anti-perovskite compound is a compound that is isostructural with perovskite, i.e., $CaTiO_3$, except that the anion and cation positions are reversed, such as in $Li_3OBr$. Due to the inclusion of these compounds as the lithium-containing metal oxide, the decomposition of the cathode by such as radicals accompanied by chemical reaction may be more effectively suppressed.

In an embodiment, the mixed conductor may have a size of about 10 nanometers (nm) to about 500 nm. The mixed conductor may be a mixed conductor having ionic conductivity and electronic conductivity. The size of the mixed conductor may refer to an average particle diameter when the mixed conductor is spherical, and refer to the length of the major axis when the mixed conductor is non-spherical. The size of the mixed conductor may be measured using a scanning electron microscope ("SEM") or a particle size analyzer.

In an embodiment, the amount of the first pores in the cathode may be about 30 volume % or greater, for example, about 30 volume % to about 70 volume %, about 35 volume % to about 65 volume %, or about 40 volume % to about 60 volume %, with respect to a total volume of the entire pores in the cathode. The cathode may have a total porosity of about 50% or greater, for example, about 50% to about 95%, for example, about 70% to about 85%, about 55% to about 90%, about 60% to about 85%, or about 65% to about 80%, based on a total porosity of the cathode.

The term "total porosity" used herein indicates a ratio of the total volume of all pores, e.g., the first pores and the other pores, with respect to a total volume of the cathode. The other pores may include, for example, second pores originating due to a binder.

The total porosity may be determined, for example, using a scanning electron microscope ("SEM") and measuring the weight and volume of the electrode. When the amount of the first pores and the total porosity are within the above-described ranges, it may be possible to accommodate an increased amount of the discharge product, enabling reversible charging and discharging. Accordingly, it is possible to manufacture a metal-air battery having a high specific energy.

The first pores may be formed by thermally treating an electrode composition including the organic particles, the first pores being present at the sites from which the organic particles are removed through the thermal treatment, and accordingly the amount of the first pores may be the same as the amount of the organic particles. When the electrode composition contains a binder, the cathode may also contain pores (second pores) resulting from the removal of the binder through thermal treatment. Since the second pores originate from the binder, the amount of the second pores may be the same as the amount of the binder in the electrode composition.

In an embodiment, the term "second pores" may be interpreted as the term referring to pores except for the first pores.

The size, e.g., average particle diameter, of the organic particles can be a significant factor affecting the size of the first pores in the cathode, and may be, for example, about 1 μm to about 100 μm, for example, about 1 μm to about 50 μm, for example, about 1 μm to about 30 μm, for example, about 1 μm to about 20 μm, for example, about 1 μm to about 10 μm, for example, about 2 μm to about 75 μm, about 3 μm to about 50 μm, about 4 μm to about 25 μm, or about 3 μm to about 8 μm. The organic particles may be microspheres having a monomodal particle size distribution. The monomodal particle size distribution may be defined as having a standard deviation of about 40% or less, for example, in a range of about 1% to about 40%, about 2% to about 35%, about 4% to about 30%, or about 10% or less, for example, in a range of about 3% to about 10%, as analyzed using a particle size analyzer, such as a particle size analyzer that uses dynamic light scattering, an example of which is the Nicomp 380, available from Particle Sizing Systems.

The organic particles may have, for example, a spherical shape, a rod shape, an elliptical shape, or a radial shape.

When the organic particles have a spherical shape, the organic particles may be microspheres having an average particle diameter of about 1 μm or greater. When the particle size is less than 1 μm, the amount of the discharge products may be low, and a lithium-air battery using this cathode may have decreased charge and discharge efficiency and lifetime characteristics. The term "size" when used herein with respect to the organic particles may refer to an average particle diameter of the organic particles when the organic particles are spherical. When the organic particles have a rod shape or an elliptical shape, the size may refer to the length of a major axis.

A method of manufacturing a cathode according to an embodiment now will be further described.

First, a mixed conductor, organic particles having a size of about 1 μm or greater, and a solvent may be mixed to prepare a composition. Non-limiting examples of the solvent may include alcohols such as ethanol, and N-methyl-2-pyrrolidone ("NMP"). The amount of the solvent may be appropriately controlled to enable each ingredient of the composition to be dissolved or dispersed.

A binder may be further added to the composition. Non-limiting examples of the binder may include polyvinyl butyral, polyvinylidene fluoride ("PVDF"), polyvinyl alcohol, carboxymethylcellulose ("CMC"), starch, hydroxypropylcellulose, reproduced cellulose, polyvinylpyrrolidone, polytetrafluoroethylene, ethylene-propylene-diene terpolymer ("EPDM"), sulfonated EPDM, styrene butylene rubber, and fluorine rubber.

The composition may be coated on an upper surface of a substrate and then thermally treated to thereby manufacture a cathode. The cathode may be separated for use, as desired.

The thermal treatment may be carried out in a temperature range in which the organic particles can be thermally decomposed to form pores, for example, at a temperature of about 450° C. to about 800° C., for example, about 450° C. to about 750° C., for example, about 450° C. to about 700° C. When the composition includes a binder, the binder may be removed during the thermal treatment. The thermal treatment time may vary according to the thermal treatment temperature. For example, the thermal treatment time may be for example, about 0.5 hours to about 20 hours, for example, about 1 hour to about 10 hours, for example, about 1 hour to about 3 hours.

When the thermal treatment is performed within the above-described temperature and time ranges, it is possible to manufacture a cathode having excellent capacity characteristics and to manufacture a lithium-air battery having improved charge and discharge efficiency and lifetime using the cathode.

The organic particles may be a polymer, for example, including at least one of polystyrene, a copolymer including styrene repeating units, or a copolymer including repeating units having crosslinkable functional groups, or a crosslinked polymer. The organic particles may be a polystyrene or a polymer including styrene-based repeating units. The polystyrene or the polymer including styrene-base repeating units may have hydrophilicity, no adverse effect on a lithium metal electrode, and nearly no electrolyte wettability, and thus may minimize reactivity between the lithium metal electrode and the electrolyte.

The at least one of polystyrene, a copolymer including styrene repeating units, a copolymer including repeating units having crosslinkable functional groups, or a crosslinked polymer may be polystyrene, a poly(styrene-divinylbenzene) copolymer, a poly(methyl methacrylate-divinylbenzene)copolymer, a poly(ethyl methacrylate-divinylbenzene)copolymer, a poly(pentyl methacrylate-divinylbenzene)copolymer, a poly(butyl methacrylate-divinylbenzene) copolymer, a poly(propyl methacrylate-divinylbenzene) copolymer, a poly(styrene-ethylene-butylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly(methacrylate-butadiene-styrene)

copolymer, a poly(styrene-acrylate) copolymer, and a poly(acrylonitrile-styrene-acrylate) copolymer, or a cross-linked polymer.

The poly(styrene-divinylbenzene) copolymer may be represented by Formula 16.

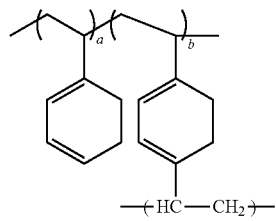

Formula 16

In Formula 16, a and b as mole fractions may each independently be in a range of about 0.01 to about 0.99, and the sum of a and b may be equal to 1. In Formula 16, a may be, for example, about 0.95 to about 0.99, for example, about 0.98 to about 0.99, and b may be, for example, 0.01 to about 0.05, for example, about 0.01 to about 0.02.

The poly(styrene-divinylbenzene) copolymer may be represented by Formula 17.

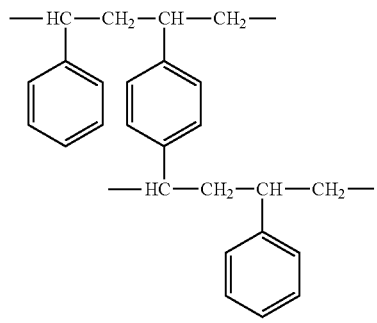

Formula 17

The poly(styrene-divinylbenzene) copolymer may be represented by Formula 18.

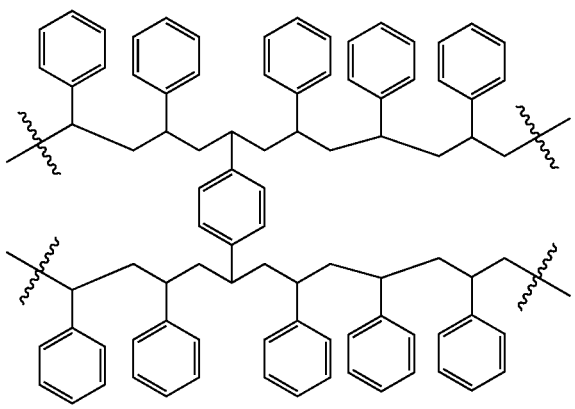

Formula 18

The poly(acrylonitrile-butadiene-styrene) copolymer may represented by Formula 19.

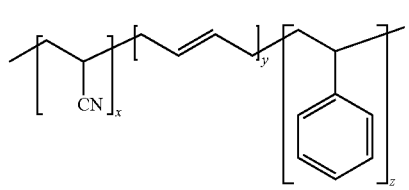

Formula 19

In Formula 19, x, y, and z as mole fractions may each independently be in a range of about 0.01 to about 0.99, and the sum of x, y and z may be equal to 1.

In Formula 19, x may be about 0.1 to about 0.35, y may be about 0.05 to about 0.55, and z may be about 0.2 to about 0.7. For example, x may be about 0.15 to about 0.35, y may be about 0.05 to about 0.3, and z may be about 0.4 to about 0.6.

The poly(styrene-divinylbenzene) copolymer and the poly(acrylonitrile-butadiene-styrene) copolymer may each independently have a degree of polymerization of about 2 to about 5,000, for example, about 5 to about 1,000.

For example, the poly(styrene-divinylbenzene) copolymer and the poly(acrylonitrile-butadiene-styrene) copolymer may be a block copolymer.

In an embodiment, the amount of the organic particle in the composition may be about 1 part by weight to about 60 parts by weight, for example, about 5 parts by weight to about 60 parts by weight, for example, about 20 parts by weight to about 60 parts by weight, with respect to 100 parts by weight of the mixed conductor, and the amount of the binder in the composition may be about 5 parts by weight to about 50 parts by weight, for example, about 10 parts by weight to about 40 parts by weight, with respect to 100 parts by weight of the mixed conductor. When the amount of the mixed conductor and the amount of the binder are within these ranges, it may be possible to manufacture a cathode having high capacity, high electronic conductivity, high ionic conductivity, and excellent mechanical properties.

The mixed conductor may include, for example, a spinel compound represented by Formula 1 or 2, as the lithium-containing metal oxide:

Formula 1

Formula 2

In Formulae 1 and 2, M may be at least one metal element belonging to Group 2 to Group 16 of the periodic table of the elements, δ1 and δ2 may represent a content of oxygen vacancies, 0<x<1, 0<y<1, 0≤δ1≤1, 0<a<2, 0.3<b<5, and 0≤δ2≤3.

The spinel compound may be a compound having a spinel crystal structure or a spinel-like crystal structure. For example, in Formulae 1 and 2, M may be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb; δ1 and δ2 may represent a content of oxygen vacancies; and 0<x<1, 0<y<1, 0<a<2, 0.3<b<5, and 0≤δ2≤3.

For example, the spinel compound may be LiNi$_2$O$_4$.

The spinel compound may be, for example, a compound represented by Formula 3.

Formula 3

In Formula 3, M' may include at least one of Cr, Mg, Ca, Sr, Sc, Y, La, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Ru, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te; δ may represent a content of oxygen vacancy; and $0.3<a<2$, $0.3<b<2$, $0.3<c<2$, and $0 \leq δ \leq 3$. For example, $0 \leq δ \leq 2.5$, $0 \leq δ \leq 2$, $0 \leq δ \leq 1.5$, $0 \leq δ \leq 1$, and $0 \leq δ \leq 0.5$.

For example, the spinel compound may further include other phases, in addition to a phase having a spinel-like crystal structure. For example, the spinel compound may include a phase having a spinel-like crystal structure belonging to the Fd-3m space group, and at least one other phase of $Li_2TiO_3$, $Gd_2Ti_2O_7$, $GdTiO_3$, $LiNbO_3$, or $Nb_2O_5$. Due to polycrystallinity having a plurality of these different phases, the spinel compound may have further improved electronic conductivity and ionic conductivity. In addition, a band gap between valance and conduction bands of the spinel compound may be, for example, about 2.0 electronvolts (eV) or less, about 1.8 eV or less, about 1.6 eV or less, about 1.4 eV or less, or about 1.2 eV or less, for example, about 0.001 eV to about 2 eV, about 0.005 eV to about 1.8 eV, about 0.01 eV to about 1.6 eV, about 0.05 eV to about 1.4 eV, or about 0.1 eV to about 1.2 eV. Within these ranges, migration of electrons from the valance band to the conduction band may be facilitated, and the spinel compound may have improved electronic conductivity.

In the spinel compound, titanium (Ti) may have, for example, at least one oxidation number of +3 or +4. For example, For example, Ti in the mixed conductor may have a mixed valence state with multiple different oxidation numbers. In addition, for example, M' in the spinel compound may have an oxidation number different from at least one of the oxidation numbers of Ti. For example, the spinel compound may additionally include M' having an oxidation number different from that of Ti. As a result, an additional new state density function may be observed near the Fermi energy (Ef), and the band gap between the valance and conduction bands may be decreased. As a result, the spinel compound may have further improved electronic conductivity.

The spinel compound may provide further improved ionic conductivity through the inclusion of an oxygen vacancy. For example, due to the inclusion of an oxygen vacancy in the spinel compound, the position of the state density function may be shifted closer to the Fermi energy (Ef), and the band gap between the valance and conduction bands may be decreased. As a result, the spinel compound may have further improved electronic conductivity.

For example, the spinel compound may include at least one of $Li_{4\pm x}Ti_{5-y}Mg_zO_{12-δ}$ ($0.4<x \leq 1$, $0.4<y \leq 1$, $0.4<z \leq 1$, and $0<δ$), $Li_{4\pm x}Ti_{5-y}Ca_zO_{12-δ}$ ($0.4<x \leq 1$, $0.4<y \leq 1$, $0.4<z \leq 1$, $0<δ$), $Li_{4\pm x}Ti_{5-y}Sr_zO_{12-δ}$ ($0.4<x \leq 1$, $0.4<y \leq 1$, $0.4<z \leq 1$, $0<δ$), $Li_{4\pm x}Ti_{5-y}Sc_zO_{12-δ}$ ($0.4<x \leq 1$, $0.4<y \leq 1$, $0.4<z \leq 1$, $0<δ$), $Li_{4\pm x}Ti_{5-y}Y_zO_{12-δ}$ ($0.4<x \leq 1$, $0.4<y \leq 1$, $0.4<z \leq 1$, $0<δ$), $Li_{4\pm x}Ti_{5-y}La_zO_{12-δ}$ ($0.4<x \leq 1$, $0.4<y \leq 1$, $0.4<z \leq 1$, $0<δ$), $Li_{4\pm x}Ti_{5-y}Ce_zO_{12-δ}$ ($0.4<x \leq 1$, $0.4<y \leq 1$, $0.4<z \leq 1$, $0<δ$), $Li_{4\pm x}Ti_{5-y}Pr_zO_{12-δ}$ ($0.4<x \leq 1$, $0.4<y \leq 1$, $0.4<z \leq 1$, $0<δ$), $Li_{4\pm x}Ti_{5-y}Nd_zO_{12-δ}$ ($0.4<x \leq 1$, $0.4<y \leq 1$, $0.4<z \leq 1$, $0<δ$), $Li_{4\pm x}Ti_{5-y}Sm_zO_{12-δ}$ ($0.4<x \leq 1$, $0.4<y \leq 1$, $0.4<z \leq 1$, $0<δ$), $Li_{4\pm x}Ti_{5-y}Eu_zO_{12-δ}$ ($0.4<x \leq 1$, $0.4<y \leq 1$, $0.4<z \leq 1$, $0<δ$), $Li_{4\pm x}Ti_{5-y}Gd_zO_{12-δ}$ ($0.4<x \leq 1$, $0.4<y \leq 1$, $0.4<z \leq 1$, $0<δ$), $Li_{4\pm x}Ti_{5-y}Tb_zO_{12-δ}$ ($0.4<x \leq 1$, $0.4<y \leq 1$, $0.4<z \leq 1$, $0<δ$), $Li_{4\pm x}Ti_{5-y}Dy_zO_{12-δ}$ ($0.4<x \leq 1$, $0.4<y \leq 1$, $0.4<z \leq 1$, $0<δ$), $Li_{4\pm x}Ti_{5-y}Ho_zO_{12-δ}$ ($0.4<x \leq 1$, $0.4<y \leq 1$, $0.4<z \leq 1$, $0<δ$), $Li_{4\pm x}Ti_{5-y}Er_zO_{12-δ}$ ($0.4<x \leq 1$, $0.4<y \leq 1$, $0.4<z \leq 1$, $0<δ$), $Li_{4\pm x}Ti_{5-y}Tm_zO_{12-δ}$ ($0.4<x \leq 1$, $0.4<y \leq 1$, $0.4<z \leq 1$, $0<δ$), $Li_{4\pm x}Ti_{5-y}Yb_zO_{12-δ}$ ($0.4<x \leq 1$, $0.4<y \leq 1$, $0.4<z \leq 1$, $0<δ$), $Li_{4\pm x}Ti_{5-y}Lu_zO_{12-δ}$ ($0.4<x \leq 1$, $0.4<y \leq 1$, $0.4<z \leq 1$, $0<δ$), $Li_{4\pm x}Ti_{5-y}Zr_zO_{12-δ}$ ($0.4<x \leq 1$, $0.4<y \leq 1$, $0.4<z \leq 1$, $0<δ$), $Li_{4\pm x}Ti_{5-y}Hf_zO_{12-δ}$ ($0.4<x \leq 1$, $0.4<y \leq 1$, $0.4<z \leq 1$, $0<δ$), $Li_{4\pm x}Ti_{5-y}V_zO_{12-δ}$ ($0.4<x \leq 1$, $0.4<y \leq 1$, $0.4<z \leq 1$, $0<δ$), $Li_{4\pm x}Ti_{5-y}Nb_zO_{12-δ}$ ($0.4<x \leq 1$, $0.4<y \leq 1$, $0.4<z \leq 1$, $0<δ$), $Li_{4\pm x}Ti_{5-y}Ta_zO_{12-δ}$ ($0.4<x \leq 1$, $0.4<y \leq 1$, $0.4<z \leq 1$, $0<δ$), $Li_{4\pm x}Ti_{5-y}Mo_zO_{12-δ}$ ($0.4<x \leq 1$, $0.4<y \leq 1$, $0.4<z \leq 1$, $0<δ$), $Li_{4\pm x}Ti_{5-y}W_zO_{12-δ}$ ($0.4<x \leq 1$, $0.4<y \leq 1$, $0.4<z \leq 1$, $0<δ$), $Li_{4\pm x}Ti_{5-y}Mn_zO_{12-δ}$ ($0.4<x \leq 1$, $0.4<y \leq 1$, $0.4<z \leq 1$, $0<δ$), $Li_{4\pm x}Ti_{5-y}Tc_zO_{12-δ}$ ($0.4<x \leq 1$, $0.4<y \leq 1$, $0.4<z \leq 1$, $0<δ$), $Li_{4\pm x}Ti_{5-y}Re_zO_{12-δ}$ ($0.4<x \leq 1$, $0.4<y \leq 1$, $0.4<z \leq 1$, $0<δ$), $Li_{4\pm x}Ti_{5-y}Fe_zO_{12-δ}$ ($0.4<x \leq 1$, $0.4<y \leq 1$, $0.4<z \leq 1$, $0<δ$), $Li_{4\pm x}Ti_{5-y}Ru_zO_{12-δ}$ ($0.4<x \leq 1$, $0.4<y \leq 1$, $0.4<z \leq 1$, $0<δ$), $Li_{4\pm x}Ti_{5-y}Os_zO_{12-δ}$ ($0.4<x \leq 1$, $0.4<y \leq 1$, $0.4<z \leq 1$, $0<δ$), $Li_{4\pm x}Ti_{5-y}Co_zO_{12-δ}$ ($0.4<x \leq 1$, $0.4<y \leq 1$, $0.4<z \leq 1$, $0<δ$), $Li_{4\pm x}Ti_{5-y}Rh_zO_{12-δ}$ ($0.4<x \leq 1$, $0.4<y \leq 1$, $0.4<z \leq 1$, $0<δ$), $Li_{4\pm x}Ti_{5-y}Ir_zO_{12-δ}$ ($0.4<x \leq 1$, $0.4<y \leq 1$, $0.4<z \leq 1$, $0<δ$), $Li_{4\pm x}Ti_{5-y}Ni_zO_{12-δ}$ ($0.4<x \leq 1$, $0.4<y \leq 1$, $0.4<z \leq 1$, $0<δ$), $Li_{4\pm x}Ti_{5-y}Pd_zO_{12-δ}$ ($0.4<x \leq 1$, $0.4<y \leq 1$, $0.4<z \leq 1$, $0<δ$), $Li_{4\pm x}Ti_{5-y}Pt_zO_{12-δ}$ ($0.4<x \leq 1$, $0.4<y \leq 1$, $0.4<z \leq 1$, $0<δ$), $Li_{4\pm x}Ti_{5-y}Cu_zO_{12-δ}$ ($0.4<x \leq 1$, $0.4<y \leq 1$, $0.4<z \leq 1$, $0<δ$), $Li_{4\pm x}Ti_{5-y}Ag_zO_{12-δ}$ ($0.4<x \leq 1$, $0.4<y \leq 1$, $0.4<z \leq 1$, $0<δ$), $Li_{4\pm x}Ti_{5-y}Au_zO_{12-δ}$ ($0.4<x \leq 1$, $0.4<y \leq 1$, $0.4<z \leq 1$, $0<δ$), $Li_{4\pm x}Ti_{5-y}Zn_zO_{12-δ}$ ($0.4<x \leq 1$, $0.4<y \leq 1$, $0.4<z \leq 1$, $0<δ$), $Li_{4\pm x}Ti_{5-y}Cd_zO_{2-δ}$ ($0.4<x \leq 1$, $0.4<y \leq 1$, $0.4<z \leq 1$, $0<δ$), $Li_{4\pm x}Ti_{5-y}Hg_zO_{12-δ}$ ($0.4<x \leq 1$, $0.4<y \leq 1$, $0.4<z \leq 1$, $0<δ$), $Li_{4\pm x}Ti_{5-y}Al_zO_{12-δ}$ ($0.4<x \leq 1$, $0.4<y \leq 1$, $0.4<z \leq 1$, $0<δ$), $Li_{4\pm x}Ti_{5-y}Ga_zO_{2-δ}$ ($0.4<x \leq 1$, $0.4<y \leq 1$, $0.4<z \leq 1$, $0<δ$), $Li_{4\pm x}Ti_{5-y}In_zO_{12-δ}$ ($0.4<x \leq 1$, $0.4<y \leq 1$, $0.4<z \leq 1$, $0<δ$), $Li_{4\pm x}Ti_{5-y}Tl_zO_{12-δ}$ ($0.4<x \leq 1$, $0.4<y \leq 1$, $0.4<z \leq 1$, $0<δ$), $Li_{4\pm x}Ti_{5-y}Ge_zO_{12-δ}$ ($0.4<x \leq 1$, $0.4<y \leq 1$, $0.4<z \leq 1$, $0<δ$), $Li_{4\pm x}Ti_{5-y}Sn_zO_{12-δ}$ ($0.4<x \leq 1$, $0.4<y \leq 1$, $0.4<z \leq 1$, $0<δ$), $Li_{4\pm x}Ti_{5-y}Pb_zO_{12-δ}$ ($0.4<x \leq 1$, $0.4<y \leq 1$, $0.4<z \leq 1$, $0<δ$), $Li_{4\pm x}Ti_{5-y}Sb_zO_{12-δ}$ ($0.4<x \leq 1$, $0.4<y \leq 1$, $0.4<z \leq 1$, $0<δ$), $Li_{4\pm x}Ti_{5-y}Bi_zO_{12-δ}$ ($0.4<x \leq 1$, $0.4<y \leq 1$, $0.4<z \leq 1$, $0<δ$), $Li_{4\pm x}Ti_{5-y}Po_zO_{12-δ}$ ($0.4<x \leq 1$, $0.4<y \leq 1$, $0.4<z \leq 1$, $0<δ$), $Li_{4\pm x}Ti_{5-y}As_zO_{12-δ}$ ($0.4<x \leq 1$, $0.4<y \leq 1$, $0.4<z \leq 1$, $0<δ$), $Li_{4\pm x}Ti_{5-y}Se_zO_{12-δ}$ ($0.4<x \leq 1$, $0.4<y \leq 1$, $0.4<z \leq 1$, $0<δ$), or $Li_{4\pm x}Ti_{5-y}Te_zO_{12-δ}$ ($0.4<x \leq 1$, $0.4<y \leq 1$, $0.4<z \leq 1$, $0<δ$).

The spinel compound may be, for example, $LiMn_2O_4$, $LiTiNbO_4$, $Li_4Ti_5O_{12}$, $Li_4Mn_5O_{12}$, or $Li_{4.5}Ti_{4.5}Gd_{0.5}O_{12}$.

The lithium-containing metal oxide may include a perovskite compound represented by Formula 4.

$$Li_xA_yG_zO_{3-δ} \quad \text{Formula 4}$$

In Formula 4, A and G may each independently be at least one metal element belonging to Group 2 to Group 16 of the periodic table of the elements, δ may represent a content of oxygen vacancy, $0<x<1$, $0<y<1$, $0<x+y \leq 1$, $0<z \leq 1.5$, and $0 \leq b \leq 1.5$.

The perovskite compound may be a compound having a perovskite crystal structure or a perovskite-like crystal structure.

In Formula 4, A may be at least one of H, Na, K, Rb, Cs, Ca, Sr, Ba, Y, La, Ce, Pr, Nd, Pm, Sm, Gd, Tb, Dy, Ho, or Er, and for example, may be at least one of La, Ce, Pr, Gd, Ca, Sr, or Ba; G may be at least one of Ti, Pd, Pb, Fe, Ir, Co, Rh, Mn, Cr, Ru, Re, Sn, V, Ge, W, Zr, Mo, Hf, U, Nb, Th, Ta, Bi, Li, H, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and for example, may be at least one of Ti, Mn, Ni, Cr, Co, Ru, Ir, Fe, Pd, Pb, Rh, Sn, V, Re, Ge, W, Zr, Mo, Nb, Ta, Hf, or Bi; δ may represent a content of oxygen vacancy; and $0.2<x \leq 0.7$, $0<y \leq 0.7$, $0<x+y<1$, $0<z \leq 1.2$, and $0 \leq δ \leq 1.2$.

For example, the perovskite compound may be a perovskite compound represented by Formula 5.

$$Li_xA1_yG1_zO_{3-δ} \quad \text{Formula 5}$$

In Formula 5, A1 may be at least one of La, Ce, Pr, Gd, Ca, Sr, or Ba; and G1 may be at least one of Ti, Mn, Ni, Cr, Co, Ru, Ir, Fe, Pd, Pb, Rh, Sn, V, Re, Ge, W, Zr, Mo, Nb, Ta, Hf, or Bi; δ may represent a content of oxygen vacancy; and $0.2<x\leq0.5$, $0.4<y\leq0.7$, $0<x+y<1$, $0.8\leq z\leq1.2$, and $0\leq\delta\leq1.0$.

For example, the perovskite compound may have an $ABO_3$ phase in which there are vacancies and lithium is arranged at some A sites, and may have at least one of an orthorhombic, cubic, monoclinic or triclinic crystalline phase with oxygen defects. The perovskite compound may have excellent lithium ion conductivity due to an optimized lithium concentration at the A sites, and an increased electronic conductivity by introduction, into the B sites, of a metal M having a low oxygen vacancy formation energy.

For example, the perovskite compound may include at least one of $Li_{0.34}La_{0.55}TiO_{3-\delta}(0\leq\delta\leq1.0)$, $Li_{0.34}La_{0.55}MnO_{3-\delta}(0\leq\delta\leq1.0)$, $Li_{0.34}La_{0.55}NiO_{3-\delta}(0\leq\delta\leq1.0)$, $Li_{0.34}La_{0.55}CrO_{3-\delta}(0\leq\delta\leq1.0)$, $Li_{0.34}La_{0.55}CoO_{3-\delta}(0\leq\delta\leq1.0)$, $Li_{0.34}La_{0.55}IrO_{3-\delta}(0\leq\delta\leq1.0)$, $Li_{0.34}La_{0.55}RuO_{3-\delta}(0\leq\delta\leq1.0)$, $Li_{0.34}La_{0.55}TiO_{3-\delta}(0\leq\delta\leq1.0)$, $Li_{0.34}La_{0.55}FeO_{3-\delta}(0\leq\delta\leq1.0)$, $Li_{0.34}La_{0.55}PdO_{3-\delta}(0\leq\delta\leq1.0)$, $Li_{0.34}La_{0.55}PbO_{3-\delta}(0\leq\delta\leq1.0)$, $Li_{0.34}La_{0.55}RhO_{3-\delta}(0\leq\delta\leq1.0)$, $Li_{0.34}La_{0.55}SnO_{3-\delta}(0\leq\delta\leq1.0)$, $Li_{0.34}La_{0.55}VO_{3-\delta}(0\leq\delta\leq1.0)$, $Li_{0.34}La_{0.55}ReO_{3-\delta}(0\leq\delta\leq1.0)$, $Li_{0.34}La_{0.55}GeO_{3-\delta}(0\leq\delta\leq1.0)$, $Li_{0.34}La_{0.55}WO_{3-\delta}(0\leq\delta\leq1.0)$, $Li_{0.34}La_{0.55}ZrO_{3-\delta}(0\leq\delta\leq1.0)$, $Li_{0.34}La_{0.55}MoO_{3-\delta}(0\leq\delta\leq1.0)$, $Li_{0.34}La_{0.55}NbO_{3-\delta}(0\leq\delta\leq1.0)$, $Li_{0.34}La_{0.55}TaO_{3-\delta}(0\leq\delta\leq1.0)$, $Li_{0.34}La_{0.55}HfO_{3-\delta}(0\leq\delta\leq1.0)$, $Li_{0.34}La_{0.55}BiO_{3-\delta}(0\leq\delta\leq1.0)$, $Li_{0.10}La_{0.63}TiO_{3-\delta}(0\leq\delta\leq1.0)$, $Li_{0.10}La_{0.63}MnO_{3-\delta}(0\leq\delta\leq1.0)$, $Li_{0.10}La_{0.63}NiO_{3-\delta}(0\leq\delta\leq1.0)$, $Li_{0.10}La_{0.63}CrO_{3-\delta}(0\leq\delta\leq1.0)$, $Li_{0.10}La_{0.63}CoO_{3-\delta}(0\leq\delta\leq1.0)$, $Li_{0.10}La_{0.63}IrO_{3-\delta}(0\leq\delta\leq1.0)$, $Li_{0.10}La_{0.63}RuO_{3-\delta}(0\leq\delta\leq1.0)$, $Li_{0.10}La_{0.63}TiO_{3-\delta}(0\leq\delta\leq1.0)$, $Li_{0.10}La_{0.63}FeO_{3-\delta}(0\leq\delta\leq1.0)$, $Li_{0.10}La_{0.63}PdO_{3-\delta}(0\leq\delta\leq1.0)$, $Li_{0.10}La_{0.63}PbO_{3-\delta}(0\leq\delta\leq1.0)$, $Li_{0.10}La_{0.63}RhO_{3-\delta}(0\leq\delta\leq1.0)$, $Li_{0.10}La_{0.63}SnO_{3-\delta}(0\leq\delta\leq1.0)$, $Li_{0.10}La_{0.63}VO_{3-\delta}(0\leq\delta\leq1.0)$, $Li_{0.10}La_{0.63}ReO_{3-\delta}(0\leq\delta\leq1.0)$, $Li_{0.10}La_{0.63}GeO_{3-\delta}(0\leq\delta\leq1.0)$, $Li_{0.10}La_{0.63}WO_{3-\delta}(0\leq\delta\leq1.0)$, $Li_{0.10}La_{0.63}ZrO_{3-\delta}(0\leq\delta\leq1.0)$, $Li_{0.10}La_{0.63}MoO_{3-\delta}(0\leq\delta\leq1.0)$, $Li_{0.10}La_{0.63}NbO_{3-\delta}(0\leq\delta\leq1.0)$, $Li_{0.10}La_{0.63}TaO_{3-\delta}(0\leq\delta\leq1.0)$, $Li_{0.10}La_{0.63}HfO_{3-\delta}(0\leq\delta\leq1.0)$, $Li_{0.10}La_{0.63}BiO_{3-\delta}(0\leq\delta\leq1.0)$, $Li_{0.20}La_{0.60}TiO_{3-\delta}(0\leq\delta\leq1.0)$, $Li_{0.20}La_{0.60}MnO_{3-\delta}(0\leq\delta\leq1.0)$, $Li_{0.20}La_{0.60}NiO_{3-\delta}(0\leq\delta\leq1.0)$, $Li_{0.20}La_{0.60}CrO_{3-\delta}(0\leq\delta\leq1.0)$, $Li_{0.20}La_{0.60}CoO_{3-\delta}(0\leq\delta\leq1.0)$, $Li_{0.20}La_{0.60}IrO_{3-\delta}(0\leq\delta\leq1.0)$, $Li_{0.20}La_{0.60}RuO_{3-\delta}(0\leq\delta\leq1.0)$, $Li_{0.20}La_{0.60}TiO_{3-\delta}(0\leq\delta\leq1.0)$, $Li_{0.20}La_{0.60}FeO_{3-\delta}(0\leq\delta\leq1.0)$, $Li_{0.20}La_{0.60}PdO_{3-\delta}(0\leq\delta\leq1.0)$, $Li_{0.20}La_{0.60}PbO_{3-\delta}(0\leq\delta\leq1.0)$, $Li_{0.20}La_{0.60}RhO_{3-\delta}(0\leq\delta\leq1.0)$, $Li_{0.20}La_{0.60}SnO_{3-\delta}(0\leq\delta\leq1.0)$, $Li_{0.20}La_{0.60}VO_{3-\delta}(0\leq\delta\leq1.0)$, $Li_{0.20}La_{0.60}ReO_{3-\delta}(0\leq\delta\leq1.0)$, $Li_{0.20}La_{0.60}GeO_{3-\delta}(0\leq\delta\leq1.0)$, $Li_{0.20}La_{0.60}WO_{3-\delta}(0\leq\delta\leq1.0)$, $Li_{0.20}La_{0.60}ZrO_{3-\delta}(0\leq\delta\leq1.0)$, $Li_{0.20}La_{0.60}MoO_{3-\delta}(0\leq\delta\leq1.0)$, $Li_{0.20}La_{0.60}NbO_{3-\delta}(0\leq\delta\leq1.0)$, $Li_{0.20}La_{0.60}TaO_{3-\delta}(0\leq\delta\leq1.0)$, $Li_{0.20}La_{0.60}HfO_{3-\delta}(0\leq\delta\leq1.0)$, $Li_{0.20}La_{0.60}BiO_{3-\delta}(0\leq\delta\leq1.0)$, $Li_{0.30}La_{0.57}TiO_{3-\delta}(0\leq\delta\leq1.0)$, $Li_{0.30}La_{0.57}MnO_{3-\delta}(0\leq\delta\leq1.0)$, $Li_{0.30}La_{0.57}NiO_{3-\delta}(0\leq\delta\leq1.0)$, $Li_{0.30}La_{0.57}CrO_{3-\delta}(0\leq\delta\leq1.0)$, $Li_{0.30}La_{0.57}CoO_{3-\delta}(0\leq\delta\leq1.0)$, $Li_{0.30}La_{0.57}IrO_{3-\delta}(0\leq\delta\leq1.0)$, $Li_{0.30}La_{0.57}RuO_{3-\delta}(0\leq\delta\leq1.0)$, $Li_{0.30}La_{0.57}TiO_{3-\delta}(0\leq\delta\leq1.0)$, $Li_{0.30}La_{0.57}FeO_{3-\delta}(0\leq\delta\leq1.0)$, $Li_{0.30}La_{0.57}PdO_{3-\delta}(0\leq\delta\leq1.0)$, $Li_{0.30}La_{0.57}PbO_{3-\delta}(0\leq\delta\leq1.0)$, $Li_{0.30}La_{0.57}RhO_{3-\delta}(0\leq\delta\leq1.0)$, $Li_{0.30}La_{0.57}SnO_{3-\delta}(0\leq\delta\leq1.0)$, $Li_{0.30}La_{0.57}VO_{3-\delta}(0\leq\delta\leq1.0)$, $Li_{0.30}La_{0.57}ReO_{3-\delta}(0\leq\delta\leq1.0)$, $Li_{0.30}La_{0.57}GeO_{3-\delta}(0\leq\delta\leq1.0)$, $Li_{0.30}La_{0.57}WO_{3-\delta}(0\leq\delta\leq1.0)$, $Li_{0.30}La_{0.57}ZrO_{3-\delta}(0\leq\delta\leq1.0)$, $Li_{0.30}La_{0.57}MoO_{3-\delta}(0\leq\delta\leq1.0)$, $Li_{0.30}La_{0.57}NbO_{3-\delta}(0\leq\delta\leq1.0)$, $Li_{0.30}La_{0.57}TaO_{3-\delta}(0\leq\delta\leq1.0)$, $Li_{0.30}La_{0.57}HfO_{3-\delta}(0\leq\delta\leq1.0)$, $Li_{0.30}La_{0.57}BiO_{3-\delta}(0\leq\delta\leq1.0)$, $Li_{0.40}La_{0.53}TiO_{3-\delta}(0\leq\delta\leq1.0)$, $Li_{0.40}La_{0.53}MnO_{3-\delta}(0\leq\delta\leq1.0)$, $Li_{0.40}La_{0.53}NiO_{3-\delta}(0\leq\delta\leq1.0)$, $Li_{0.40}La_{0.53}CrO_{3-\delta}(0\leq\delta\leq1.0)$, $Li_{0.40}La_{0.53}CoO_{3-\delta}(0\leq\delta\leq1.0)$, $Li_{0.40}La_{0.53}IrO_{3-\delta}(0\leq\delta\leq1.0)$, $Li_{0.40}La_{0.53}RuO_{3-\delta}(0\leq\delta\leq1.0)$, $Li_{0.40}La_{0.53}TiO_{3-\delta}(0\leq\delta\leq1.0)$, $Li_{0.40}La_{0.53}FeO_{3-\delta}(0\leq\delta\leq1.0)$, $Li_{0.40}La_{0.53}PdO_{3-\delta}(0\leq\delta\leq1.0)$, $Li_{0.40}La_{0.53}PbO_{3-\delta}(0\leq\delta\leq1.0)$, $Li_{0.40}La_{0.53}RhO_{3-\delta}(0\leq\delta\leq1.0)$, $Li_{0.40}La_{0.53}SnO_{3-\delta}(0\leq\delta\leq1.0)$, $Li_{0.40}La_{0.53}VO_{3-\delta}(0\leq\delta\leq1.0)$, $Li_{0.40}La_{0.53}ReO_{3-\delta}(0\leq\delta\leq1.0)$, $Li_{0.40}La_{0.53}GeO_{3-\delta}(0\leq\delta\leq1.0)$, $Li_{0.40}La_{0.53}WO_{3-\delta}(0\leq\delta\leq1.0)$, $Li_{0.40}La_{0.53}ZrO_{3-\delta}(0\leq\delta\leq1.0)$, $Li_{0.40}La_{0.53}MoO_{3-\delta}(0\leq\delta\leq1.0)$, $Li_{0.40}La_{0.53}NbO_{3-\delta}(0\leq\delta\leq1.0)$, $Li_{0.40}La_{0.53}TaO_{3-\delta}(0\leq\delta\leq1.0)$, $Li_{0.40}La_{0.53}HfO_{3-\delta}(0\leq\delta\leq1.0)$, $Li_{0.40}La_{0.53}BiO_{3-\delta}(0\leq\delta\leq1.0)$, $Li_{0.45}La_{0.52}TiO_{3-\delta}(0\leq\delta\leq1.0)$, $Li_{0.45}La_{0.52}MnO_{3-\delta}(0\leq\delta\leq1.0)$, $Li_{0.45}La_{0.52}NiO_{3-\delta}(0\leq\delta\leq1.0)$, $Li_{0.45}La_{0.52}CrO_{3-\delta}(0\leq\delta\leq1.0)$, $Li_{0.45}La_{0.52}CoO_{3-\delta}(0\leq\delta\leq1.0)$, $Li_{0.45}La_{0.52}IrO_{3-\delta}(0\leq\delta\leq1.0)$, $Li_{0.45}La_{0.52}RuO_{3-\delta}(0\leq\delta\leq1.0)$, $Li_{0.45}La_{0.52}TiO_{3-\delta}(0\leq\delta\leq1.0)$, $Li_{0.45}La_{0.52}FeO_{3-\delta}(0\leq\delta\leq1.0)$, $Li_{0.45}La_{0.52}PdO_{3-\delta}(0\leq\delta\leq1.0)$, $Li_{0.45}La_{0.52}PbO_{3-\delta}(0\leq\delta\leq1.0)$, $Li_{0.45}La_{0.52}RhO_{3-\delta}(0\leq\delta\leq1.0)$, $Li_{0.45}La_{0.52}SnO_{3-\delta}(0\leq\delta\leq1.0)$, $Li_{0.45}La_{0.52}VO_{3-\delta}(0\leq\delta\leq1.0)$, $Li_{0.45}La_{0.52}ReO_{3-\delta}(0\leq\delta\leq1.0)$, $Li_{0.45}La_{0.52}GeO_{3-\delta}(0\leq\delta\leq1.0)$, $Li_{0.45}La_{0.52}WO_{3-\delta}(0\leq\delta\leq1.0)$, $Li_{0.45}La_{0.52}ZrO_{3-\delta}(0\leq\delta\leq1.0)$, $Li_{0.45}La_{0.52}MoO_{3-\delta}(0\leq\delta\leq1.0)$, $Li_{0.45}La_{0.52}NbO_{3-\delta}(0\leq\delta\leq1.0)$, $Li_{0.45}La_{0.52}TaO_{3-\delta}(0\leq\delta\leq1.0)$, $Li_{0.45}La_{0.52}HfO_{3-\delta}(0\leq\delta\leq1.0)$, $Li_{0.45}La_{0.52}BiO_{3-\delta}(0\leq\delta\leq1.0)$, $Li_{0.34}Ce_{0.55}TiO_{3-\delta}(0\leq\delta\leq1.0)$, $Li_{0.34}Ce_{0.55}MnO_{3-\delta}(0\leq\delta\leq1.0)$, $Li_{0.34}Ce_{0.55}NiO_{3-\delta}(0\leq\delta\leq1.0)$, $Li_{0.34}Ce_{0.55}CrO_{3-\delta}(0\leq\delta\leq1.0)$, $Li_{0.34}Ce_{0.55}CoO_{3-\delta}(0\leq\delta\leq1.0)$, $Li_{0.34}Ce_{0.55}IrO_{3-\delta}(0\leq\delta\leq1.0)$, $Li_{0.34}Ce_{0.55}RuO_{3-\delta}(0\leq\delta\leq1.0)$, $Li_{0.34}Ce_{0.55}TiO_{3-\delta}(0\leq\delta\leq1.0)$, $Li_{0.34}Ce_{0.55}FeO_{3-\delta}(0\leq\delta\leq1.0)$, $Li_{0.34}Ce_{0.55}PdO_{3-\delta}(0\leq\delta\leq1.0)$, $Li_{0.34}Ce_{0.55}PbO_{3-\delta}(0\leq\delta\leq1.0)$, $Li_{0.34}Ce_{0.55}RhO_{3-\delta}(0\leq\delta\leq1.0)$, $Li_{0.34}Ce_{0.55}SnO_{3-\delta}(0\leq\delta\leq1.0)$, $Li_{0.34}Ce_{0.55}VO_{3-\delta}(0\leq\delta\leq1.0)$, $Li_{0.34}Ce_{0.55}ReO_{3-\delta}(0\leq\delta\leq1.0)$, $Li_{0.34}Ce_{0.55}GeO_{3-\delta}(0\leq\delta\leq1.0)$, $Li_{0.34}Ce_{0.55}WO_{3-\delta}(0\leq\delta\leq1.0)$, $Li_{0.34}Ce_{0.55}ZrO_{3-\delta}(0\leq\delta\leq1.0)$, $Li_{0.34}Ce_{0.55}MoO_{3-\delta}(0\leq\delta\leq1.0)$, $Li_{0.34}Ce_{0.55}NbO_{3-\delta}(0\leq\delta\leq1.0)$, $Li_{0.34}Ce_{0.55}TaO_{3-\delta}(0\leq\delta\leq1.0)$, $Li_{0.34}Ce_{0.55}HfO_{3-\delta}(0\leq\delta\leq1.0)$, $Li_{0.34}Ce_{0.55}BiO_{3-\delta}(0\leq\delta\leq1.0)$, $Li_{0.10}Ce_{0.63}TiO_{3-\delta}(0\leq\delta\leq1.0)$, $Li_{0.10}Ce_{0.63}MnO_{3-\delta}(0\leq\delta\leq1.0)$, $Li_{0.10}Ce_{0.63}NiO_{3-\delta}(0\leq\delta\leq1.0)$, $Li_{0.10}Ce_{0.63}CrO_{3-\delta}(0\leq\delta\leq1.0)$, $Li_{0.10}Ce_{0.63}CoO_{3-\delta}(0\leq\delta\leq1.0)$, $Li_{0.10}Ce_{0.63}Ir_{-\delta}(0\leq\delta\leq1.0)_3$, $Li_{0.10}Ce_{0.63}RuO_{3-\delta}(0\leq\delta\leq1.0)$, $Li_{0.10}Ce_{0.63}TiO_{3-\delta}(0\leq\delta\leq1.0)$, $Li_{0.10}Ce_{0.63}FeO_{3-\delta}(0\leq\delta\leq1.0)$, $Li_{0.10}Ce_{0.63}PdO_{3-\delta}(0\leq\delta\leq1.0)$, $Li_{0.10}Ce_{0.63}PbO_{3-\delta}(0\leq\delta\leq1.0)$, $Li_{0.10}Ce_{0.63}RhO_{3-\delta}(0\leq\delta\leq1.0)$, $Li_{0.10}Ce_{0.63}SnO_{3-\delta}(0\leq\delta\leq1.0)$, $Li_{0.10}Ce_{0.63}VO_{3-\delta}(0\leq\delta\leq1.0)$, $Li_{0.10}Ce_{0.63}ReO_{3-\delta}(0\leq\delta\leq1.0)$, $Li_{0.10}Ce_{0.63}GeO_{3-\delta}(0\leq\delta\leq1.0)$, $Li_{0.10}Ce_{0.63}WO_{3-\delta}(0\leq\delta\leq1.0)$, $Li_{0.10}Ce_{0.63}ZrO_{3-\delta}(0\leq\delta\leq1.0)$, $Li_{0.10}Ce_{0.63}MoO_{3-\delta}(0\leq\delta\leq1.0)$, $Li_{0.10}Ce_{0.63}NbO_{3-\delta}(0\leq\delta\leq1.0)$, $Li_{0.10}Ce_{0.63}TaO_{3-\delta}(0\leq\delta\leq1.0)$, $Li_{0.10}Ce_{0.63}HfO_{3-\delta}(0\leq\delta\leq1.0)$, $Li_{0.10}Ce_{0.63}BiO_{3-\delta}(0\leq\delta\leq1.0)$, $Li_{0.20}Ce_{0.60}TiO_{3-\delta}(0\leq\delta\leq1.0)$, $Li_{0.20}Ce_{0.60}MnO_{3-\delta}(0\leq\delta\leq1.0)$, $Li_{0.20}Ce_{0.60}NiO_{3-\delta}(0\leq\delta\leq1.0)$, $Li_{0.20}Ce_{0.60}CrO_{3-\delta}(0\leq\delta\leq1.0)$, $Li_{0.20}Ce_{0.60}CoO_{3-\delta}(0\leq\delta\leq1.0)$, $Li_{0.20}Ce_{0.60}IrO_{3-\delta}(0\leq\delta\leq1.0)$, $Li_{0.20}Ce_{0.60}RuO_{3-\delta}(0\leq\delta\leq1.0)$, $Li_{0.20}Ce_{0.60}TiO_{3-\delta}(0\leq\delta\leq1.0)$, $Li_{0.20}Ce_{0.60}FeO_{3-\delta}(0\leq\delta\leq1.0)$, $Li_{0.20}Ce_{0.60}PdO_{3-\delta}(0\leq\delta\leq1.0)$, $Li_{0.20}Ce_{0.60}PbO_{3-\delta}(0\leq\delta\leq1.0)$, $Li_{0.20}Ce_{0.60}RhO_{3-\delta}(0\leq\delta\leq1.0)$, $Li_{0.20}Ce_{0.60}SnO_{3-\delta}(0\leq\delta\leq1.0)$, $Li_{0.20}Ce_{0.60}VO_{3-\delta}(0\leq\delta\leq1.0)$, $Li_{0.20}Ce_{0.60}ReO_{3-\delta}(0\leq\delta\leq1.0)$, $Li_{0.20}Ce_{0.60}GeO_{3-\delta}(0\leq\delta\leq1.0)$, $Li_{0.20}Ce_{0.60}WO_{3-\delta}(0\leq\delta\leq1.0)$, $Li_{0.20}Ce_{0.60}ZrO_{3-\delta}(0\leq\delta\leq1.0)$, $Li_{0.20}Ce_{0.60}MoO_{3-\delta}(0\leq\delta\leq1.0)$, $Li_{0.20}Ce_{0.60}NbO_{3-\delta}(0\leq\delta\leq1.0)$, $Li_{0.20}Ce_{0.60}TaO_{3-\delta}(0\leq\delta\leq1.0)$, $Li_{0.20}Ce_{0.60}HfO_{3-\delta}(0\leq\delta\leq1.0)$, $Li_{0.20}Ce_{0.60}BiO_{3-\delta}(0\leq\delta\leq1.0)$, $Li_{0.30}Ce_{0.57}TiO_{3-\delta}(0\leq\delta\leq1.0)$, $Li_{0.30}Ce_{0.57}MnO_{3-\delta}(0\leq\delta\leq1.0)$, $Li_{0.30}Ce_{0.57}NiO_{3-\delta}(0\leq\delta\leq1.0)$, $Li_{0.30}Ce_{0.57}CrO_{3-\delta}(0\leq\delta\leq1.0)$, $Li_{0.30}Ce_{0.57}CoO_{3-\delta}(0\leq\delta\leq1.0)$, $Li_{0.30}Ce_{0.57}IrO_{3-\delta}(0\leq\delta\leq1.0)$, $Li_{0.30}Ce_{0.57}RuO_{3-\delta}(0\leq\delta\leq1.0)$, $Li_{0.30}Ce_{0.57}TiO_{3-\delta}(0\leq\delta\leq1.0)$, $Li_{0.30}Ce_{0.57}FeO_{3-\delta}(0\leq\delta\leq1.0)$, $Li_{0.30}Ce_{0.57}PdO_{3-\delta}(0\leq\delta\leq1.0)$, $Li_{0.30}Ce_{0.57}PbO_{3-\delta}(0\leq\delta\leq1.0)$, $Li_{0.30}Ce_{0.57}RhO_{3-\delta}(0\leq\delta\leq1.0)$, $Li_{0.30}Ce_{0.57}SnO_{3-\delta}(0\leq\delta\leq1.0)$, $Li_{0.30}Ce_{0.57}VO_{3-\delta}(0\leq\delta\leq1.0)$, $Li_{0.30}Ce_{0.57}ReO_{3-\delta}(0\leq\delta\leq1.0)$, $Li_{0.30}Ce_{0.57}GeO_{3-\delta}(0\leq\delta\leq1.0)$, $Li_{0.30}Ce_{0.57}WO_{3-\delta}(0\leq\delta\leq1.0)$, $Li_{0.30}Ce_{0.57}ZrO_{3-\delta}(0\leq\delta\leq1.0)$, $Li_{0.30}Ce_{0.57}MoO_{3-\delta}(0\leq\delta\leq1.0)$, $Li_{0.30}Ce_{0.57}NbO_{3-\delta}(0\leq\delta\leq1.0)$, $Li_{0.30}Ce_{0.57}TaO_{3-\delta}(0\leq\delta\leq1.0)$, $Li_{0.30}Ce_{0.57}HfO_{3-\delta}(0\leq\delta\leq1.0)$, $Li_{0.30}Ce_{0.57}BiO_{3-\delta}(0\leq\delta\leq1.0)$, $Li_{0.40}Ce_{0.53}TiO_{3-\delta}(0\leq\delta\leq1.0)$, $Li_{0.40}Ce_{0.53}MnO_{3-\delta}(0\leq\delta\leq1.0)$, $Li_{0.40}Ce_{0.53}NiO_{3-\delta}(0\leq\delta\leq1.0)$, $Li_{0.40}Ce_{0.53}CrO_{3-\delta}(0\leq\delta\leq1.0)$, $Li_{0.40}Ce_{0.53}CoO_{3-\delta}(0\leq\delta\leq1.0)$, $Li_{0.40}Ce_{0.53}IrO_{3-\delta}(0\leq\delta\leq1.0)$, $Li_{0.40}Ce_{0.53}RuO_{3-\delta}(0\leq\delta\leq1.0)$, $Li_{0.40}Ce_{0.53}TiO_{3-\delta}(0\leq\delta\leq1.0)$, $Li_{0.40}Ce_{0.53}FeO_{3-\delta}(0\leq\delta\leq1.0)$, $Li_{0.40}Ce_{0.53}PdO_{3-\delta}(0\leq\delta\leq1.0)$, $Li_{0.40}Ce_{0.53}PbO_{3-\delta}(0\leq\delta\leq1.0)$, $Li_{0.40}Ce_{0.53}RhO_{3-\delta}(0\leq\delta\leq1.0)$, $Li_{0.40}Ce_{0.53}SnO_{3-\delta}(0\leq\delta\leq1.0)$, $Li_{0.40}Ce_{0.53}VO_{3-\delta}(0\leq\delta\leq1.0)$, $Li_{0.40}Ce_{0.53}ReO_{3-\delta}(0\leq\delta\leq1.0)$, $Li_{0.40}Ce_{0.53}GeO_{3-\delta}(0\leq\delta\leq1.0)$, $Li_{0.40}Ce_{0.53}WO_{3-\delta}(0\leq\delta\leq1.0)$, $Li_{0.40}Ce_{0.53}ZrO_{3-\delta}(0\leq\delta\leq1.0)$, $Li_{0.40}Ce_{0.53}MoO_{3-\delta}(0\leq\delta\leq1.0)$, $Li_{0.40}Ce_{0.53}NbO_{3-\delta}(0\leq\delta\leq1.0)$, $Li_{0.40}Ce_{0.53}TaO_{3-\delta}(0\leq\delta\leq1.0)$, $Li_{0.40}Ce_{0.53}HfO_{3-\delta}(0\leq\delta\leq1.0)$, $Li_{0.40}Ce_{0.53}BiO_{3-\delta}(0\leq\delta\leq1.0)$, $Li_{0.45}Ce_{0.52}TiO_{3-\delta}(0\leq\delta\leq1.0)$, $Li_{0.45}Ce_{0.52}MnO_{3-\delta}(0\leq\delta\leq1.0)$, $Li_{0.45}Ce_{0.52}NiO_{3-\delta}(0\leq\delta\leq1.0)$, $Li_{0.45}Ce_{0.52}CrO_{3-\delta}(0\leq\delta\leq1.0)$, $Li_{0.45}Ce_{0.52}CoO_{3-\delta}(0\leq\delta\leq1.0)$, $Li_{0.45}Ce_{0.52}IrO_{3-\delta}(0\leq\delta\leq1.0)$, $Li_{0.45}Ce_{0.52}RuO_{3-\delta}(0\leq\delta\leq1.0)$, $Li_{0.45}Ce_{0.52}TiO_{3-\delta}(0\leq\delta\leq1.0)$, $Li_{0.45}Ce_{0.52}FeO_{3-\delta}(0\leq\delta\leq1.0)$, $Li_{0.45}Ce_{0.52}PdO_{3-\delta}(0\leq\delta\leq1.0)$, $Li_{0.45}Ce_{0.52}PbO_{3-\delta}(0\leq\delta\leq1.0)$, $Li_{0.45}Ce_{0.52}RhO_{3-\delta}(0\leq\delta\leq1.0)$, $Li_{0.45}Ce_{0.52}SnO_{3-\delta}(0\leq\delta\leq1.0)$, $Li_{0.45}Ce_{0.52}VO_{3-\delta}(0\leq\delta\leq1.0)$, $Li_{0.45}Ce_{0.52}ReO_{3-\delta}(0\leq\delta\leq1.0)$, $Li_{0.45}Ce_{0.52}GeO_{3-\delta}(0\leq\delta\leq1.0)$, $Li_{0.45}Ce_{0.52}WO_{3-\delta}(0\leq\delta\leq1.0)$, $Li_{0.45}Ce_{0.52}ZrO_{3-\delta}(0\leq\delta\leq1.0)$, $Li_{0.45}Ce_{0.52}MoO_{3-\delta}(0\leq\delta\leq1.0)$, $Li_{0.45}Ce_{0.52}NbO_{3-\delta}(0\leq\delta\leq1.0)$, $Li_{0.45}Ce_{0.52}TaO_{3-\delta}(0\leq\delta\leq1.0)$, $Li_{0.45}Ce_{0.52}HfO_{3-\delta}(0\leq\delta\leq1.0)$, $Li_{0.45}Ce_{0.52}BiO_{3-\delta}(0\leq\delta\leq1.0)$, $Li_{0.34}Pr_{0.55}TiO_{3-\delta}(0\leq\delta\leq1.0)$, $Li_{0.34}Pr_{0.55}MnO_{3-\delta}(0\leq\delta\leq1.0)$, $Li_{0.34}Pr_{0.55}NiO_{3-\delta}(0\leq\delta\leq1.0)$, $Li_{0.34}Pr_{0.55}CrO_{3-\delta}(0\leq\delta\leq1.0)$, $Li_{0.34}Pr_{0.55}CoO_{3-\delta}(0\leq\delta\leq1.0)$, $Li_{0.34}Pr_{0.55}IrO_{3-\delta}(0\leq\delta\leq1.0)$, $Li_{0.34}Pr_{0.55}RuO_{3-\delta}(0\leq\delta\leq1.0)$, $Li_{0.34}Pr_{0.55}TiO_{3-\delta}(0\leq\delta\leq1.0)$, $Li_{0.34}Pr_{0.55}FeO_{3-\delta}(0\leq\delta\leq1.0)$, $Li_{0.34}Pr_{0.55}PdO_{3-\delta}(0\leq\delta\leq1.0)$, $Li_{0.34}Pr_{0.55}PbO_{3-\delta}(0\leq\delta\leq1.0)$, $Li_{0.34}Pr_{0.55}RhO_{3-\delta}(0\leq\delta\leq1.0)$, $Li_{0.34}Pr_{0.55}SnO_{3-\delta}(0\leq\delta\leq1.0)$, $Li_{0.34}Pr_{0.55}VO_{3-\delta}(0\leq\delta\leq1.0)$, $Li_{0.34}Pr_{0.55}ReO_{3-\delta}(0\leq\delta\leq1.0)$, $Li_{0.34}Pr_{0.55}GeO_{3-\delta}(0\leq\delta\leq1.0)$, $Li_{0.34}Pr_{0.55}WO_{3-\delta}(0\leq\delta\leq1.0)$, $Li_{0.34}Pr_{0.55}ZrO_{3-\delta}(0\leq\delta\leq1.0)$, $Li_{0.34}Pr_{0.55}MoO_{3-\delta}(0\leq\delta\leq1.0)$, $Li_{0.34}Pr_{0.55}NbO_{3-\delta}(0\leq\delta\leq1.0)$, $Li_{0.34}Pr_{0.55}TaO_{3-\delta}(0\leq\delta\leq1.0)$, $Li_{0.34}Pr_{0.55}HfO_{3-\delta}(0\leq\delta\leq1.0)$, $Li_{0.34}Pr_{0.55}BiO_{3-\delta}(0\leq\delta\leq1.0)$, $Li_{0.10}Pr_{0.63}TiO_{3-\delta}(0\leq\delta\leq1.0)$, $Li_{0.10}Pr_{0.63}MnO_{3-\delta}(0\leq\delta\leq1.0)$, $Li_{0.10}Pr_{0.63}NiO_{3-\delta}(0\leq\delta\leq1.0)$, $Li_{0.10}Pr_{0.63}CrO_{3-\delta}(0\leq\delta\leq1.0)$, $Li_{0.10}Pr_{0.63}CoO_{3-\delta}(0\leq\delta\leq1.0)$, $Li_{0.10}Pr_{0.63}IrO_{3-\delta}(0\leq\delta\leq1.0)$, $Li_{0.10}Pr_{0.63}RuO_{3-\delta}(0\leq\delta\leq1.0)$, $Li_{0.10}Pr_{0.63}TiO_{3-\delta}(0\leq\delta\leq1.0)$, $Li_{0.10}Pr_{0.63}FeO_{3-\delta}(0\leq\delta\leq1.0)$, $Li_{0.10}Pr_{0.63}PdO_{3-\delta}(0\leq\delta\leq1.0)$, $Li_{0.10}Pr_{0.63}PbO_{3-\delta}(0\leq\delta\leq1.0)$, $Li_{0.10}Pr_{0.63}RhO_{3-\delta}(0\leq\delta\leq1.0)$, $Li_{0.10}Pr_{0.63}SnO_{3-\delta}(0\leq\delta\leq1.0)$, $Li_{0.10}Pr_{0.63}VO_{3-\delta}(0\leq\delta\leq1.0)$, $Li_{0.10}Pr_{0.63}ReO_{3-\delta}(0\leq\delta\leq1.0)$, $Li_{0.10}Pr_{0.63}GeO_{3-\delta}(0\leq\delta\leq1.0)$, $Li_{0.10}Pr_{0.63}WO_{3-\delta}(0\leq\delta\leq1.0)$, $Li_{0.10}Pr_{0.63}ZrO_{3-\delta}(0\leq\delta\leq1.0)$, $Li_{0.10}Pr_{0.63}MoO_{3-\delta}(0\leq\delta\leq1.0)$, $Li_{0.10}Pr_{0.63}NbO_{3-\delta}(0\leq\delta\leq1.0)$, $Li_{0.10}Pr_{0.63}TaO_{3-\delta}(0\leq\delta\leq1.0)$, $Li_{0.10}Pr_{0.63}HfO_{3-\delta}(0\leq\delta\leq1.0)$, $Li_{0.10}Pr_{0.63}BiO_{3-\delta}(0\leq\delta\leq1.0)$, $Li_{0.20}Pr_{0.60}TiO_{3-\delta}(0\leq\delta\leq1.0)$, $Li_{0.20}Pr_{0.60}MnO_{3-\delta}(0\leq\delta\leq1.0)$, $Li_{0.20}Pr_{0.60}NiO_{3-\delta}(0\leq\delta\leq1.0)$, $Li_{0.20}Pr_{0.60}CrO_{3-\delta}(0\leq\delta\leq1.0)$, $Li_{0.20}Pr_{0.60}CoO_{3-\delta}(0\leq\delta\leq1.0)$, $Li_{0.20}Pr_{0.60}IrO_{3-\delta}(0\leq\delta\leq1.0)$, $Li_{0.20}Pr_{0.60}RuO_{3-\delta}(0\leq\delta\leq1.0)$, $Li_{0.20}Pr_{0.60}TiO_{3-\delta}(0\leq\delta\leq1.0)$, $Li_{0.20}Pr_{0.60}FeO_{3-\delta}(0\leq\delta\leq1.0)$, $Li_{0.20}Pr_{0.60}PdO_{3-\delta}(0\leq\delta\leq1.0)$, $Li_{0.20}Pr_{0.60}PbO_{3-\delta}(0\leq\delta\leq1.0)$, $Li_{0.20}Pr_{0.60}RhO_{3-\delta}(0\leq\delta\leq1.0)$, $Li_{0.20}Pr_{0.60}SnO_{3-\delta}(0\leq\delta\leq1.0)$, $Li_{0.20}Pr_{0.60}VO_{3-\delta}(0\leq\delta\leq1.0)$, $Li_{0.20}Pr_{0.60}ReO_{3-\delta}(0\leq\delta\leq1.0)$, $Li_{0.20}Pr_{0.60}GeO_{3-\delta}(0\leq\delta\leq1.0)$, $Li_{0.20}Pr_{0.60}WO_{3-\delta}(0\leq\delta\leq1.0)$, $Li_{0.20}Pr_{0.60}ZrO_{3-\delta}(0\leq\delta\leq1.0)$, $Li_{0.20}Pr_{0.60}MoO_{3-\delta}(0\leq\delta\leq1.0)$, $Li_{0.20}Pr_{0.60}NbO_{3-\delta}(0\leq\delta\leq1.0)$, $Li_{0.20}Pr_{0.60}TaO_{3-\delta}(0\leq\delta\leq1.0)$, $Li_{0.20}Pr_{0.60}HfO_{3-\delta}(0\leq\delta\leq1.0)$, $Li_{0.20}Pr_{0.60}BiO_{3-\delta}(0\leq\delta\leq1.0)$, $Li_{0.30}Pr_{0.57}TiO_{3-\delta}(0\leq\delta\leq1.0)$, $Li_{0.30}Pr_{0.57}MnO_{3-\delta}(0\leq\delta\leq1.0)$, $Li_{0.30}Pr_{0.57}NiO_{3-\delta}(0\leq\delta\leq1.0)$, $Li_{0.30}Pr_{0.57}CrO_{3-\delta}(0\leq\delta\leq1.0)$, $Li_{0.30}Pr_{0.57}CoO_{3-\delta}(0\leq\delta\leq1.0)_3$, $Li_{0.30}Pr_{0.57}IrO_{3-\delta}(0\leq\delta\leq1.0)$, $Li_{0.30}Pr_{0.57}RuO_{3-\delta}(0\leq\delta\leq1.0)$, $Li_{0.30}Pr_{0.57}TiO_{3-\delta}(0\leq\delta\leq1.0)$, $Li_{0.30}Pr_{0.57}FeO_{3-\delta}(0\leq\delta\leq1.0)$, $Li_{0.30}Pr_{0.57}PdO_{3-\delta}(0\leq\delta\leq1.0)$, $Li_{0.30}Pr_{0.57}PbO_{3-\delta}(0\leq\delta\leq1.0)$, $Li_{0.30}Pr_{0.57}RhO_{3-\delta}(0\leq\delta\leq1.0)$, $Li_{0.30}Pr_{0.57}SnO_{3-\delta}(0\leq\delta\leq1.0)$, $Li_{0.30}Pr_{0.57}VO_{3-\delta}(0\leq\delta\leq1.0)$, $Li_{0.30}Pr_{0.57}ReO_{3-\delta}(0\leq\delta\leq1.0)$, $Li_{0.30}Pr_{0.57}GeO_{3-\delta}(0\leq\delta\leq1.0)$, $Li_{0.30}Pr_{0.57}WO_{3-\delta}(0\leq\delta\leq1.0)$, $Li_{0.30}Pr_{0.57}ZrO_{3-\delta}(0\leq\delta\leq1.0)$, $Li_{0.30}Pr_{0.57}MoO_{3-\delta}(0\leq\delta\leq1.0)$, $Li_{0.30}Pr_{0.57}NbO_{3-\delta}(0\leq\delta\leq1.0)$, $Li_{0.30}Pr_{0.57}TaO_{3-\delta}(0\leq\delta\leq1.0)$, $Li_{0.30}Pr_{0.57}HfO_{3-\delta}(0\leq\delta\leq1.0)$, $Li_{0.30}Pr_{0.57}BiO_{3-\delta}(0\leq\delta\leq1.0)$, $Li_{0.40}Pr_{0.53}TiO_{3-\delta}(0\leq\delta\leq1.0)$, $Li_{0.40}Pr_{0.53}MnO_{3-\delta}(0\leq\delta\leq1.0)$, $Li_{0.40}Pr_{0.53}NiO_{3-\delta}(0\leq\delta\leq1.0)$, $Li_{0.40}Pr_{0.53}CrO_{3-\delta}(0\leq\delta\leq1.0)$, $Li_{0.40}Pr_{0.53}CoO_{3-\delta}(0\leq\delta\leq1.0)$, $Li_{0.40}Pr_{0.53}IrO_{3-\delta}(0\leq\delta\leq1.0)$, $Li_{0.40}Pr_{0.53}RuO_{3-\delta}(0\leq\delta\leq1.0)$, $Li_{0.40}Pr_{0.53}TiO_{3-\delta}(0\leq\delta\leq1.0)$, $Li_{0.40}Pr_{0.53}FeO_{3-\delta}(0\leq\delta\leq1.0)$, $Li_{0.40}Pr_{0.53}PdO_{3-\delta}(0\leq\delta\leq1.0)$, $Li_{0.40}Pr_{0.53}PbO_{3-\delta}(0\leq\delta\leq1.0)$, $Li_{0.40}Pr_{0.53}RhO_{3-\delta}(0\leq\delta\leq1.0)$, $Li_{0.40}Pr_{0.53}SnO_{3-\delta}(0\leq\delta\leq1.0)$, $Li_{0.40}Pr_{0.53}VO_{3-\delta}(0\leq\delta\leq1.0)$, $Li_{0.40}Pr_{0.53}ReO_{3-\delta}(0\leq\delta\leq1.0)$, $Li_{0.40}Pr_{0.53}GeO_{3-\delta}(0\leq\delta\leq1.0)$, $Li_{0.40}Pr_{0.53}WO_{3-\delta}(0\leq\delta\leq1.0)$, $Li_{0.40}Pr_{0.53}ZrO_{3-\delta}(0\leq\delta\leq1.0)$, $Li_{0.40}Pr_{0.53}MoO_{3-\delta}(0\leq\delta\leq1.0)$, $Li_{0.40}Pr_{0.53}NbO_{3-\delta}(0\leq\delta\leq1.0)$, $Li_{0.40}Pr_{0.53}TaO_{3-\delta}(0\leq\delta\leq1.0)$, $Li_{0.40}Pr_{0.53}HfO_{3-\delta}(0\leq\delta\leq1.0)$, $Li_{0.40}Pr_{0.53}BiO_{3-\delta}(0\leq\delta\leq1.0)$, $Li_{0.45}Pr_{0.52}TiO_{3-\delta}(0\leq\delta\leq1.0)$, $Li_{0.45}Pr_{0.52}MnO_{3-\delta}(0\leq\delta\leq1.0)$, $Li_{0.45}Pr_{0.52}NiO_{3-\delta}(0\leq\delta\leq1.0)$, $Li_{0.45}Pr_{0.52}CrO_{3-\delta}(0\leq\delta\leq1.0)$, $Li_{0.45}Pr_{0.52}CoO_{3-\delta}(0\leq\delta\leq1.0)$, $Li_{0.45}Pr_{0.52}IrO_{3-\delta}(0\leq\delta\leq1.0)$, $Li_{0.45}Pr_{0.52}RuO_{3-\delta}(0\leq\delta\leq1.0)$, $Li_{0.45}Pr_{0.52}TiO_{3-\delta}(0\leq\delta\leq1.0)$, $Li_{0.45}Pr_{0.52}FeO_{3-\delta}(0\leq\delta\leq1.0)$, $Li_{0.45}Pr_{0.52}PdO_{3-\delta}(0\leq\delta\leq1.0)$, $Li_{0.45}Pr_{0.52}PbO_{3-\delta}(0\leq\delta\leq1.0)$, $Li_{0.45}Pr_{0.52}RhO_{3-\delta}(0\leq\delta\leq1.0)$, $Li_{0.45}Pr_{0.52}SnO_{3-\delta}(0\leq\delta\leq1.0)$, $Li_{0.45}Pr_{0.52}VO_{3-\delta}(0\leq\delta\leq1.0)$, $Li_{0.45}Pr_{0.52}ReO_{3-\delta}(0\leq\delta\leq1.0)$, $Li_{0.45}Pr_{0.52}GeO_{3-\delta}(0\leq\delta\leq1.0)$, $Li_{0.45}Pr_{0.52}WO_{3-\delta}(0\leq\delta\leq1.0)$, $Li_{0.45}Pr_{0.52}ZrO_{3-\delta}(0\leq\delta\leq1.0)$, $Li_{0.45}Pr_{0.52}MoO_{3-\delta}(0\leq\delta\leq1.0)$, $Li_{0.45}Pr_{0.52}NbO_{3-\delta}(0\leq\delta\leq1.0)$, $Li_{0.45}Pr_{0.52}TaO_{3-\delta}(0\leq\delta\leq1.0)$, $Li_{0.45}Pr_{0.52}HfO_{3-\delta}(0\leq\delta\leq1.0)$, $Li_{0.45}Pr_{0.52}BiO_{3-\delta}(0\leq\delta\leq1.0)$, $Li_{0.10}Ca_{0.80}TiO_{3-\delta}(0\leq\delta\leq1.0)$, $Li_{0.10}Ca_{0.80}MnO_{3-\delta}(0\leq\delta\leq1.0)$, $Li_{0.10}Ca_{0.80}NiO_{3-\delta}(0\leq\delta\leq1.0)$, $Li_{0.10}Ca_{0.80}CrO_{3-\delta}(0\leq\delta\leq1.0)$, $Li_{0.10}Ca_{0.80}CoO_{3-\delta}(0\leq\delta\leq1.0)$, $Li_{0.10}Ca_{0.80}IrO_{3-\delta}(0\leq\delta\leq1.0)$, $Li_{0.10}Ca_{0.80}RuO_{3-\delta}(0\leq\delta\leq1.0)$, $Li_{0.10}Ca_{0.80}TiO_{3-\delta}(0\leq\delta\leq1.0)$, $Li_{0.10}Ca_{0.80}FeO_{3-\delta}(0\leq\delta\leq1.0)$, $Li_{0.10}Ca_{0.80}PdO_{3-\delta}(0\leq\delta\leq1.0)$, $Li_{0.10}Ca_{0.80}PbO_{3-\delta}(0\leq\delta\leq1.0)$, $Li_{0.10}Ca_{0.80}RhO_{3-\delta}(0\leq\delta\leq1.0)$, $Li_{0.10}Ca_{0.80}SnO_{3-\delta}(0\leq\delta\leq1.0)$, $Li_{0.10}Ca_{0.80}VO_{3-\delta}(0\leq\delta\leq1.0)$, $Li_{0.10}Ca_{0.80}ReO_{3-\delta}(0\leq\delta\leq1.0)$, $Li_{0.10}Ca_{0.80}GeO_{3-\delta}(0\leq\delta\leq1.0)$, $Li_{0.10}Ca_{0.80}WO_{3-\delta}(0\leq\delta\leq1.0)$, $Li_{0.10}Ca_{0.80}ZrO_{3-\delta}(0\leq\delta\leq1.0)$, $Li_{0.10}Ca_{0.80}MoO_{3-\delta}(0\leq\delta\leq1.0)$, $Li_{0.10}Ca_{0.80}NbO_{3-\delta}(0\leq\delta\leq1.0)$, $Li_{0.10}Ca_{0.80}TaO_{3-\delta}(0\leq\delta\leq1.0)$, $Li_{0.10}Ca_{0.80}HfO_{3-\delta}(0\leq\delta\leq1.0)$, $Li_{0.10}Ca_{0.80}BiO_{3-\delta}(0\leq\delta\leq1.0)$, $Li_{0.20}Ca_{0.60}TiO_{3-\delta}(0\leq\delta\leq1.0)$, $Li_{0.20}Ca_{0.60}MnO_{3-\delta}(0\leq\delta\leq1.0)$, $Li_{0.20}Ca_{0.60}NiO_{3-\delta}(0\leq\delta\leq1.0)$, $Li_{0.20}Ca_{0.60}CrO_{3-\delta}(0\leq\delta\leq1.0)$, $Li_{0.20}Ca_{0.60}CoO_{3-\delta}(0\leq\delta\leq1.0)$, $Li_{0.20}Ca_{0.60}IrO_{3-\delta}(0\leq\delta\leq1.0)$, $Li_{0.20}Ca_{0.60}RuO_{3-\delta}(0\leq\delta\leq1.0)$, $Li_{0.20}Ca_{0.60}TiO_{3-\delta}(0\leq\delta\leq1.0)$, $Li_{0.20}Ca_{0.60}FeO_{3-\delta}(0\leq\delta\leq1.0)$, $Li_{0.20}Ca_{0.60}PdO_{3-\delta}(0\leq\delta\leq1.0)$, $Li_{0.20}Ca_{0.60}PbO_{3-\delta}(0\leq\delta\leq1.0)$, $Li_{0.20}Ca_{0.60}RhO_{3-\delta}(0\leq\delta\leq1.0)$, $Li_{0.20}Ca_{0.60}SnO_{3-\delta}(0\leq\delta\leq1.0)$, $Li_{0.20}Ca_{0.60}VO_{3-\delta}(0\leq\delta\leq1.0)$, $Li_{0.20}Ca_{0.60}ReO_{3-\delta}(0\leq\delta\leq1.0)$, $Li_{0.20}Ca_{0.60}GeO_{3-\delta}(0\leq\delta\leq$ 1.0), Li$_{0.20}$Ca$_{0.60}$WO$_{3-\delta}$(0≤δ≤1.0), Li$_{0.20}$Ca$_{0.60}$ZrO$_{3-\delta}$(0≤δ≤1.0), Li$_{0.20}$Ca$_{0.60}$MoO$_{3-\delta}$(0≤δ≤1.0), Li$_{0.20}$Ca$_{0.60}$NbO$_{3-\delta}$(0≤δ≤1.0), Li$_{0.20}$Ca$_{0.60}$TaO$_{3-\delta}$(0≤δ≤1.0), Li$_{0.20}$Ca$_{0.60}$HfO$_{3-\delta}$(0≤δ≤1.0), Li$_{0.20}$Ca$_{0.60}$BiO$_{3-\delta}$(0≤δ≤1.0), Li$_{0.25}$Ca$_{0.50}$TiO$_{3-\delta}$(0≤δ≤1.0), Li$_{0.25}$Ca$_{0.50}$MnO$_{3-\delta}$(0≤δ≤1.0), Li$_{0.25}$Ca$_{0.50}$NiO$_{3-\delta}$(0≤δ≤1.0), Li$_{0.25}$Ca$_{0.50}$CrO$_{3-\delta}$(0≤δ≤1.0), Li$_{0.25}$Ca$_{0.50}$CoO$_{3-\delta}$(0≤δ≤1.0), Li$_{0.25}$Ca$_{0.50}$IrO$_{3-\delta}$(0≤δ≤1.0), Li$_{0.25}$Ca$_{0.50}$RuO$_{3-\delta}$(0≤δ≤1.0), Li$_{0.25}$Ca$_{0.50}$TiO$_{3-\delta}$(0≤δ≤1.0), Li$_{0.25}$Ca$_{0.50}$FeO$_{3-\delta}$(0≤δ≤1.0), Li$_{0.25}$Ca$_{0.50}$PdO$_{3-\delta}$(0≤δ≤1.0), Li$_{0.25}$Ca$_{0.50}$PbO$_{3-\delta}$(0≤δ≤1.0), Li$_{0.25}$Ca$_{0.50}$RhO$_{3-\delta}$(0≤δ≤1.0), Li$_{0.25}$Ca$_{0.50}$SnO$_{3-\delta}$(0≤δ≤1.0), Li$_{0.25}$Ca$_{0.50}$VO$_{3-\delta}$(0≤δ≤1.0), Li$_{0.25}$Ca$_{0.50}$ReO$_{3-\delta}$(0≤δ≤1.0), Li$_{0.25}$Ca$_{0.50}$GeO$_{3-\delta}$(0≤δ≤1.0), Li$_{0.25}$Ca$_{0.50}$WO$_{3-\delta}$(0≤δ≤1.0), Li$_{0.25}$Ca$_{0.50}$ZrO$_{3-\delta}$(0≤δ≤1.0), Li$_{0.25}$Ca$_{0.50}$MoO$_{3-\delta}$(0≤δ≤1.0), Li$_{0.25}$Ca$_{0.50}$NbO$_{3-\delta}$(0≤δ≤1.0), Li$_{0.25}$Ca$_{0.50}$TaO$_{3-\delta}$(0≤δ≤1.0), Li$_{0.25}$Ca$_{0.50}$HfO$_{3-\delta}$(0≤δ≤1.0), Li$_{0.25}$Ca$_{0.50}$BiO$_{3-\delta}$(0≤δ≤1.0), Li$_{0.30}$Ca$_{0.40}$TiO$_{3-\delta}$(0≤δ≤1.0), Li$_{0.30}$Ca$_{0.40}$MnO$_{3-\delta}$(0≤δ≤1.0), Li$_{0.30}$Ca$_{0.40}$NiO$_{3-\delta}$(0≤δ≤1.0), Li$_{0.30}$Ca$_{0.40}$CrO$_{3-\delta}$(0≤δ≤1.0), Li$_{0.30}$Ca$_{0.40}$CoO$_{3-\delta}$(0≤δ≤1.0), Li$_{0.30}$Ca$_{0.40}$IrO$_{3-\delta}$(0≤δ≤1.0), Li$_{0.30}$Ca$_{0.40}$RuO$_{3-\delta}$(0≤δ≤1.0), Li$_{0.30}$Ca$_{0.40}$TiO$_{3-\delta}$(0≤δ≤1.0), Li$_{0.30}$Ca$_{0.40}$FeO$_{3-\delta}$(0≤δ≤1.0), Li$_{0.30}$Ca$_{0.40}$PdO$_{3-\delta}$(0≤δ≤1.0), Li$_{0.30}$Ca$_{0.40}$PbO$_{3-\delta}$(0≤δ≤1.0), Li$_{0.30}$Ca$_{0.40}$RhO$_{3-\delta}$(0≤δ≤1.0), Li$_{0.30}$Ca$_{0.40}$SnO$_{3-\delta}$(0≤δ≤1.0), Li$_{0.30}$Ca$_{0.40}$VO$_{3-\delta}$(0≤δ≤1.0), Li$_{0.30}$Ca$_{0.40}$ReO$_{3-\delta}$(0≤δ≤1.0), Li$_{0.30}$Ca$_{0.40}$GeO$_{3-\delta}$(0≤δ≤1.0), Li$_{0.30}$Ca$_{0.40}$WO$_{3-\delta}$(0≤δ≤1.0), Li$_{0.30}$Ca$_{0.40}$ZrO$_{3-\delta}$(0≤δ≤1.0), Li$_{0.30}$Ca$_{0.40}$MoO$_{3-\delta}$(0≤δ≤1.0), Li$_{0.30}$Ca$_{0.40}$NbO$_{3-\delta}$(0≤δ≤1.0), Li$_{0.30}$Ca$_{0.40}$TaO$_{3-\delta}$(0≤δ≤1.0), Li$_{0.30}$Ca$_{0.40}$HfO$_{3-\delta}$(0≤δ≤1.0), Li$_{0.30}$Ca$_{0.40}$BiO$_{3-\delta}$(0≤δ≤1.0), Li$_{0.40}$Ca$_{0.20}$TiO$_{3-\delta}$(0≤δ≤1.0), Li$_{0.40}$Ca$_{0.20}$MnO$_{3-\delta}$(0≤δ≤1.0), Li$_{0.40}$Ca$_{0.20}$NiO$_{3-\delta}$(0≤δ≤1.0), Li$_{0.40}$Ca$_{0.20}$CrO$_{3-\delta}$(0≤δ≤1.0), Li$_{0.40}$Ca$_{0.20}$CoO$_{3-\delta}$(0≤δ≤1.0), Li$_{0.40}$Ca$_{0.20}$IrO$_{3-\delta}$(0≤δ≤1.0), Li$_{0.40}$Ca$_{0.20}$RuO$_{3-\delta}$(0≤δ≤1.0), Li$_{0.40}$Ca$_{0.20}$TiO$_{3-\delta}$(0≤δ≤1.0), Li$_{0.40}$Ca$_{0.20}$FeO$_{3-\delta}$(0≤δ≤1.0), Li$_{0.40}$Ca$_{0.20}$PdO$_{3-\delta}$(0≤δ≤1.0), Li$_{0.40}$Ca$_{0.20}$PbO$_{3-\delta}$(0≤δ≤1.0), Li$_{0.40}$Ca$_{0.20}$RhO$_{3-\delta}$(0≤δ≤1.0), Li$_{0.40}$Ca$_{0.20}$SnO$_{3-\delta}$(0≤δ≤1.0), Li$_{0.40}$Ca$_{0.20}$VO$_{3-\delta}$(0≤δ≤1.0), Li$_{0.40}$Ca$_{0.20}$ReO$_{3-\delta}$(0≤δ≤1.0), Li$_{0.40}$Ca$_{0.20}$GeO$_{3-\delta}$(0≤δ≤1.0), Li$_{0.40}$Ca$_{0.20}$WO$_{3-\delta}$(0≤δ≤1.0), Li$_{0.40}$Ca$_{0.20}$ZrO$_{3-\delta}$(0≤δ≤1.0), Li$_{0.40}$Ca$_{0.20}$MoO$_{3-\delta}$(0≤δ≤1.0), Li$_{0.40}$Ca$_{0.20}$NbO$_{3-\delta}$(0≤δ≤1.0), Li$_{0.40}$Ca$_{0.20}$TaO$_{3-\delta}$(0≤δ≤1.0), Li$_{0.40}$Ca$_{0.20}$HfO$_{3-\delta}$(0≤δ≤1.0), Li$_{0.40}$Ca$_{0.20}$BiO$_{3-\delta}$(0≤δ≤1.0), Li$_{0.10}$Sr$_{0.80}$TiO$_{3-\delta}$(0≤δ≤1.0), Li$_{0.10}$Sr$_{0.80}$MnO$_{3-\delta}$(0≤δ≤1.0), Li$_{0.10}$Sr$_{0.80}$NiO$_{3-\delta}$(0≤δ≤1.0), Li$_{0.10}$Sr$_{0.80}$CrO$_{3-\delta}$(0≤δ≤1.0), Li$_{0.10}$Sr$_{0.80}$CoO$_{3-\delta}$(0≤δ≤1.0), Li$_{0.10}$Sr$_{0.80}$IrO$_{3-\delta}$(0≤δ≤1.0), Li$_{0.10}$Sr$_{0.80}$RuO$_{3-\delta}$(0≤δ≤1.0), Li$_{0.10}$Sr$_{0.80}$TiO$_{3-\delta}$(0≤δ≤1.0), Li$_{0.10}$Sr$_{0.80}$FeO$_{3-\delta}$(0≤δ≤1.0), Li$_{0.10}$Sr$_{0.80}$PdO$_{3-\delta}$(0≤δ≤1.0), Li$_{0.10}$Sr$_{0.80}$PbO$_{3-\delta}$(0≤δ≤1.0), Li$_{0.10}$Sr$_{0.80}$RhO$_{3-\delta}$(0≤δ≤1.0), Li$_{0.10}$Sr$_{0.80}$SnO$_{3-\delta}$(0≤δ≤1.0), Li$_{0.10}$Sr$_{0.80}$VO$_{3-\delta}$(0≤δ≤1.0), Li$_{0.10}$Sr$_{0.80}$ReO$_{3-\delta}$(0≤δ≤1.0), Li$_{0.10}$Sr$_{0.80}$GeO$_{3-\delta}$(0≤δ≤1.0), Li$_{0.10}$Sr$_{0.80}$WO$_{3-\delta}$(0≤δ≤1.0), Li$_{0.10}$Sr$_{0.80}$ZrO$_{3-\delta}$(0≤δ≤1.0), Li$_{0.10}$Sr$_{0.80}$MoO$_{3-\delta}$(0≤δ≤1.0), Li$_{0.10}$Sr$_{0.80}$NbO$_{3-\delta}$(0≤δ≤1.0), Li$_{0.10}$Sr$_{0.80}$TaO$_{3-\delta}$(0≤δ≤1.0), Li$_{0.10}$Sr$_{0.80}$HfO$_{3-\delta}$(0≤δ≤1.0), Li$_{0.10}$Sr$_{0.80}$BiO$_{3-\delta}$(0≤δ≤1.0), Li$_{0.20}$Sr$_{0.60}$TiO$_{3-\delta}$(0≤δ≤1.0), Li$_{0.20}$Sr$_{0.60}$MnO$_{3-\delta}$(0≤δ≤1.0), Li$_{0.20}$Sr$_{0.60}$NiO$_{3-\delta}$(0≤δ≤1.0), Li$_{0.20}$Sr$_{0.60}$CrO$_{3-\delta}$(0≤δ≤1.0), Li$_{0.20}$Sr$_{0.60}$CoO$_{3-\delta}$(0≤δ≤1.0), Li$_{0.20}$Sr$_{0.60}$IrO$_{3-\delta}$(0≤δ≤1.0), Li$_{0.20}$Sr$_{0.60}$RuO$_{3-\delta}$(0≤δ≤1.0), Li$_{0.20}$Sr$_{0.60}$TiO$_{3-\delta}$(0≤δ≤1.0), Li$_{0.20}$Sr$_{0.60}$FeO$_{3-\delta}$(0≤δ≤1.0), Li$_{0.20}$Sr$_{0.60}$PdO$_{3-\delta}$(0≤δ≤1.0), Li$_{0.20}$Sr$_{0.60}$PbO$_{3-\delta}$(0≤δ≤1.0), Li$_{0.20}$Sr$_{0.60}$RhO$_{3-\delta}$(0≤δ≤1.0), Li$_{0.20}$Sr$_{0.60}$SnO$_{3-\delta}$(0≤δ≤1.0), Li$_{0.20}$Sr$_{0.60}$VO$_{3-\delta}$(0≤δ≤1.0), Li$_{0.20}$Sr$_{0.60}$ReO$_{3-\delta}$(0≤δ≤1.0), Li$_{0.20}$Sr$_{0.60}$GeO$_{3-\delta}$(0≤δ≤1.0), Li$_{0.20}$Sr$_{0.60}$WO$_{3-\delta}$(0≤δ≤1.0), Li$_{0.20}$Sr$_{0.60}$ZrO$_{3-\delta}$(0≤δ≤1.0), Li$_{0.20}$Sr$_{0.60}$MoO$_{3-\delta}$(0≤δ≤1.0), Li$_{0.20}$Sr$_{0.60}$NbO$_{3-\delta}$(0≤δ≤1.0), Li$_{0.20}$Sr$_{0.60}$TaO$_{3-\delta}$(0≤δ≤1.0), Li$_{0.20}$Sr$_{0.60}$HfO$_{3-\delta}$(0≤δ≤1.0), Li$_{0.20}$Sr$_{0.60}$BiO$_{3-\delta}$(0≤δ≤1.0), Li$_{0.25}$Sr$_{0.50}$TiO$_{3-\delta}$(0≤δ≤1.0), Li$_{0.25}$Sr$_{0.50}$MnO$_{3-\delta}$(0≤δ≤1.0), Li$_{0.25}$Sr$_{0.50}$NiO$_{3-\delta}$(0≤δ≤1.0), Li$_{0.25}$Sr$_{0.50}$CrO$_{3-\delta}$(0≤δ≤1.0), Li$_{0.25}$Sr$_{0.50}$CoO$_{3-\delta}$(0≤δ≤1.0), Li$_{0.25}$Sr$_{0.50}$IrO$_{3-\delta}$(0≤δ≤1.0), Li$_{0.25}$Sr$_{0.50}$RuO$_{3-\delta}$(0≤δ≤1.0), Li$_{0.25}$Sr$_{0.50}$TiO$_{3-\delta}$(0≤δ≤1.0), Li$_{0.25}$Sr$_{0.50}$FeO$_{3-\delta}$(0≤δ≤1.0), Li$_{0.25}$Sr$_{0.50}$PdO$_{3-\delta}$(0≤δ≤1.0), Li$_{0.25}$Sr$_{0.50}$PbO$_{3-\delta}$(0≤δ≤1.0), Li$_{0.25}$Sr$_{0.50}$RhO$_{3-\delta}$(0≤δ≤1.0), Li$_{0.25}$Sr$_{0.50}$SnO$_{3-\delta}$(0≤δ≤1.0), Li$_{0.25}$Sr$_{0.50}$VO$_{3-\delta}$(0≤δ≤1.0), Li$_{0.25}$Sr$_{0.50}$ReO$_{3-\delta}$(0≤δ≤1.0), Li$_{0.25}$Sr$_{0.50}$GeO$_{3-\delta}$(0≤δ≤1.0), Li$_{0.25}$Sr$_{0.50}$WO$_{3-\delta}$(0≤δ≤1.0), Li$_{0.25}$Sr$_{0.50}$ZrO$_{3-\delta}$(0≤δ≤1.0), Li$_{0.25}$Sr$_{0.50}$MoO$_{3-\delta}$(0≤δ≤1.0), Li$_{0.25}$Sr$_{0.50}$NbO$_{3-\delta}$(0≤δ≤1.0), Li$_{0.25}$Sr$_{0.50}$TaO$_{3-\delta}$(0≤δ≤1.0), Li$_{0.25}$Sr$_{0.50}$HfO$_{3-\delta}$(0≤δ≤1.0), Li$_{0.25}$Sr$_{0.50}$BiO$_{3-\delta}$(0≤δ≤1.0), Li$_{0.30}$Sr$_{0.40}$TiO$_{3-\delta}$(0≤δ≤1.0), Li$_{0.30}$Sr$_{0.40}$MnO$_{3-\delta}$(0≤δ≤1.0), Li$_{0.30}$Sr$_{0.40}$NiO$_{3-\delta}$(0≤δ≤1.0), Li$_{0.30}$Sr$_{0.40}$CrO$_{3-\delta}$(0≤δ≤1.0), Li$_{0.30}$Sr$_{0.40}$CoO$_{3-\delta}$(0≤δ≤1.0), Li$_{0.30}$Sr$_{0.40}$IrO$_{3-\delta}$(0≤δ≤1.0), Li$_{0.30}$Sr$_{0.40}$RuO$_{3-\delta}$(0≤δ≤1.0), Li$_{0.30}$Sr$_{0.40}$TiO$_{3-\delta}$(0≤δ≤1.0), Li$_{0.30}$Sr$_{0.40}$FeO$_{3-\delta}$(0≤δ≤1.0), Li$_{0.30}$Sr$_{0.40}$PdO$_{3-\delta}$(0≤δ≤1.0), Li$_{0.30}$Sr$_{0.40}$PbO$_{3-\delta}$(0≤δ≤1.0), Li$_{0.30}$Sr$_{0.40}$RhO$_{3-\delta}$(0≤δ≤1.0), Li$_{0.30}$Sr$_{0.40}$SnO$_{3-\delta}$(0≤δ≤1.0), Li$_{0.30}$Sr$_{0.40}$VO$_{3-\delta}$(0≤δ≤1.0), Li$_{0.30}$Sr$_{0.40}$ReO$_{3-\delta}$(0≤δ≤1.0), Li$_{0.30}$Sr$_{0.40}$GeO$_{3-\delta}$(0≤δ≤1.0), Li$_{0.30}$Sr$_{0.40}$WO$_{3-\delta}$(0≤δ≤1.0), Li$_{0.30}$Sr$_{0.40}$ZrO$_{3-\delta}$(0≤δ≤1.0), Li$_{0.30}$Sr$_{0.40}$MoO$_{3-\delta}$(0≤δ≤1.0), Li$_{0.30}$Sr$_{0.40}$NbO$_{3-\delta}$(0≤δ≤1.0), Li$_{0.30}$Sr$_{0.40}$TaO$_{3-\delta}$(0≤δ≤1.0), Li$_{0.30}$Sr$_{0.40}$HfO$_{3-\delta}$(0≤δ≤1.0), Li$_{0.30}$Sr$_{0.40}$BiO$_{3-\delta}$(0≤δ≤1.0), Li$_{0.40}$Sr$_{0.20}$TiO$_{3-\delta}$(0≤δ≤1.0), Li$_{0.40}$Sr$_{0.20}$MnO$_{3-\delta}$(0≤δ≤1.0), Li$_{0.40}$Sr$_{0.20}$NiO$_{3-\delta}$(0≤δ≤1.0), Li$_{0.40}$Sr$_{0.20}$CrO$_{3-\delta}$(0≤δ≤1.0), Li$_{0.40}$Sr$_{0.20}$CoO$_{3-\delta}$(0≤δ≤1.0), Li$_{0.40}$Sr$_{0.20}$IrO$_{3-\delta}$(0≤δ≤1.0), Li$_{0.40}$Sr$_{0.20}$RuO$_{3-\delta}$(0≤δ≤1.0), Li$_{0.40}$Sr$_{0.20}$TiO$_{3-\delta}$(0≤δ≤1.0), Li$_{0.40}$Sr$_{0.20}$FeO$_{3-\delta}$(0≤δ≤1.0), Li$_{0.40}$Sr$_{0.20}$PdO$_{3-\delta}$(0≤δ≤1.0), Li$_{0.40}$Sr$_{0.20}$PbO$_{3-\delta}$(0≤δ≤1.0), Li$_{0.40}$Sr$_{0.20}$RhO$_{3-\delta}$(0≤δ≤1.0), Li$_{0.40}$Sr$_{0.20}$SnO$_{3-\delta}$(0≤δ≤1.0), Li$_{0.40}$Sr$_{0.20}$VO$_{3-\delta}$(0≤δ≤1.0), Li$_{0.40}$Sr$_{0.20}$ReO$_{3-\delta}$(0≤δ≤1.0), Li$_{0.40}$Sr$_{0.20}$GeO$_{3-\delta}$(0≤δ≤1.0), Li$_{0.40}$Sr$_{0.20}$WO$_{3-\delta}$(0≤δ≤1.0), Li$_{0.40}$Sr$_{0.20}$ZrO$_{3-\delta}$(0≤δ≤1.0), Li$_{0.40}$Sr$_{0.20}$MoO$_{3-\delta}$(0≤δ≤1.0), Li$_{0.40}$Sr$_{0.20}$NbO$_{3-\delta}$(0≤δ≤1.0), Li$_{0.40}$Sr$_{0.20}$TaO$_{3-\delta}$(0≤δ≤1.0), Li$_{0.40}$Sr$_{0.20}$HfO$_{3-\delta}$(0≤δ≤1.0), Li$_{0.40}$Sr$_{0.20}$BiO$_{3-\delta}$(0≤δ≤1.0), Li$_{0.10}$Ba$_{0.80}$TiO$_{3-\delta}$(0≤δ≤1.0), Li$_{0.10}$Ba$_{0.80}$MnO$_{3-\delta}$(0≤δ≤1.0), Li$_{0.10}$Ba$_{0.80}$NiO$_{3-\delta}$(0≤δ≤1.0), Li$_{0.10}$Ba$_{0.80}$CrO$_{3-\delta}$(0≤δ≤1.0), Li$_{0.10}$Ba$_{0.80}$CoO$_{3-\delta}$(0≤δ≤1.0), Li$_{0.10}$Ba$_{0.80}$IrO$_{3-\delta}$(0≤δ≤1.0), Li$_{0.10}$Ba$_{0.80}$RuO$_{3-\delta}$(0≤δ≤1.0), Li$_{0.10}$Ba$_{0.80}$TiO$_{3-\delta}$(0≤δ≤1.0), Li$_{0.10}$Ba$_{0.50}$FeO$_{3-\delta}$(0≤δ≤1.0), Li$_{0.10}$Ba$_{0.50}$PdO$_{3-\delta}$(0≤δ≤1.0), Li$_{0.10}$Ba$_{0.80}$PbO$_{3-\delta}$(0≤δ≤1.0), Li$_{0.10}$Ba$_{0.801}$RhO$_{3-\delta}$(0≤δ≤1.0), Li$_{0.10}$Ba$_{0.80}$SnO$_{3-\delta}$(0≤δ≤1.0), Li$_{0.10}$Ba$_{0.80}$VO$_{3-\delta}$(0≤δ≤1.0), Li$_{0.10}$Ba$_{0.801}$ReO$_{3-\delta}$(0≤δ≤1.0), Li$_{0.10}$Ba$_{0.80}$GeO$_{3-\delta}$(0≤δ≤1.0), Li$_{0.10}$Ba$_{0.80}$WO$_{3-\delta}$(0≤δ≤1.0), Li$_{0.10}$Ba$_{0.80}$ZrO$_{3-\delta}$(0≤δ≤1.0), Li$_{0.10}$Ba$_{0.80}$MoO$_{3-\delta}$(0≤δ≤1.0), Li$_{0.10}$Ba$_{0.50}$NbO$_{3-\delta}$(0≤δ≤1.0), Li$_{0.10}$Ba$_{0.80}$TaO$_{3-\delta}$(0≤δ≤1.0), Li$_{0.10}$Ba$_{0.80}$HfO$_{3-\delta}$(0≤δ≤1.0), Li$_{0.10}$Ba$_{0.80}$BiO$_{3-\delta}$(0≤δ≤1.0), Li$_{0.20}$Ba$_{0.60}$TiO$_{3-\delta}$(0≤δ≤1.0), Li$_{0.20}$Ba$_{0.60}$MnO$_{3-\delta}$(0≤δ≤1.0), Li$_{0.20}$Ba$_{0.60}$NiO$_{3-\delta}$(0≤δ≤1.0), Li$_{0.20}$Ba$_{0.60}$CrO$_{3-\delta}$(0≤δ≤1.0), Li$_{0.20}$Ba$_{0.60}$CoO$_{3-\delta}$(0≤δ≤1.0), Li$_{0.20}$Ba$_{0.60}$IrO$_{3-\delta}$(0≤δ≤1.0), Li$_{0.20}$Ba$_{0.60}$RuO$_{3-\delta}$(0≤δ≤1.0), Li$_{0.20}$Ba$_{0.60}$TiO$_{3-\delta}$(0≤δ≤1.0), Li$_{0.20}$Ba$_{0.60}$FeO$_{3-\delta}$(0≤δ≤1.0), Li$_{0.20}$Ba$_{0.60}$PdO$_{3-\delta}$(0≤δ≤1.0), Li$_{0.20}$Ba$_{0.60}$PbO$_{3-\delta}$(0≤δ≤1.0), Li$_{0.20}$Ba$_{0.60}$RhO$_{3-\delta}$(0≤δ≤1.0), Li$_{0.20}$Ba$_{0.60}$SnO$_{3-\delta}$(0≤δ≤1.0), Li$_{0.20}$Ba$_{0.60}$VO$_{3-\delta}$(0≤δ≤1.0), Li$_{0.20}$Ba$_{0.60}$ReO$_{3-\delta}$(0≤δ≤1.0), Li$_{0.20}$Ba$_{0.60}$GeO$_{3-\delta}$(0≤δ≤1.0), Li$_{0.20}$Ba$_{0.60}$WO$_{3-\delta}$(0≤δ≤1.0), Li$_{0.20}$Ba$_{0.60}$ZrO$_{3-\delta}$(0≤δ≤1.0), Li$_{0.20}$Ba$_{0.60}$MoO$_{3-\delta}$(0≤δ≤1.0), Li$_{0.20}$Ba$_{0.60}$NbO$_{3-\delta}$(0≤δ≤1.0), Li$_{0.20}$Ba$_{0.60}$TaO$_{3-\delta}$(0≤δ≤1.0), Li$_{0.20}$Ba$_{0.60}$HfO$_{3-\delta}$(0≤δ≤1.0), Li$_{0.20}$Ba$_{0.60}$BiO$_{3-\delta}$(0≤δ≤1.0), Li$_{0.25}$Ba$_{0.50}$TiO$_{3-\delta}$(0≤δ≤1.0), Li$_{0.25}$Ba$_{0.50}$MnO$_{3-\delta}$(0≤δ≤1.0), Li$_{0.25}$Ba$_{0.50}$NiO$_{3-\delta}$(0≤δ≤1.0), Li$_{0.25}$Ba$_{0.50}$CrO$_{3-\delta}$(0≤δ≤1.0), Li$_{0.25}$Ba$_{0.50}$ CoO$_{3-\delta}$(0≤δ≤1.0), Li$_{0.25}$Ba$_{0.50}$IrO$_{3-\delta}$(0≤δ≤1.0), Li$_{0.25}$Ba$_{0.50}$RuO$_{3-\delta}$(0≤δ≤1.0), Li$_{0.25}$Ba$_{0.50}$TiO$_{3-\delta}$(0≤δ≤1.0), Li$_{0.25}$Ba$_{0.50}$FeO$_{3-\delta}$(0≤δ≤1.0), Li$_{0.25}$Ba$_{0.50}$PdO$_{3-\delta}$(0≤δ≤1.0), Li$_{0.25}$Ba$_{0.50}$PbO$_{3-\delta}$(0≤δ≤1.0), Li$_{0.25}$Ba$_{0.50}$RhO$_{3-\delta}$(0≤δ≤1.0), Li$_{0.25}$Ba$_{0.50}$SnO$_{3-\delta}$(0≤δ≤1.0), Li$_{0.25}$Ba$_{0.50}$VO$_{3-\delta}$(0≤δ≤1.0), Li$_{0.25}$Ba$_{0.50}$ReO$_{3-\delta}$(0≤δ≤1.0), Li$_{0.25}$Ba$_{0.50}$GeO$_{3-\delta}$(0≤δ≤1.0), Li$_{0.25}$Ba$_{0.50}$WO$_{3-\delta}$(0≤δ≤1.0), Li$_{0.25}$Ba$_{0.50}$ZrO$_{3-\delta}$(0≤δ≤1.0), Li$_{0.25}$Ba$_{0.50}$MoO$_{3-\delta}$(0≤δ≤1.0), Li$_{0.25}$Ba$_{0.50}$NbO$_{3-\delta}$(0≤δ≤1.0), Li$_{0.25}$Ba$_{0.50}$TaO$_{3-\delta}$(0≤δ≤1.0), Li$_{0.25}$Ba$_{0.50}$HfO$_3$, Li$_{0.25}$Ba$_{0.50}$BiO$_{3-\delta}$(0≤δ≤1.0), Li$_{0.30}$Ba$_{0.40}$TiO$_{3-\delta}$(0≤δ≤1.0), Li$_{0.30}$Ba$_{0.40}$MnO$_{3-\delta}$(0≤δ≤1.0), Li$_{0.30}$Ba$_{0.40}$NiO$_{3-\delta}$(0≤δ≤1.0), Li$_{0.30}$Ba$_{0.40}$CrO$_{3-\delta}$(0≤δ≤1.0), Li$_{0.30}$Ba$_{0.40}$CoO$_{3-\delta}$(0≤δ≤1.0), Li$_{0.30}$Ba$_{0.40}$IrO$_{3-\delta}$(0≤δ≤1.0), Li$_{0.30}$Ba$_{0.40}$RuO$_{3-\delta}$(0≤δ≤1.0), Li$_{0.30}$Ba$_{0.40}$TiO$_{3-\delta}$(0≤δ≤1.0), Li$_{0.30}$Ba$_{0.40}$FeO$_{3-\delta}$(0≤δ≤1.0), Li$_{0.30}$Ba$_{0.40}$PdO$_{3-\delta}$(0≤δ≤1.0), Li$_{0.30}$Ba$_{0.40}$PbO$_{3-\delta}$(0≤δ≤1.0), Li$_{0.30}$Ba$_{0.40}$RhO$_{3-\delta}$(0≤δ≤1.0), Li$_{0.30}$Ba$_{0.40}$SnO$_{3-\delta}$(0≤δ≤1.0), Li$_{0.30}$Ba$_{0.40}$VO$_{3-\delta}$(0≤δ≤1.0), Li$_{0.30}$Ba$_{0.40}$ReO$_{3-\delta}$(0≤δ≤1.0), Li$_{0.30}$Ba$_{0.40}$GeO$_{3-\delta}$(0≤δ≤1.0), Li$_{0.30}$Ba$_{0.40}$WO$_{3-\delta}$(0≤δ≤1.0), Li$_{0.30}$Ba$_{0.40}$ZrO$_{3-\delta}$(0≤δ≤1.0), Li$_{0.30}$Ba$_{0.40}$MoO$_{3-\delta}$(0≤δ≤1.0), Li$_{0.30}$Ba$_{0.40}$NbO$_{3-\delta}$(0≤δ≤1.0), Li$_{0.30}$Ba$_{0.40}$TaO$_{3-\delta}$(0≤δ≤1.0), Li$_{0.30}$Ba$_{0.40}$HfO$_{3-\delta}$(0≤δ≤1.0), Li$_{0.30}$Ba$_{0.40}$BiO$_{3-\delta}$(0≤δ≤1.0), Li$_{0.40}$Ba$_{0.20}$TiO$_{3-\delta}$(0≤δ≤1.0), Li$_{0.40}$Ba$_{0.20}$MnO$_{3-\delta}$(0≤δ≤1.0), Li$_{0.40}$Ba$_{0.20}$NiO$_{3-\delta}$(0≤δ≤1.0), Li$_{0.40}$Ba$_{0.20}$CrO$_{3-\delta}$(0≤δ≤1.0), Li$_{0.40}$Ba$_{0.20}$CoO$_{3-\delta}$(0≤δ≤1.0), Li$_{0.40}$Ba$_{0.201}$IrO$_{3-\delta}$(0≤δ≤1.0), Li$_{0.40}$Ba$_{0.20}$RuO$_{3-\delta}$(0≤δ≤1.0), Li$_{0.40}$Ba$_{0.20}$TiO$_{3-\delta}$(0≤δ≤1.0), Li$_{0.40}$Ba$_{0.20}$FeO$_{3-\delta}$(0≤δ≤1.0), Li$_{0.40}$Ba$_{0.20}$PdO$_{3-\delta}$(0≤δ≤1.0), Li$_{0.40}$Ba$_{0.20}$PbO$_{3-\delta}$(0≤δ≤1.0), Li$_{0.40}$Ba$_{0.20}$RhO$_{3-\delta}$(0≤δ≤1.0), Li$_{0.40}$Ba$_{0.20}$SnO$_{3-\delta}$(0≤δ≤1.0), Li$_{0.40}$Ba$_{0.20}$VO$_{3-\delta}$(0≤δ≤1.0), Li$_{0.40}$Ba$_{0.20}$ReO$_{3-\delta}$(0≤δ≤1.0), Li$_{0.40}$Ba$_{0.20}$GeO$_{3-\delta}$(0≤δ≤1.0), Li$_{0.40}$Ba$_{0.20}$WO$_{3-\delta}$(0≤δ≤1.0), Li$_{0.40}$Ba$_{0.20}$ZrO$_{3-\delta}$(0≤δ≤1.0), Li$_{0.40}$Ba$_{0.20}$MoO$_{3-\delta}$(0≤δ≤1.0), Li$_{0.40}$Ba$_{0.20}$NbO$_{3-\delta}$(0≤δ≤1.0), Li$_{0.40}$Ba$_{0.20}$TaO$_{3-\delta}$(0≤δ≤1.0), Li$_{0.40}$Ba$_{0.20}$HfO$_{3-\delta}$(0≤δ≤1.0), Li$_{0.40}$Ba$_{0.20}$BiO$_{3-\delta}$(0≤δ≤1.0), Li$_{0.25}$La$_{0.50}$TiO$_{3-\delta}$(0≤δ≤1.0), Li$_{0.25}$La$_{0.50}$MnO$_{3-\delta}$(0≤δ≤1.0), Li$_{0.25}$La$_{0.50}$NiO$_{3-\delta}$(0≤δ≤1.0), Li$_{0.25}$La$_{0.50}$CrO$_{3-\delta}$(0≤δ≤1.0), Li$_{0.25}$La$_{0.50}$CoO$_{3-\delta}$(0≤δ≤1.0), Li$_{0.25}$La$_{0.50}$IrO$_{3-\delta}$(0≤δ≤1.0), Li$_{0.25}$La$_{0.50}$RuO$_{3-\delta}$(0≤δ≤1.0), Li$_{0.25}$La$_{0.50}$TiO$_{3-\delta}$(0≤δ≤1.0), Li$_{0.25}$La$_{0.50}$FeO$_{3-\delta}$(0≤δ≤1.0), Li$_{0.25}$La$_{0.50}$PdO$_{3-\delta}$(0≤δ≤1.0), Li$_{0.25}$La$_{0.50}$PdO$_{3-\delta}$(0≤δ≤1.0), Li$_{0.25}$La$_{0.50}$RhO$_{3-\delta}$(0≤δ≤1.0), Li$_{0.25}$La$_{0.50}$SnO$_{3-\delta}$(0≤δ≤1.0), Li$_{0.25}$La$_{0.50}$VO$_{3-\delta}$(0≤δ≤1.0), Li$_{0.25}$La$_{0.50}$ReO$_{3-\delta}$(0≤δ≤1.0), Li$_{0.25}$La$_{0.50}$GeO$_{3-\delta}$(0≤δ≤1.0), Li$_{0.25}$La$_{0.50}$WO$_{3-\delta}$(0≤δ≤1.0), Li$_{0.25}$La$_{0.50}$ZrO$_{3-\delta}$(0≤δ≤1.0), Li$_{0.25}$La$_{0.50}$MoO$_{3-\delta}$(0≤δ≤1.0), Li$_{0.25}$La$_{0.50}$NbO$_{3-\delta}$(0≤δ≤1.0), Li$_{0.25}$La$_{0.50}$TaO$_{3-\delta}$(0≤δ≤1.0), Li$_{0.25}$La$_{0.50}$HfO$_{3-\delta}$(0≤δ≤1.0), Li$_{0.25}$La$_{0.50}$SiO$_{3-\delta}$(0≤δ≤1.0), Li$_{0.05}$La$_{0.82}$TiO$_{3-\delta}$(0≤δ≤1.0), Li$_{0.05}$La$_{0.82}$MnO$_{3-\delta}$(0≤δ≤1.0), Li$_{0.10}$La$_{0.80}$MnO$_{3-\delta}$(0≤δ≤1.0), Li$_{0.20}$La$_{0.77}$Mn$_{0.70}$O$_{3-\delta}$(0≤δ≤1.0), Li$_{0.05}$La$_{0.82}$Nb$_{0.70}$O$_{3-\delta}$(0≤δ≤1.0), Li$_{0.10}$La$_{0.50}$Nb$_{0.70}$O$_{3-\delta}$(0≤δ≤1.0), Li$_{0.20}$La$_{0.77}$Nb$_{0.70}$O$_{3-\delta}$(0≤δ≤1.0), Li$_{0.05}$La$_{0.82}$Ta$_{0.70}$O$_{3-\delta}$(0≤δ≤1.0), Li$_{0.10}$La$_{0.80}$Ta$_{0.70}$O$_{3-\delta}$(0≤δ≤1.0), Li$_{0.20}$La$_{0.77}$Ta$_{0.70}$O$_{3-\delta}$(0≤δ≤1.0), Li$_{0.05}$La$_{0.82}$V$_{0.70}$O$_{3-\delta}$(0≤δ≤1.0), Li$_{0.10}$La$_{0.80}$V$_{0.70}$O$_{3-\delta}$(0≤δ≤1.0), Li$_{0.20}$La$_{0.77}$V$_{0.70}$O$_{3-\delta}$(0≤δ≤1.0), Li$_{0.05}$La$_{0.82}$W$_{0.70}$O$_{3-\delta}$(0≤δ≤1.0), Li$_{0.10}$La$_{0.50}$W$_{0.70}$O$_{3-\delta}$(0≤δ≤1.0), Li$_{0.20}$La$_{0.77}$W$_{0.70}$O$_{3-\delta}$(0≤δ≤1.0), Li$_{0.05}$La$_{0.82}$Mo$_{0.70}$O$_{3-\delta}$(0≤δ≤1.0), Li$_{0.10}$La$_{0.80}$Mo$_{0.70}$O$_{3-\delta}$(0≤δ≤1.0), Li$_{0.20}$La$_{0.77}$Mo$_{0.70}$O$_{3-\delta}$(0≤δ≤1.0), Li$_{0.05}$La$_{0.82}$Bi$_{0.70}$O$_{3-\delta}$(0≤δ≤1.0), Li$_{0.10}$La$_{0.80}$Bi$_{0.70}$O$_{3-\delta}$(0≤δ≤1.0), Li$_{0.20}$La$_{0.77}$Bi$_{0.70}$O$_{3-\delta}$(0≤δ≤1.0), Li$_{0.05}$La$_{0.82}$Cr$_{0.70}$O$_{3-\delta}$(0≤δ≤1.0), Li$_{0.10}$La$_{0.80}$Cr$_{0.70}$O$_{3-\delta}$(0≤δ≤1.0), or Li$_{0.20}$La$_{0.77}$Cr$_{0.70}$O$_{3-\delta}$(0≤δ≤1.0).

For example, the perovskite compound may be Li$_{0.31}$La$_{0.56}$TiO_3$, Li$_{0.34}$La$_{0.55}$RuO$_3$, or Li$_{0.2}$Ca$_{0.6}$Mn$_{0.5}$Ni$_{0.5}$O$_3$.

For example, the lithium-containing metal oxide may include a layered compound represented by Formula 6:

$$Li_{1+x}M_{1+y}O_{2-\delta} \quad \text{Formula 6}$$

In Formula 6, M may be at least one metal element belonging to Group 2 to Group 16 of the periodic table of the elements, δ may represent a content of oxygen vacancy, 0<x<0.5, 0<y<1, and 0≤δ≤1.

For example, the layered compound, which is a compound having a layered crystal structure, may be a compound represented by one of the following formulae: Li$_a$A$_{1-b}$B$_b$D$_2$ (wherein 0.90≤a≤1.8, and 0≤b≤0.5); Li$_a$E$_{1-b}$B$_b$O$_{2-c}$D$_c$ (wherein 0.90≤a≤1.8, 0≤b≤0.5, 0≤c≤0.05); LiE$_{2-b}$B$_b$O$_{4-c}$D$_c$ (wherein 0≤b≤0.5, 0≤c≤0.05); Li$_a$Ni$_{1-b-c}$Co$_b$B$_c$D$_\alpha$ (wherein 0.90≤a≤1.8, 0≤b≤0.5, 0≤c≤0.05, 0<α≤2); Li$_a$Ni$_{1-b-c}$Co$_b$B$_c$O$_{2-\alpha}$F$_\alpha$ (wherein 0.90≤a≤1.8, 0≤b≤0.5, 0≤c≤0.05, 0<α<2); Li$_a$Ni$_{1-b-c}$Co$_b$B$_c$O$_{2-\alpha}$F$_2$ (wherein 0.90≤a≤1.8, 0≤b≤0.5, 0≤c≤0.05, 0<α<2); Li$_a$Ni$_{1-b-c}$Mn$_b$B$_c$D$_\alpha$ (wherein 0.90≤a≤1.8, 0≤b≤0.5, 0≤c≤0.05, 0<α≤2); Li$_a$Ni$_{1-b-c}$Mn$_b$B$_c$O$_{2-\alpha}$F$_\alpha$ (wherein 0.90≤a≤1.8, 0≤b≤0.5, 0≤c≤0.05, 0<α<2); Li$_a$Ni$_{1-b-c}$Mn$_b$B$_c$O$_{2-\alpha}$F$_2$ (wherein 0.90≤a≤1.8, 0≤b≤0.5, 0≤c≤0.05, 0<α<2); Li$_a$Ni$_b$E$_c$G$_d$O$_2$ (wherein 0.90≤a≤1.8, 0≤b≤0.9, 0≤c≤0.5, 0.001≤d≤0.1); Li$_a$Ni$_b$Co$_c$Mn$_d$GeO$_2$ (wherein 0.90≤a≤1.8, 0≤b≤0.9, 0≤c≤0.5, 0≤d≤0.5, 0.001≤e≤0.1); Li$_a$NiG$_b$O$_2$ (wherein 0.90≤a≤1.8, 0.001≤b≤0.1); Li$_a$CoG$_b$O$_2$ (wherein 0.90≤a≤1.8, and 0.001≤b≤0.1); and Li$_a$MnG$_b$O$_2$ (wherein 0.90≤a≤1.8, and 0.001≤b≤0.1).

For example, the layered compound may be LiNiO$_2$, LiCoO$_2$, LiMnO$_2$, LiNi$_{1-x}$Mn$_x$O$_2$ (wherein 0<x<1), LiNi$_{1-x1-y1}$Co$_{x1}$Mn$_{y1}$O$_2$ (wherein 0<x1≤0.5 and 0<y1≤0.5), LiNi$_{0.8}$Co$_{0.1}$Mn$_{0.1}$O$_2$, or LiNi$_{1-x2-y2}$Co$_{x2}$Al$_{y2}$O$_2$ (wherein 0<x2≤0.5 and 0<y2≤0.5). However, embodiments are not limited thereto. Any suitable lithium-containing layered compound may be used.

For example, the lithium-containing metal oxide may include an NASICON compound represented by Formula 7:

$$Li_{1+x}A_xM_{2-x}(XO_4)_3 \quad \text{Formula 7}$$

In Formula 7, A and M may each independently be at least one metal element belonging to Group 2 to Group 16 of the periodic table of the elements; X may be As, P, Mo, or S; and 0<x<1.0.

The NASICON compound, which is a compound having an NASICON crystal structure or an NASICON-like crystal structure, may be, for example, Li$_{1.3}$Al$_{0.3}$Ti$_{1.7}$(PO$_4$)$_3$, Li$_{1.3}$Al$_{0.3}$Ge$_{1.7}$(PO$_4$)$_3$, or Li$_{1.3}$Al$_{0.3}$Zn$_{1.7}$(PO$_4$)$_3$.

For example, the lithium-containing metal oxide may include a LISICON compound represented by Formula 8:

$$Li_{8-x}A_aB_bO_4 \quad \text{Formula 8}$$

In Formula 8, A and B may each independently be at least one metal element belonging to Group 2 to Group 16 of the periodic table of the elements; c=ma+nb, m may be an oxidation number of A, and n may be an oxidation number of B; and 0<x<8, 0<a≤1, and 0<b≤1.

For example, the LISICON compound, which is a compound having a LISICON crystal structure or a LISICON-like crystal structure, may be Li$_4$SiO$_4$, Li$_{3.75}$Si$_{0.75}$P$_{0.25}$O$_4$, Li$_{14}$Zn(GeO$_4$)$_4$ Li$_{3.4}$V$_{0.6}$Ge$_{0.4}$O$_4$, or Li$_{3.5}$V$_{0.5}$Ti$_{0.5}$O$_4$.

For example, the lithium-containing metal oxide may be a garnet compound represented by Formula 9:

$$Li_xA_3B_2O_{12} \quad \text{Formula 9}$$

In Formula 9, A and B may each independently be at least one metal element belonging to Group 2 to Group 16 of the periodic table of the elements, and $3.0 \leq x \leq 7.0$.

For example, the garnet compound, which is a compound having a garnet crystal structure or a garnet-like crystal structure, may be $Li_3Tb_3Te_2O_{12}$, $Li_{4.22}Al_{0.26}La_3Zr_2WO_{12}$, $Li_5La_3Nb_2O_{12}$, $Li_6BaLa_2Ta_2O_{12}$, or $Li_7La_3Zr_2O_{12}$.

For example, the lithium-containing metal oxide may be a phosphate compound represented by Formula 10 or 11:

$$Li_{1\pm x}MPO_4 \qquad \text{Formula 10}$$

$$Li_2MP_2O_7 \qquad \text{Formula 11}$$

In Formulae 10 and 11, M may be at least one metal element belonging to Group 2 to Group 16 of the periodic table of the elements, and $0 \leq x \leq 1.0$.

For example, the phosphate compound represented by Formula 10, which is an olivine compound, may be $LiFePO_4$, $LiMnPO_4$, $LiCoPO_4$, $LiNiPO_4$, $Li_2MnP_2O_7$, or $Li_2FeP_2O_7$.

For example, the lithium-containing metal oxide may be a tavorite or triplite compound represented by Formula 12:

$$Li_{1\pm x}M(TO_4)X \qquad \text{Formula 12}$$

In Formula 12, M may be at least one metal element belonging to Group 2 to Group 16 of the periodic table of the elements; T may be P or S; X may be F, O, or OH; and $0 \leq x \leq 1.0$.

For example, the tavorite compound or triplite compound, which have the same composition but have different crystal structures, may be $LiVO(PO_4)$, $LiV(PO_4)F$, $LiFe(SO_4)F$, or $Li_2Fe(PO_4)F$.

For example, the lithium-containing metal oxide may include an anti-perovskite compound represented by Formula 13:

$$Li_xM_yOA \qquad \text{Formula 13}$$

In Formula 13, M may be at least one metal element belonging to Group 2 to Group 16 of the periodic table of the elements; A may be F, Cl, Br, I, S, Se, or Te; and $2.0 \leq x \leq 3.0$, and $0 \leq y \leq 1.0$.

For example, the anti-perovskite compound, which is a compound having a perovskite crystal structure or a perovskite-like crystal structure, but in which the positions of cations and anions are opposite to those of a perovskite compound, may $Li_3OCl$, $Li_2OHBr$, $Li_2(OH)_{0.9}F_{0.1}Cl$, or $Li_{30}Cl_{0.5}Br_{0.5}$.

For example, the lithium-containing metal oxide may include a silicate compound represented by Formula 14:

$$Li_{2\pm x}MSiO_4 \qquad \text{Formula 14}$$

In Formula 14, M may be at least one metal element belonging to Group 2 to Group 16 of the periodic table of the elements, and $0 \leq x \leq 1.0$.

For example, the silicate compound, which is a crystalline compound including $SiO_4^{4-}$ anions, may be $Li_2MnSiO_4$ or $Li_2FeSiO_4$.

For example, the lithium-containing metal oxide may include a borate compound represented by Formula 15:

$$Li_{1\pm x}MBO_3 \qquad \text{Formula 15}$$

In Formula 15, M may be at least one metal element belonging to Group 2 to Group 16 of the periodic table of the elements, and $0 \leq x \leq 1.0$.

For example, the borate compound, which is a crystalline compound including $BO_3^{3-}$ anions, may be $LiFeBO_3$ or $LiCoBO_3$.

At least one of the layered compound, the NASICON compound, the LISICON compound, the garnet compound, the phosphate compound, the tavorite compound or triplite compound, the anti-perovskite compound, the silicate compound, or the borate compound may have an ionic conductivity of, for example, about $1.0 \times 10^{-8}$ S/cm or greater, about $5.0 \times 10^{-8}$ S/cm or greater, about $5.0 \times 10^{-7}$ S/cm or greater, about $1.0 \times 10^{-6}$ S/cm or greater, about $5.0 \times 10^{-6}$ S/cm or greater, or about $1.0 \times 10^{-5}$ S/cm or greater. In an embodiment, at least one of the layered compound, the NASICON compound, the LISICON compound, the garnet compound, the phosphate compound, the tavorite compound or triplite compound, the anti-perovskite compound, the silicate compound, or the borate compound may have an ionic conductivity of, for example, about $1 \times 10^{-8}$ S/cm to about $1 \times 10^{-2}$ S/cm, for example, about $5 \times 10^{-8}$ S/cm to about $5 \times 10^{-1}$ S/cm, for example, about $5 \times 10^{-7}$ S/cm to about $1 \times 10^{-1}$ S/cm, for example, about $1 \times 10^{-6}$ S/cm to about $5 \times 10^{-2}$ S/cm, for example, about $5 \times 10^{-6}$ S/cm to about $1 \times 10^{-2}$ S/cm, or about $1 \times 10^{-5}$ S/cm to about $1 \times 10^{-3}$ S/cm.

At least one of the layered compound, the NASICON compound, the LISICON compound, the garnet compound, the phosphate compound, the tavorite compound or triplite compound, the anti-perovskite compound, the silicate compound, or the borate compound may have an electronic conductivity of about $1.0 \times 10^{-6}$ S/cm or greater, about $5.0 \times 10^{-6}$ S/cm or greater, $1.0 \times 10^{-5}$ S/cm or greater, $5.0 \times 10^{-5}$ S/cm or greater, about $1 \times 10^{-4}$ S/cm or greater, about $5 \times 10^{-4}$ S/cm or greater, about $1 \times 10^{-3}$ S/cm or greater, or about $1 \times 10^{-6}$ S/cm to about 1.0 S/cm. In an embodiment, At least one of the layered compound, the NASICON compound, the LISICON compound, the garnet compound, the phosphate compound, the tavorite compound or triplite compound, the anti-perovskite compound, the silicate compound, or the borate compound may have an electronic conductivity of about $1 \times 10^{-6}$ S/cm to about 1 S/cm, about $5 \times 10^{-6}$ S/cm to about $5 \times 10^{-1}$ S/cm, $1 \times 10^{-5}$ S/cm to about $1 \times 10^{-1}$ S/cm, $5 \times 10^{-5}$ S/cm to about $5 \times 10^{-2}$ S/cm, about $1 \times 10^{-4}$ S/cm to about $1 \times 10^{-2}$ S/cm, about $5 \times 10^{-4}$ S/cm to about $5 \times 10^{-3}$ S/cm, about $1 \times 10^{-3}$ S/cm to about $1 \times 10^{-3}$ S/cm, or about $1 \times 10^{-6}$ S/cm to about $5 \times 10^{-4}$ S/cm.

For example, the lithium-containing metal oxide may be a mixed conductor having both lithium ionic conductivity and electronic conductivity at the same time. For example, the mixed conductor may be $Li_{0.34}La_{0.55}RuO_3$ or $LiNi_2O_4$. For example, the mixed conductor may have an electronic conductivity of about $1.0 \times 10^{-6}$ S/cm or greater, and an ionic conductivity of about $1.0 \times 10^{-8}$ S/cm or greater. For example, the mixed conductor may have an electronic conductivity of about $1.0 \times 10^{-6}$ S/cm or greater or about $1 \times 10^{-6}$ S/cm to about 1.0 S/cm, and an ionic conductivity of about $2.0 \times 10^{-7}$ S/cm or greater, about $2.0 \times 10^{-6}$ S/cm or greater, or about $1 \times 10^{-6}$ S/cm to about 1.0 S/cm. In an embodiment, the mixed conductor may have an ionic conductivity of about $1 \times 10^{-8}$ S/cm to about 1 S/cm, about $2 \times 10^{-7}$ S/cm to about $5 \times 10^{-1}$ S/cm, about $2 \times 10^{-6}$ S/cm to about $1 \times 10^{-1}$ S/cm, or about $1 \times 10^{-6}$ S/cm to about $5 \times 10^{-2}$ S/cm.

For example, the lithium-containing metal oxide may be electrochemically stable at about 2.0 volts (V) to about 4.0 V, with respect to lithium metal and may be a lithium ion conductor.

According to an embodiment, a metal-air battery includes the cathode according to an embodiment, an anode, and an electrolyte interposed between the cathode and the anode.

A metal-air battery refers to a secondary battery generating and storing electricity by contacting metal with oxygen in the air, i.e., a battery using active metal as an anode, and oxygen in the air as an active material of a cathode. The active metal of the anode may be at least one of lithium, magnesium, aluminum, or zinc, or an alloy thereof.

The metal-air battery may be, for example, a lithium-air battery.

The cathode of the metal-air battery is an air electrode. For example, the cathode may be arranged on a cathode current collector. The metal-air battery may have improved structural stability, by using the cathode according to an embodiment, and deterioration thereof may be suppressed.

The cathode may include, as a mixed conductor, a lithium-containing metal oxide according to any of the above-described embodiments. For example, an amount of the lithium-containing metal oxide may be about 1 part to about 100 parts by weight, about 10 parts to about 100 parts by weight, about 50 parts to about 100 parts by weight, about 60 parts to about 100 parts by weight, about 70 parts to about 100 parts by weight, about 80 parts to about 100 parts by weight, or about 90 parts to about 100 parts by weight, with respect to 100 parts by weight of the cathode. For example, the cathode may substantially consist of the lithium-containing metal oxide according to any of the above-described embodiments.

The cathode, which may be obtained by at least one of sintering or pressing powder of the lithium-containing metal oxide, may substantially consist of the lithium-containing metal oxide. It may be possible to introduce pores into the cathode by using a pore-forming agent in manufacturing of the cathode. The cathode may be, for example, porous. The cathode may be in the form of, for example, porous pellets or a porous sheet. However, embodiments are not limited thereto. The cathode may be formed according to a desired battery shape. Since the cathode is substantially composed of the lithium-containing metal oxide according to any of the above-described embodiments, the cathode may have a simplified structure, and manufacturing the cathode may also be simplified. For example, the cathode may be permeable to a gas such as oxygen or the air. Accordingly, the cathode according to an embodiment is distinguished from a cathode that is substantially impervious to gas such as oxygen or the air and that may have only ionic conductivity. Since the cathode according to an embodiment is at least one of porous or gas permeable, diffusion of such as oxygen, air, and the like into the cathode may be facilitated. As migration of at least one of lithium ions or electrons through the lithium-containing metal oxide in the cathode is facilitated, electrochemical reactions involving oxygen, lithium ions, and electrons in the cathode may be facilitated.

In an embodiment, the cathode of the lithium-air battery may further include, for example, a cathode material, in addition to the lithium-containing metal oxide according to any of the above-described embodiments.

For example, the cathode may further include a conductive material. The conductive material may be, for example, porous. The porosity of the conductive material may facilitate air permeation into the cathode. The conductive material may be at least one of any suitable porous or conductive material, for example, may be a carbonaceous material having porosity. The carbonaceous material may be, for example, carbon blacks, graphite, graphene, activated carbons, carbon fibers, or the like. However, embodiments are not limited thereto. Any suitable carbonaceous material may be used. The conductive material may be, for example, a metallic material. The metallic material may be, for example, metal fibers, metal meshes, metal powder, or the like. The metal powder may be, for example, copper, silver, nickel, or aluminum powder. The conductive material may be, for example, an organic conductive material. The organic conductive material may be, for example, a polyphenylene derivative, a polythiophene derivative, or the like. The above-listed conductive materials may be used, for example, alone or in combination. The cathode may include a mixed conductor as the conductive material. The cathode may further include any of the above-listed conductive materials, in addition to the mixed conductor.

The cathode may further include, for example, a catalyst for oxidation/reduction of oxygen. The catalyst may be, for example, a precious metal-based catalyst such as platinum, gold, silver, palladium, ruthenium, rhodium, and osmium; an oxide-based catalyst such as manganese oxide, iron oxide, cobalt oxide, and nickel oxide; and an organic metal-based catalyst such as cobalt phthalocyanine. However, embodiments are not limited thereto. Any suitable catalyst for oxidation/reduction of oxygen in the art may be used.

For example, the catalyst may be supported on a catalyst support. The catalyst support may be, for example, an oxide catalyst support, a zeolite catalyst support, a clay-based mineral catalyst support, a carbon catalyst support, or the like. The oxide catalyst support may be, for example, a metal oxide catalyst support including at least one metal of Al, Si, Zr, Ti, Ce, Pr, Sm, Eu, Tb, Tm, Yb, Sb, Bi, V, Cr, Mn, Fe, Co, Ni, Cu, Nb, Mo, or W. The oxide catalyst support may include, for example, alumina, silica, zirconium oxide, titanium dioxide, or the like. The carbon catalyst support may be carbon blacks such as Ketjen black, acetylene black, channel black, and lamp black; graphite such as natural graphite, artificial black, and expandable graphite; activated carbons; and carbon fibers. However, embodiments are not limited thereto. Any suitable catalyst support may be used.

For example, the cathode may further include a binder. The binder may include, for example, a thermoplastic resin or a thermocurable resin. For example, the binder may be at least one of polyethylene, polypropylene, polytetrafluoroethylene ("PTFE"), polyvinylidene fluoride ("PVDF"), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer. However, embodiments are not limited thereto. Any suitable binders may be used.

For example, the cathode may be manufactured by mixing a conductive material, a catalyst for oxidation/reduction of oxygen, and a binder together, and adding a solvent to the resulting mixture to prepare a cathode slurry, coating the cathode slurry on a surface of a base, drying the coated cathode slurry, and press-molding the cathode slurry against the base to improve a density of the electrode. The base may be, for example, a cathode current collector, a separator, or a solid electrolyte membrane. The cathode current collector may be, for example, a gas diffusion layer. The conductive material may include a mixed conductor. The catalyst for oxidation/reduction of oxygen and the binder may be omitted depending on a type of the cathode.

The lithium-air battery according to an embodiment may include an anode. The anode may include lithium. The anode may be, for example, a lithium metal thin film or a lithium metal-based alloy thin film. For example, the lithium metal-based alloy may be an alloy of lithium with, for example, aluminum, tin, magnesium, indium, calcium, titanium, or vanadium.

The lithium-air battery according to an embodiment may include an electrolyte between the cathode and the anode. The electrolyte may include at least one electrolyte of a liquid electrolyte, a gel electrolyte, or a solid electrolyte. The liquid electrolyte, the gel electrolyte, and the solid electrolyte are not particularly limited, and may be any suitable electrolyte.

The solid electrolyte may include at least one of a solid electrolyte including an ionically conductive inorganic material, a solid electrolyte including a polymeric ionic liquid ("PIL") and a lithium salt, or a solid electrolyte including an ionically conducting polymer and a lithium salt. However, embodiments are not limited thereto. Any suitable solid electrolyte may be used.

The ionically conductive inorganic material may include at least one of a glass or amorphous metal ion conductor, a ceramic active metal ion conductor, or a glass ceramic active metal ion conductor. However, embodiments are not limited thereto. Any suitable ionically conductive inorganic material may be used. For example, the ionically conductive inorganic material may be, for example, ionically conductive inorganic particles or a product thereof formed in a sheet form.

For example, the ionically conductive inorganic material may be at least one of $BaTiO_3$, $Pb(Zr,Ti)O_3$ ("PZT"), $Pb_{1-x}La_xZr_{1-y}Ti_yO_3$ ("PLZT") (wherein $0 \le x<1$ and $0 \le y<1$), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, wherein $0<x<2$ and $0<y<3$), lithium aluminum titanium phosphate ($Li_xAl_yTi_z(PO_4)_3$, wherein $0<x<2$, $0<y<1$, and $0<z<3$), $Li_{1+x+y}(Al, Ga)_x(Ti, Ge)_{2-x}Si_yP_{3-y}O_{12}$ (wherein $0 \le x \le 1$ and $0 \le y \le 1$), lithium lanthanum titanate ($Li_xLa_yTiO_3$, wherein $0<x<2$ and $0<y<3$), lithium germanium thiophosphate ($Li_xGe_yP_zS_w$, wherein $0<x<4$, $0<y<1$, $0<z<1$, and $0<w<5$), lithium nitride ($Li_xN_y$, wherein $0<x<4$ and $0<y<2$), $SiS_2$ ($Li_xSi_yS_z$, wherein $0<x<3$, $0<y<2$, and $0<z<4$)-based glass, $P_2S_5$ ($Li_xP_yS_z$, $0<x<3$, $0<y<3$, and $0<z<7$)-based glass, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, or a Garnet ceramic ($Li_{3+x}La_3M_2O_{12}$, wherein M is Te, Nb, or Zr)).

For example, the polymeric ionic liquid ("PIL") may include a repeating unit including: i) a cation of at least one of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, a triazolium-based cation, or a mixture thereof; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$. For example, the polymeric ionic liquid ("PIL") may be poly(diallyldimethylammonium) bis(trifluoromethanesulfonyl)imide) ("TFSI"), poly(1-allyl-3-methylimidazolium bis(trifluoromethanesulfonyl)imide), poly((N-methyl-N-propylpiperidinium bis(trifluoromethanesulfonyl)imide, or the like.

The ionically conductive polymer may include at least one ion conductive repeating unit of an ether-based monomer, an acryl-based monomer, a methacryl-based monomer, or a siloxane-based monomer.

The ionically conductive polymer may include, for example, polyethylene oxide ("PEO"), polyvinyl alcohol ("PVA"), polyvinyl pyrrolidone ("PVP"), polyvinyl sulfone, polypropylene oxide ("PPO"), polymethylmethacrylate, polyethylmethacrylate, polydimethylsiloxane, polyacrylic acid, polymethacrylic acid, poly(methyl acrylate), poly (ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride ("PVDF"), or an Li-substituted sulfonated tetrafluoroethylene based fluoropolymer-copolymer such as Nafion, available from The Chemours Company. However, embodiments are not limited thereto. Any suitable ionically conductive polymer may be used.

The gel electrolyte may be obtained, for example, by adding a low-molecular weight solvent to a solid electrolyte interposed between the cathode and the anode. The gel electrolyte may be a gel electrolyte obtained by further adding a low-molecular weight organic compound such as a solvent, an oligomer, or the like to a polymer. The gel electrolyte may be a gel electrolyte obtained by further adding a low-molecular weight organic compound such as a solvent or an oligomer to any of the above-listed polymer electrolytes.

The liquid electrolyte may include a solvent and a lithium salt.

The solvent may include at least one of an organic solvent, an ionic liquid, or an oligomer. However, embodiments are not limited thereto. The solvent may be any suitable solvent that is in a liquid form at room temperature (25° C.).

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether ("DEGDME"), tetraethylene glycol dimethyl ether ("TEGDME"), polyethylene glycol dimethyl ether ("PEGDME", number average molecular weight (Mn)= ~500), dimethyl ether, diethyl ether, dibutyl ether, dimethoxyethane, 2-methyltetrahydrofuran, or tetrahydrofuran. However, embodiments are not limited thereto. The organic solvent may be any suitable organic solvent that is in liquid form at room temperature.

The ionic liquid ("IL") may include, for example, i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a mixture thereof, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CF_3COO^-$, $CH_3COO^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or $(CF_3SO_2)_2N^-$.

The lithium salt may include at least one of $LiN(SO_2CF_3)_2$, $LiPF_6$, $LiBF_4$, $LiAsF_6$, $LiClO_4$, $LiNO_3$, (lithium bis(oxalato) borate (LiBOB), $LiCF_3SO_3$, $LiN(SO_2F)_2$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethane-sulfonate ("LiTfO"). However, embodiments are not limited thereto. Any suitable lithium salt material may be used. A concentration of the lithium salt may be, for example, about 0.01 molar (M) to about 5.0 M.

For example, the lithium-air battery may further include a separator between the cathode and the anode. Any suitable separator that is durable under operation conditions of the lithium-air battery may be used. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. One or more separators may be used.

The electrolyte may have a structure in which a solid polymer electrolyte is impregnated in the separator, or a structure in which a liquid electrolyte is impregnated in the separator. For example, the electrolyte in which a solid polymer electrolyte is impregnated in the separator may be prepared by arranging solid polymer electrolyte films on opposite surfaces of the separator, and roll-pressing them at the same time. For example, the electrolyte in which a liquid electrolyte is impregnated in the separator may be prepared by injecting a liquid electrolyte including a lithium salt into the separator.

In an embodiment, a cathode for a metal-air battery includes a mixed conductor including at least one of a spinel compound represented by Formula 3A, or a perovskite compound represented by Formula 5A

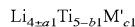  Formula 3A wherein, in Formula 3A, M' is La and optionally at least one of Ru, Cr, Mg, Ca, Sr, Sc, Y, Ce, Pr, Nd, Sm, Eu, Gd, Tb, Dy, Ho, Er, Tm, Yb, Lu, Zr, Hf, V, Nb, Ta, Mo, W, Mn, Tc, Re, Fe, Os, Co, Rh, Ir, Ni, Pd, Pt, Cu, Ag, Au, Zn, Cd, Hg, Al, Ga, In, Tl, Ge, Sn, Pb, Sb, Bi, Po, As, Se, or Te, $0.3<a1<2$, $0.3<b1<2$, $0.3<c1<2$, and $0≤δ1≤3$,

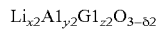  Formula 5A wherein, in Formula 5A, Al is La and optionally at least one of Ce, Pr, Gd, Ca, Sr, or Ba, G1 is at least one of Ti or Ru, and optionally at least one of Mn, Ni, Ru, Cr, Co, Ir, Fe, Pd, Pb, Rh, Sn, V, Re, Ge, W, Zr, Mo, Nb, Ta, Hf, or Bi, $0.2<x2≤0.5$, $0.4<y2≤0.7$, $0<x2+y2<1$, $0.8<z≤21.2$, and $0≤δ2≤1$; and first pores having a size of about 1 micrometer to about 10 micrometers, wherein an amount of the first pores is about 30 volume percent to about 70 volume percent, with respect to a total volume of pores in the cathode, and a total porosity of the cathode is about 70% to about 90%, based on a total volume of the cathode.

In an embodiment, the lithium-air battery may be manufactured by installing the anode on an inner side of a case, sequentially arranging the electrolyte on the anode, the cathode on the electrolyte, and a porous cathode current collector on the cathode, and then arranging a pressing member on the porous cathode current collector to press a resulting cell structure with the pressing member so as to allow air to be transferred to the air electrode (i.e., cathode). In embodiments, the metal-air battery such as a lithium-air battery according to an embodiment may be used as any of a lithium primary battery and a lithium secondary battery. The metal-air battery may have any suitable shape of, for example, a coin, a button, a sheet, a stack, a cylinder, a plane, or a horn. However, embodiments are not limited thereto. The metal-air battery may be used in a medium to large battery for electric vehicles.

Figure 6:
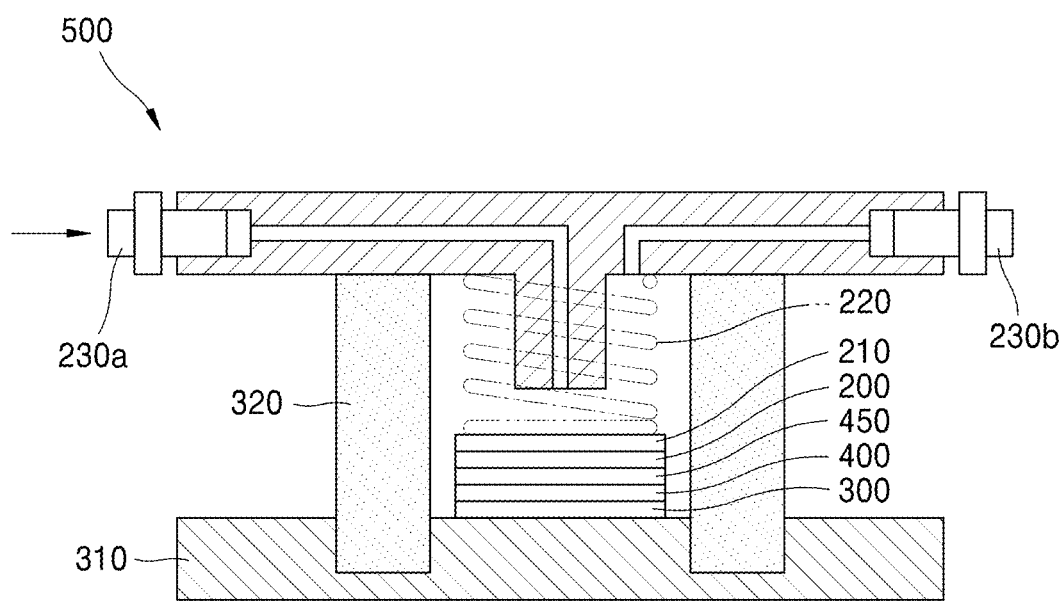
FIG. 6 is a schematic view illustrating a structure of an embodiment of a lithium-air battery.

FIG. 6 is a schematic view of a lithium-air battery 500 as a metal-air battery according to an embodiment. Referring to FIG. 6, the lithium-air battery 500 according to an embodiment may include a cathode 200 according to an embodiment adjacent to a first current collector 210 and using oxygen as an active material, an anode 300 adjacent to a second current collector 310 and including lithium, and an first electrolyte 400 interposed between the cathode 200 and the anode 300. The first electrolyte 400 may be a separator impregnated with a liquid electrolyte. A second electrolyte 450 may be arranged between the cathode 200 and the first electrolyte 400. The second electrolyte membrane 450 may be a lithium-ion conductive solid electrolyte membrane. The first current collector 210 may be porous and function as a gas diffusion layer which allows diffusion of air. A pressing member 220 for transporting air to the cathode 200 may be arranged on the first current collector 210. A case 320 made of an insulating resin may be disposed between the cathode 200 and the anode 300 to electrically insulate the cathode 200 and the anode 300 from one another. The air may be supplied into the lithium-air battery 500 through an air inlet 230a and may be discharged through an air outlet 230b. The lithium-air battery 500 may be accommodated in a stainless steel container.

The term "air" of the lithium-air battery used herein is not limited to atmospheric air, and for convenience, may refer to a combination of gases including oxygen, or pure oxygen gas. This broad definition of the term "air" also applies to any other terms used herein, including "air battery" and "air electrode."

One or more embodiments of the present disclosure will now be described in detail with reference to the following examples. However, these examples are only for illustrative purposes and are not intended to limit the scope of the one or more embodiments of the present disclosure.

Preparation of Mixed Conductor

Preparation Example 1

$Li_2CO_3$, $La_2O_3$, and $RuO_2$ powder were added to an ethanol according to a composition ratio $Li_{0.34}La_{0.55}RuO_3$ of and then mixed to obtain a mixture. The mixture was put into a ball mill and pulverized and mixed for 4 hours. The mixed product was dried and then heated at a temperature increase rate of about 5° C./minute (min) to about 800° C. and then thermally treated under air atmosphere for 4 hours (first thermal treatment).

The powder obtained through the first thermal treatment was pulverized to prepare power having a primary particle size of about 0.3 micrometers (μm). The prepared powder was pressed to prepare cylindrical pellets having a diameter of about 1.3 centimeters (cm), a height of about 0.5 cm, and a weight of about 0.3 grams (g). The prepared pellets were thermally treated under air atmosphere at 1200° C. for about 24 hours (second thermal treatment) to obtain a target product. For the second thermal treatment, the temperature was increased at a temperature increase rate of about 5° C./min to about 1200° C. The prepared mixed conductor has a composition represented by $Li_{0.34}La_{0.55}RuO_3$.

Manufacture of Cathode

Example 1

500 milligrams (mg) of $Li_{0.30}La_{0.57}RuO_3$ ("LLRuO") obtained according to Preparation Example 1, 150 mg of polyvinyl butyral resin (Butvar B79: Eastman) as a binder, 150 mg of poly(styrene-b-divinylbenzene) block copolymer microspheres (hereinafter, referred to also as "PS MS") (average particle diameter: about 3 μm) (EPRUI Co. Ltd), and ethanol (SAMCHUM CHEMICALS) as a solvent were mixed to prepare a cathode slurry. The block copolymer included a polystyrene block and a polydivinylbenzene block in a mixed weight ratio of about 80:20 (4:1), and the poly(styrene-b-divinylbenzene) copolymer had a weight average molecular weight of about 100,000 Daltons.

The cathode slurry was coated on a polyethylene terephthalate ("PET") membrane using a doctor blade, dried at 25° C., and then thermally treated at 450° C. for 1 hour to thereby manufacture a cathode having a porous structure including first pores and the mixed conductor, the cathode having a weight of 6.45 milligrams per square centimeter ($mg/cm^2$) per unit area or a thickness of about 19.9 μm. The amount of the PS MS was about 30 parts by weight, with respect to 100 parts by weight of LLRuO, and the amount of the polyvinyl butyral resin was about 30 parts by weight, with respect to 100 parts by weight of LLRuO.

Example 2

A cathode was manufactured in the same manner as in Example 1, except that the amount of the PS MS was varied to 300 mg. The amount of the PS MS was about 60 parts by weight, with respect to 100 parts by weight of LLRuO, and the amount of the polyvinyl butyral resin was about 30 parts by weight, with respect to 100 parts by weight of LLRuO.

Example 3

A cathode was manufactured in the same manner as in Example 1, except that the average particle diameter of the microspheres ("PS MS") was changed to about 8 μm. The amount of the PS MS was about 30 parts by weight, with respect to 100 parts by weight of LLRuO, and the amount of the polyvinyl butyral resin was about 30 parts by weight, with respect to 100 parts by weight of LLRuO.

Example 4

A cathode was manufactured in the same manner as in Example 1, except that the amount of the polyvinyl butyral resin was varied to 100 mg.

The amount of the PS MS was about 30 parts by weight, with respect to 100 parts by weight of LLRuO, and the amount of the polyvinyl butyral resin was about 20 parts by weight, with respect to 100 parts by weight of LLRuO.

Example 5A and Example 5B

Cathodes were manufacture in the same manner as in Example 1, except that the average particle diameter of the microspheres ("PS MS") was changed to about 1 μm and about 20 μm, respectively.

Comparative Example 1

A cathode was manufactured in the same manner as in Example 1, except that PS MS was not used in preparing the cathode slurry.

Manufacture of Lithium-Air Battery

Example 6: Manufacture of Lithium-Air Battery (Cathode (GDL/Porous LLRuO)/LATP/Electrolyte (Celgard+Electrolyte Solution (1 M LiTFSI+PC))/ Anode(Li Metal))

A Celgard-3501 (available from Celgard) including an organic electrolyte was disposed on an upper surface of a lithium metal foil. The electrolyte used was a mixture of 1 molar (M) lithium bis(trifluoromethanesulfonyl)imide ("LiTFSi") and propylene carbonate ("PC"). A lithium aluminum titanium phosphate ("LATP") layer (Thickness: 250 μm, Ohara Corp., Japan) as a solid electrolyte was disposed on the electrolyte.

The cathode of Example 1 was disposed on the solid electrolyte, and a gas diffusion layer ("GDL") (25BC, available from SGL) was disposed thereon. A nickel (Ni) mesh was disposed on the gas diffusion layer, and a press member which allows air to be transferred to the cathode was fixed thereto by pressing, thereby manufacturing a lithium-air battery.

Examples 7-11

Lithium-air batteries were manufactured in the same manner as in Example 6, except that the cathodes of Examples 2 to 4 and the cathodes of Examples 5A and 5B were used, respectively, instead of the cathode of Example 1.

Comparative Example 2

A lithium-air battery was manufactured in the same manner as in Example 6, except that the cathode of Comparative Example 1 was used instead of Example 1.

Evaluation Example 1: Ionic Conductivity Evaluation

After separators impregnated with liquid electrolyte (1 M LiTFSI in PC) were disposed on both surfaces of the mixed conductor pellets of Preparation Example 1, a stainless steel as a current collector was disposed on the electrolyte to thereby complete the manufacture of an electron blocking cell. The ionic conductivity of the cell was measured using a direct current ("DC") polarization method.

A time-dependent current was measured while applying a constant voltage of 100 millivolts (mV) to the completed symmetric cell for 30 minutes. The ion resistance of the cell was calculated based on the measured current. The ion resistance of the electrolyte was subtracted from the ion resistance of the cell to thereby calculating an ionic resistance of the mixed conductor. Then, the ionic conductivity was calculated from the ionic resistance of the mixed conductor. The obtained ionic conductivity is shown in Table 1.

TABLE 1

| | Composition | Ionic conductivity (Siemens per centimeter (S/cm)) |
|---|---|---|
| Preparation Example 1 | $Li_{0.34}La_{0.55}RuO_3$ | $1.2 \times 10^{-5}$ |

Referring to Table 1, the mixed conductor of Preparation Example 1 was found to provide an ionic conductivity of about $1 \times 10^{-7}$ or greater.

Evaluation Example 2: Electron Scanning Microscopy ("SEM")

The surface state of the cathode manufactured according to Example 1 before and after the thermal treatment was analyzed by scanning electron microscopy ("SEM"). The SEM analysis results are shown in FIGS. 4A and 4B.

Figure 4A:
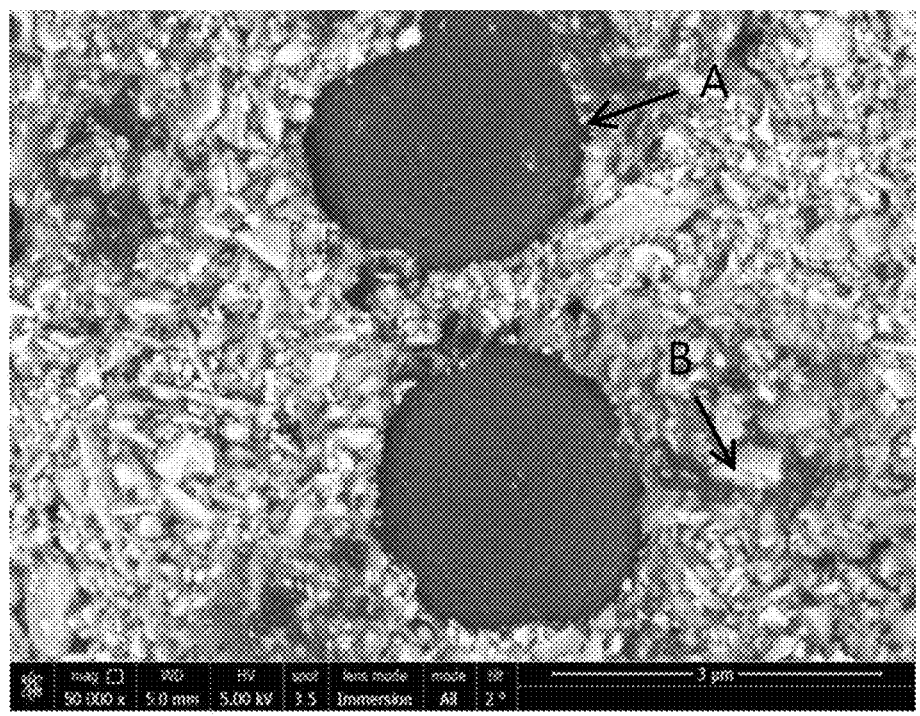
FIG. 4A is a SEM image showing a state of a cathode of Example 1 before thermal treatment.
Figure 4B:
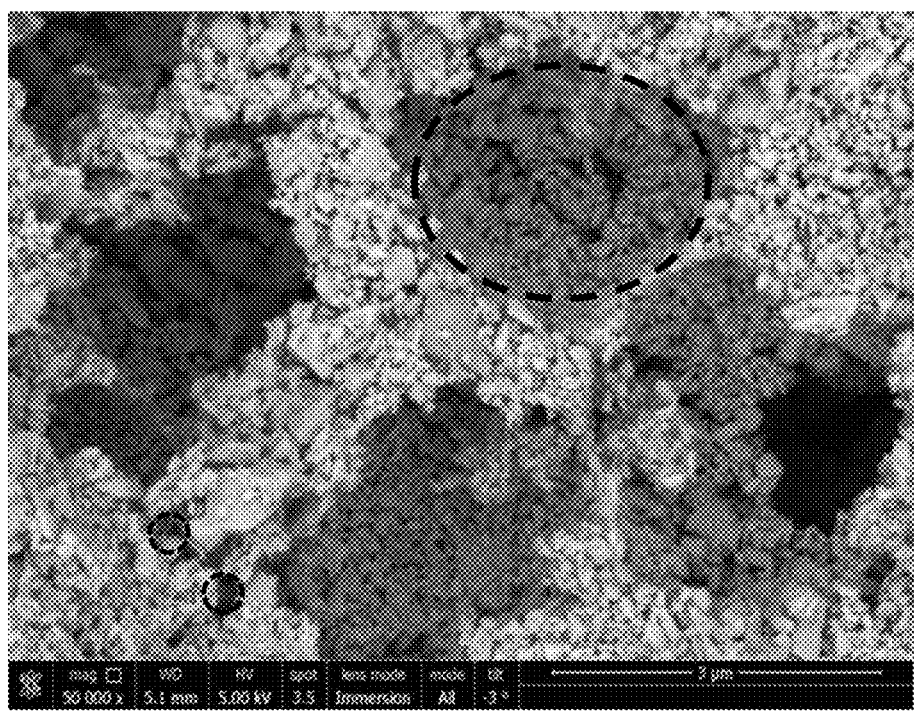
FIG. 4B is a SEM image showing a state of the cathode of Example 1 after thermal treatment.

Referring to FIG. 4A, the cathode of Example 1 before the thermal treatment was found to include PS MS as indicated by "A" and the binder as indicated by "B". Referring to FIG. 4B, the cathode of Example 1 after the thermal treatment was found to include first pores having a size (diameter) of about 3 μm and second pores having a size of less than 1 μm. The first pores were from the PS MS ("A"), and the second pores were from the binder ("B"). Accordingly, it was found that it is possible to form the first pores as a storage space for the discharge product using PS MS.

Evaluation Example 3: Site Analysis of Discharge Product in Cathode

Figure 2:
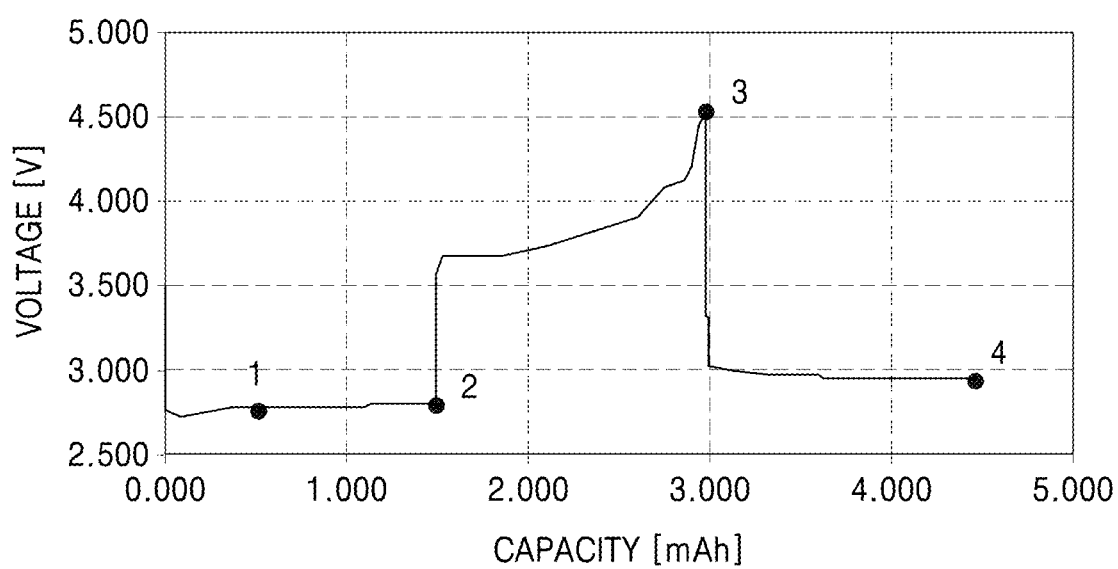
FIG. 2 is a graph of voltage (volts (V)) versus capacity (milliampere hours (mAh)) illustrating a charging and discharging process in a lithium air battery of Example 6.

To analyze the sites of the discharge product in the cathode during charge and discharge process, the lithium-air battery of Example 6 was sequentially discharged, charged, and then discharged according to the conditions as shown in FIG. 2. In FIG. 2, the stage from point 1 in FIG. 2 to point 2 in FIG. 2 is discharging, the stage from point 2 in FIG. 2 to point 3 is in FIG. 2 charging, and the stage from point 3 in FIG. 2 to point 4 in FIG. 2 is discharging.

Detailed conditions of the discharging-charging-discharging are as described below.

During discharge, the cell was located inside a 1 liter (L)-stainless steel chamber, and then the chamber was sealed under the conditions of 40° C. and 100%-relative humidity. After 100%-$O_2$ gas was flowed into the chamber for 10 minutes or longer, the chamber was finally sealed.

The discharge and charge conditions were as follows.

The first discharging was carried out with a current density of about 0.3 milliamperes per square centimeter (mA/cm²) for 10 hours. When a discharge capacity of about 3 mAh/cm² was reached, the discharging was terminated. Then, after a rest for 5 minutes, charging was carried out with a current density of about 0.3 mA/cm² until a voltage of about 4.5 V was reached, and then charging was carried out at 4.5 V to a current density of 0.03 mA/cm².

The second discharging was carried out under the same conditions as the first discharging.

Figure 3A:
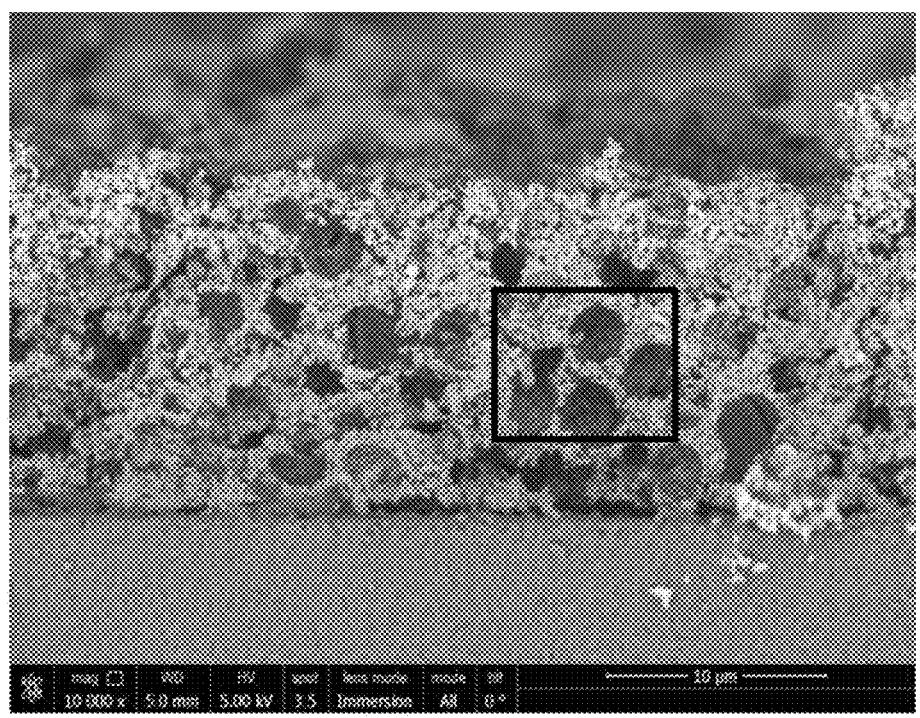
FIG. 3A is a scanning electron microscopy ("SEM") image showing the location of discharge products at point 1 in FIG. 2 in a porous cathode.
Figure 3B:
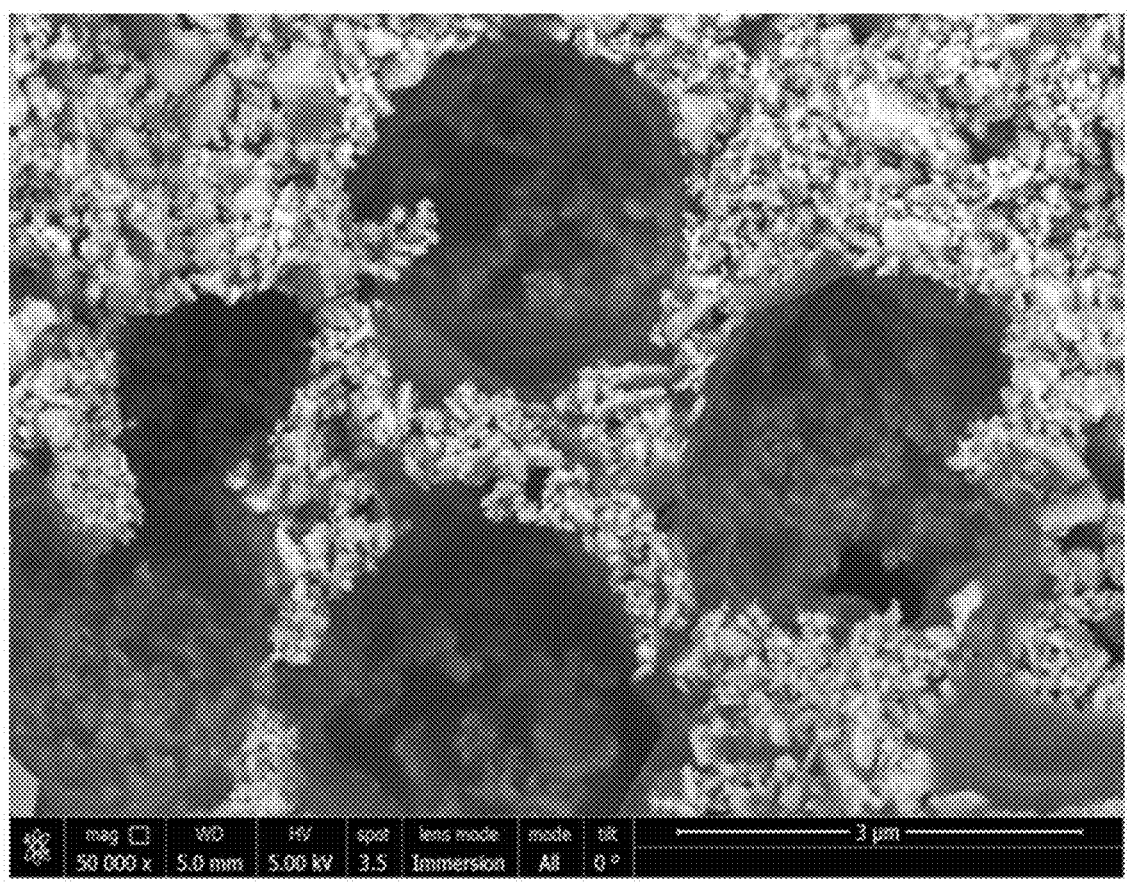
FIG. 3B is a magnified image of a rectangular region in FIG. 3A.

The sites of the discharge product in the cathode were analyzed at stage point 1 in FIG. 2 using SEM. The SEM analysis results are shown in FIGS. 3A and 3B. FIG. 3B is a magnified image of a rectangular region in FIG. 3A. The sites of the discharge product in the porous cathode at each stage of points 2, 3 and 4 in FIG. 2 were analyzed using SEM. The SEM analysis results are shown in FIGS. 3C, 3D, and 3E, respectively.

Figure 3C:
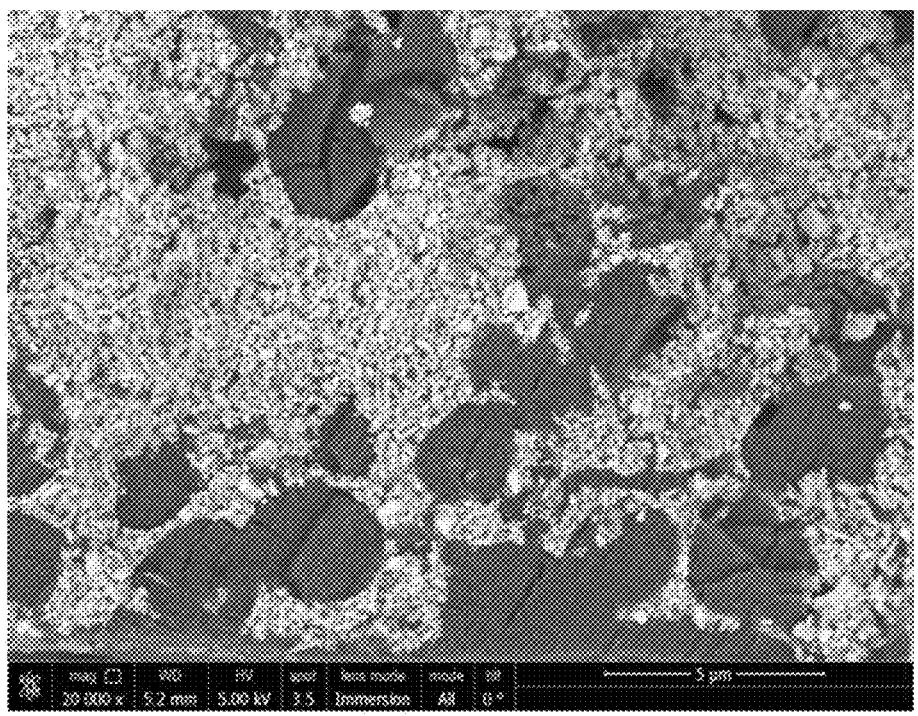
FIGS. 3C, 3D, and 3E are SEM images showing the location of products before the stage from points 2, 3, and 4 in FIG. 2, respectively, in a cathode.

Referring to FIGS. 3A to 3C, it was found that after the discharging to an areal capacity of 3 mAh/cm², the discharge product was present in the first pores of the porous cathode, while no discharge product was observed in the second pores.

Figure 3D:
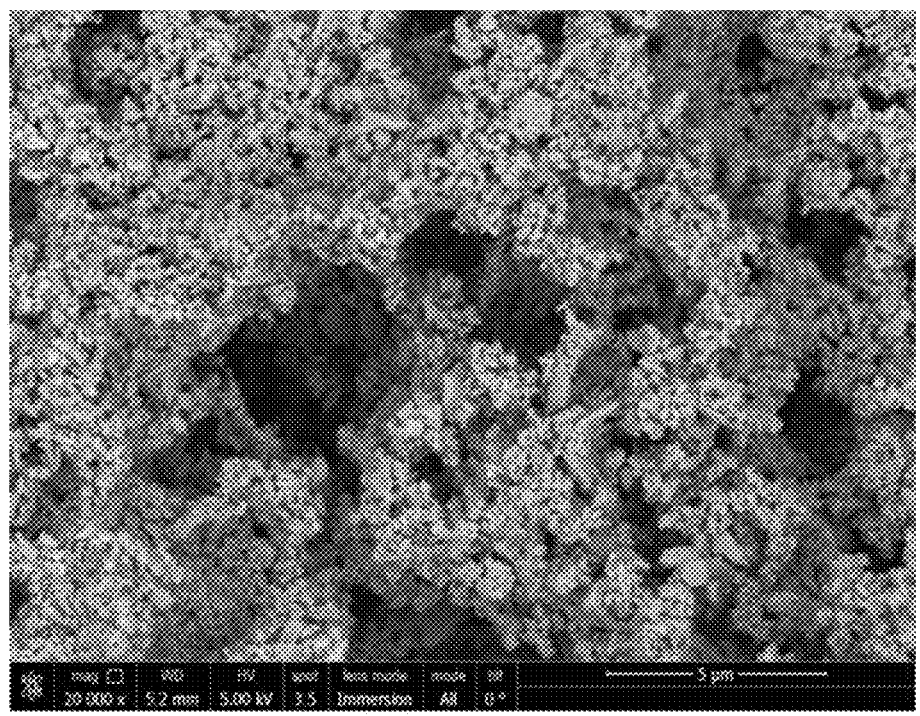
Figure 3E:
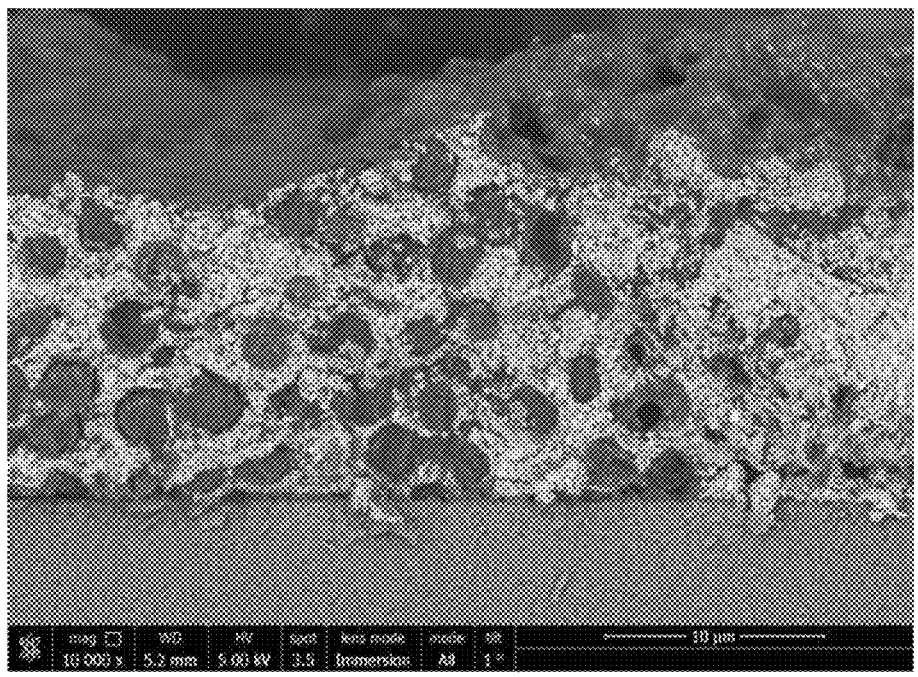

As shown in FIG. 3D, it was found that after the charging, the discharge product disappeared from the first pores of the porous cathode. After discharging was carried out again, as shown in FIG. 3E, the discharge product was found to be generated again and present in the first pores. Like this, it was found that the cathode of Example 1 enable reversible charging and discharging since the discharge product present in the first pores is effectively decomposed during charge. As a result, it is possible to manufacture a lithium-air battery having a high capacity and improved charge and discharge efficiency and lifetime characteristics.

In addition, from the above-described results, it was found that the first pores of the porous cathode are filled with the discharge product during charge/discharge, thus preventing problems of a lithium-air battery, such as presence of the discharge product in other spaces, such as a space between the gas diffusion layer and the cathode.

Evaluation Example 4: Physical Characteristics of Cathode

The amount and volume of LLRuO, the binder, and PS MS in the cathodes of Examples 1 to 4 were analyzed. The results are shown in Table 2.

TABLE 2

| Items | Example 1 | Example 2 | Example 3 | Example 4 |
|---|---|---|---|---|
| Amount of LLRuO (parts by weight) | 500 | 500 | 500 | 500 |
| Amount of binder (parts by weight) | 150 | 150 | 150 | 100 |
| Amount of PS MS (parts by weight) | 150 | 300 | 150 | 150 |
| Relative volume of LLRuO (%) | 21.3 | 15.5 | 21.3 | 24.7 |
| Relative volume of binder (%) | 41.2 | 30.0 | 41.2 | 31.9 |
| Relative volume of PS MS (%) | 37.5 | 54.5 | 37.5 | 43.4 |

The size of the first pores, the amount of the first pores, and a total porosity of the cathodes of Examples 1 to 4 were measured. The results are shown in Table 3. The amount of the first pores is also confirmed with the relative volume of PS MS in Table 2. A total porosity of each cathode was calculated as follows. First, the area was measured using an optical microscope and the electrode thickness was measured using SEM to calculate the volume of the cathode. Then, the total porosity of the cathode was calculated using the calculated volume and the weight of the electrode.

TABLE 3

| Items | Example 1 | Example 2 | Example 3 | Example 4 |
|---|---|---|---|---|
| Size of first pores (μm) | 3 | 3 | 8 | 3 |
| Amount of first pores (volume percent (vol %)) | 37.5 | 54.5 | 37.5 | 43.4 |
| Total porosity (%) | 71.5 | 84 | 71.5 | 75 |

In Table 3, the amount of the first pores was obtained based on the volume of the first pores, with respect to the total volume of the cathode. The total volume of the cathode indicates a total volume of the first pores, the second pores, and the mixed conductor.

Evaluation Example 5: Charge-Discharge Characteristics of Lithium-Air Battery

The lithium-air batteries manufactured according to Example 6 and Comparative Example 2 were each subjected to one charge-discharge cycle, under the conditions of 40° C., 100%-relative humidity ("RH"), and oxygen ($O_2$) atmosphere created by removing $CO_2$ with calcium hydroxide, of discharging with a constant current of 0.3 mA/cm² until a voltage of 2.0 V (vs. Li) was reached, charging with the same current to a voltage of 4.5 V, and charging at 4.5 V until the current was decreased to 0.03 mA/cm² (formation process). Then, each lithium-air battery was subjected to a charge-discharge cycle of discharging with a constant current of 0.3 mA/cm² until a voltage of 2.0 V (vs. Li) was reached, charging with the same current to a voltage of 4.5 V, and charging at 4.5 V until the current was decreased to 0.03 mA/cm². This charge-discharge cycle was repeatedly carried out.

Figure 5:
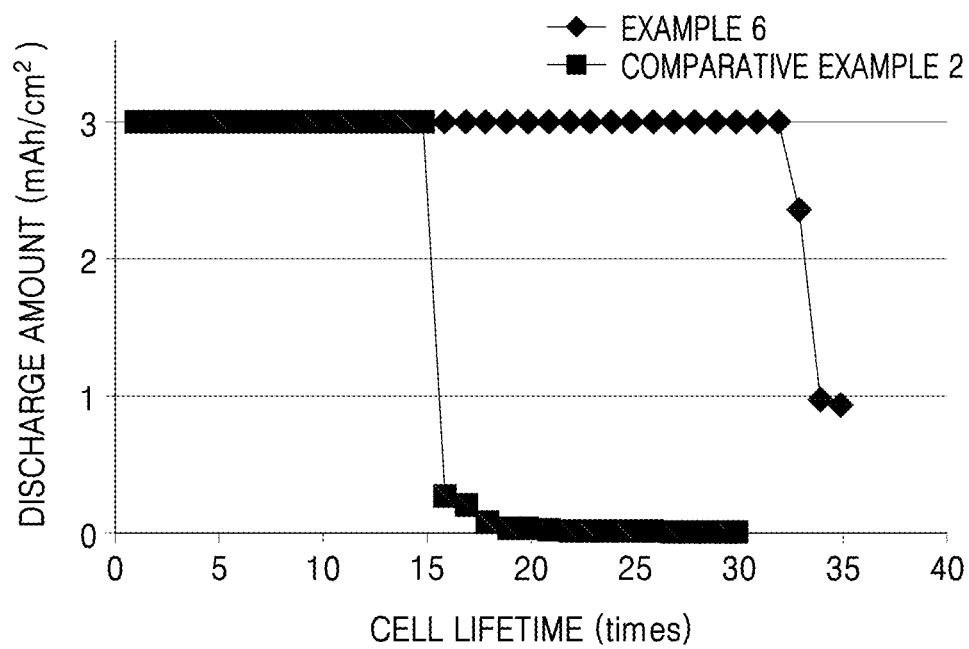
FIG. 5 is a graph of discharge capacity (milliampere hours per square centimeter (mAh/cm$^2$)) versus cycle number (cycles) illustrating the cell lifetime of a lithium air battery of Example 6 and a lithium air battery of Comparative Example 2.

The evaluation results of charge-discharge cycle characteristics are shown in FIG. 5.

The lithium-air battery of Example 6 using the porous cathode was found to have a lifetime of 32 cycles, while the lithium-air battery of Comparative Example 2 had a lifetime of 15 cycles. Like this, the lithium-air battery of Example 6 can contain the discharge product in the first pores, and thus may have improved lifetime characteristics by preventing problems such as decrease in charge and discharge efficiency and lifetime characteristics resulting from decreased adhesive strength between the gas diffusion layer and the cathode and volume expansion of the electrode, due to the discharge product.

As described above, according to the an embodiment, a lithium-air battery having an increased discharge capacity, and improved charge and discharge efficiency and lifetime characteristics, due to decreased volume change during charge and discharge, may be manufactured using a cathode according to an embodiment.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A cathode for a metal-air battery, the cathode comprising:
   a mixed conductor; and
   first pores having a size of about 1 micrometer or greater, wherein an amount of the first pores is about 30 volume percent to about 95 volume percent, with respect to a total volume of pores in the cathode, and
   a total porosity of the cathode is about 70 percent to about 95 percent, based on a total volume of the cathode,
   wherein the mixed conductor is a perovskite compound represented by Formula 5:

$$Li_xAl_yG1_zO_{3-\delta}$$ <span style="float:right">Formula 5</span> wherein, in Formula 5,
   A1 is at least one of La, Ce, Pr, Gd, Ca, Sr, or Ba,
   G1 is at least one of Mn, Ru, Cr, Co, Ir, Fe, Pd, Pb, Rh, Sn, V, Re, Ge, W, Mo, Hf, or Bi, and
   $0.2<x\leq0.5$, $0.4<y\leq0.6$, $0<x+y<1$, $0.8<z\leq1.2$, and $0\leq\delta\leq0.4$.

2. The cathode of claim 1, wherein the mixed conductor has an electronic conductivity of about $1\times10^{-6}$ Siemens per centimeter or greater.

3. The cathode of claim 1, wherein the mixed conductor has an ionic conductivity of about $1\times10^{-8}$ Siemens per centimeter or greater.

4. The cathode of claim 1, wherein the mixed conductor has a particle size of about 10 nanometers to about 500 nanometers.

5. The cathode of claim 1, wherein the size of the first pores is about 1 micrometer to about 100 micrometers.

6. The cathode of claim 1, wherein the cathode has a thickness of about 5 micrometers to about 100 micrometers.

7. The cathode of claim 1, wherein
   G1 is Ru, and
   δ is oxygen vacancy.

8. The cathode of claim 1, wherein the mixed conductor is $Li_{0.34}La_{0.55}RuO_3$.

9. The cathode of claim 1, wherein the mixed conductor has an oxidation potential that is greater than an oxidation potential of carbon and a reduction potential that is less than a reduction potential of carbon.

10. The cathode of claim 1, wherein the mixed conductor has a stability to being decomposed by an electrochemical reaction that is greater than a stability of carbon to being decomposed by an electrochemical reaction.

11. A metal-air battery comprising:
    the cathode according to claim 1;
    an anode; and
    an electrolyte disposed between the cathode and the anode.

12. The metal-air battery of claim 11, wherein the electrolyte comprises a solid electrolyte.

13. The metal-air battery of claim 11, wherein the anode comprises at least one of lithium, magnesium, iron, aluminum, or zinc, or an alloy thereof.

14. A method of manufacturing the cathode for a metal-air battery of claim 1, the method comprising:
    mixing the mixed conductor, organic particles having a size of about 1 micrometer or greater, and a solvent to prepare a composition;
    coating the composition on a substrate to provide a coated substrate; and then
    thermally treating the coated substrate to manufacture the cathode.

15. The method of claim 14, wherein the composition further comprises a binder.

16. The method of claim 14, wherein the thermally treating comprises thermally treating at a temperature of 450° C. to 800° C.

17. The method of claim 14, wherein an amount of the organic particles is about 5 parts by weight to about 60 parts by weight, with respect to 100 parts by weight of the mixed conductor.

18. A cathode for a metal-air battery, the cathode consisting of:
- a mixed conductor; and
- first pores having a size of about 1 micrometer or greater,
- wherein an amount of the first pores is about 30 volume percent or greater, with respect to a total volume of pores in the cathode, and
- a total porosity of the cathode is about 50 percent or greater, based on a total volume of the cathode,
- wherein the mixed conductor is a perovskite compound represented by Formula 5:

$$Li_xAl_yG1_zO_{3-\delta} \quad \text{Formula 5}$$

wherein, in Formula 5,
A1 is at least one of La, Ce, Pr, Gd, Ca, Sr, or Ba,
G1 is at least one of Mn, Ru, Cr, Co, Ir, Fe, Pd, Pb, Rh, Sn, V, Re, Ge, W, Mo, Hf, or Bi, and $0.2 < x \leq 0.5$, $0.4 < y \leq 0.6$, $0 < x+y < 1$, $0.8 < z \leq 1.2$, and $0 \leq \delta \leq 0.4$.

19. A cathode for a metal-air battery, the cathode comprising:
- a mixed conductor; and
- first pores having a size of about 1 micrometer or greater,
- wherein an amount of the first pores is about 30 volume percent to about 95 volume percent, with respect to a total volume of pores in the cathode, and
- a total porosity of the cathode is about 70 percent to about 95 percent, based on a total volume of the cathode,
- wherein the mixed conductor is a perovskite compound represented by Formula 5:

$$Li_xAl_yG1_zO_{3-\delta} \quad \text{Formula 5}$$

wherein, in Formula 5,
A1 is at least one of La, Ce, Pr, Gd, Ca, Sr, or Ba,
G1 is at least one of Mn, Ru, Cr, Co, Ir, Fe, Pd, Pb, Rh, Sn, V, Re, Ge, W, Mo, Hf, or Bi, and $0.2 < x \leq 0.5$, $0.4 < y \leq 0.7$, $0 < x+y < 1$, $0.8 < z \leq 1.2$, and $0 \leq \delta \leq 1$, and
wherein the cathode comprises about 70 parts to about 100 parts by weight of the mixed conductor, with respect to 100 parts by weight of the cathode.

* * * * *